United States Patent [19]
Rallison et al.

[11] Patent Number: 5,991,085
[45] Date of Patent: Nov. 23, 1999

[54] HEAD-MOUNTED PERSONAL VISUAL DISPLAY APPARATUS WITH IMAGE GENERATOR AND HOLDER

[75] Inventors: Richard Dennis Rallison, Paradise, Utah; C. Gregory Amadon, Seattle, Wash.; Wolfgang Adam Mack, Jr., Seattle, Wash.; Leo Nikora, Bellevue, Wash.; Eric Tseo, Seattle, Wash.; Douglas Donaldson, Bothell, Wash.; Robert T. Etter, Bonney Lake, Wash.

[73] Assignee: i-O Display Systems LLC, Menlo Park, Calif.

[21] Appl. No.: 08/686,843

[22] Filed: Jul. 12, 1996

Related U.S. Application Data

[63] Continuation of application No. PCT/US95/11344, Aug. 31, 1995, which is a continuation-in-part of application No. 08/416,919, Apr. 21, 1995, Pat. No. 5,903,395
[60] Provisional application No. 60/001,151, Jul. 14, 1995.

[51] Int. Cl.⁶ .............................. G02B 27/14; G09G 5/00
[52] U.S. Cl. ................................. 359/630; 345/8
[58] Field of Search ..................... 359/630, 631, 359/633; 345/7, 8; 351/114, 115

[56] References Cited

U.S. PATENT DOCUMENTS

| | | | |
|---|---|---|---|
| D. 300,476 | 3/1989 | Sestak | D29/18 |
| D. 301,644 | 6/1989 | Sestak | D29/18 |
| D. 334,557 | 4/1993 | Hunter et al. | D14/114 |
| D. 334,742 | 4/1993 | Hunter et al. | D14/113 |
| D. 337,320 | 7/1993 | Hunter et al. | D14/113 |

(List continued on next page.)

FOREIGN PATENT DOCUMENTS

| | | | |
|---|---|---|---|
| 0 059 770 | 9/1982 | European Pat. Off. | G01R 33/04 |
| 0 460983 A1 | 5/1991 | European Pat. Off. | G02B 27/00 |
| 0 453 347 | 10/1991 | European Pat. Off. | G01V 3/08 |

(List continued on next page.)

OTHER PUBLICATIONS

Aley et al., "A Sourceless Orientation Sensor", *Sensors*, Nov. 1993, p. 55.
Analog Devices, Inc., "Analog Devices", specifications, 1995, pp. 1, 3, 5, 7, 9, 11, 13, 15, 17, 19.

(List continued on next page.)

*Primary Examiner*—Georgia Epps
*Assistant Examiner*—Ricky Mack
*Attorney, Agent, or Firm*—Sheridan Ross P.C.

[57] ABSTRACT

A visual display device is provided for delivering a generated image, preferably combinable with environment light, to the eye of a user. The device is lightweight and compact but yields a high quality image. In one embodiment, a shroud protects from stray light and holds optical elements in desired alignment. In one embodiment an image generator is masked by at least two masks to provide for a high quality image without waste. In one embodiment, a removably mounted shield or activatable device and convert the apparatus from a see-through device to an immersion device and back again. In one embodiment, the device can be comfortably mounted to the user's head while still allowing for use of conventional eyeglasses. A tracker for outputting an indication of the orientation, attitude and/or position of a head-mounted display (HMD) may be provided. The tracker can be configured so that it is incorporated in the HMD housing and/or can be easily decoupled from the HMD, so that the HMD can be used without the tracker (e.g. for watching movies). Preferably, decoupling involves unplugging a single electrical connector (such as a cable) and unfastening a mechanical connection (such as a strap). Preferably the tracker provides pass-through of signal to the HMD and, when the tracker is coupled to the HMD, only a single cable or other data link connects the HMD-tracker combination to the host computer. In one embodiment, the tracker uses magnetic sensors. In another embodiment, one or more inertial sensors, such as a rate gyro and/or accelerometers are used.

22 Claims, 32 Drawing Sheets

U.S. PATENT DOCUMENTS

| | | | |
|---|---|---|---|
| D. 338,514 | 8/1993 | Holmes | D21/240 |
| 2,411,933 | 12/1946 | Morley et al. | 2/14 |
| 2,581,428 | 1/1952 | McCarthy | 33/224 |
| 2,581,436 | 1/1952 | McCarthy | 318/24 |
| 2,585,956 | 2/1952 | McCarthy | 33/224 |
| 2,955,156 | 10/1960 | Heilig | 178/6.5 |
| 2,958,258 | 11/1960 | Kelly | 88/24 |
| 3,043,910 | 7/1962 | Hicks | 178/7.85 |
| 3,212,102 | 10/1965 | Müller | 2/12 |
| 3,232,561 | 2/1966 | Adams | 244/1 |
| 3,355,942 | 12/1967 | Freeman | 73/178 |
| 3,405,355 | 10/1968 | Hebbert | 324/46 |
| 3,434,219 | 3/1969 | Bowman | 33/205 |
| 3,487,299 | 12/1969 | Hart et al. | 324/43 |
| 3,573,610 | 4/1971 | Kesselring | 324/43 |
| 3,584,388 | 6/1971 | Petrov et al. | 33/225 |
| 3,589,795 | 6/1971 | Miyazaki et al. | 350/96 B |
| 3,614,314 | 10/1971 | Rossire | 178/7.88 |
| 3,621,584 | 11/1971 | Burt | 33/224 |
| 3,629,870 | 12/1971 | Paisley | 2/15 |
| 3,737,212 | 6/1973 | Antonson et al. | 350/174 |
| 3,825,911 | 7/1974 | Burns | 340/198 |
| 3,833,901 | 9/1974 | Fowler | 340/347 P |
| 3,874,783 | 4/1975 | Cole | 350/96 B |
| 3,888,016 | 6/1975 | Fowler | 33/346 |
| 3,905,121 | 9/1975 | Takeda et al. | 33/361 |
| 3,915,548 | 10/1975 | Opittek et al. | 350/3.5 |
| 3,923,370 | 12/1975 | Mostrom | 350/55 |
| 3,940,204 | 2/1976 | Withrington | 350/3.5 |
| 3,983,474 | 9/1976 | Kuipers | 324/43 R |
| 4,017,858 | 4/1977 | Kuipers | 343/100 R |
| 4,021,862 | 5/1977 | Glasser et al. | 2/431 |
| 4,026,641 | 5/1977 | Bosserman et al. | 350/298 |
| 4,028,725 | 6/1977 | Lewis | 358/103 |
| 4,042,957 | 8/1977 | Ellis | 358/109 |
| 4,048,653 | 9/1977 | Spooner | 358/104 |
| 4,060,910 | 12/1977 | Gell, Jr. | 33/324 |
| 4,095,348 | 6/1978 | Kramer | 33/363 K |
| 4,103,435 | 8/1978 | Herndon | 35/12 N |
| 4,104,803 | 8/1978 | Hoeppel | 33/352 |
| 4,139,951 | 2/1979 | Cunard et al. | 33/362 |
| 4,146,970 | 4/1979 | Edwards | 33/363 K |
| 4,157,619 | 6/1979 | Zuvela | 33/352 |
| 4,179,741 | 12/1979 | Rossani | 364/457 |
| 4,257,062 | 3/1981 | Meredith | 358/81 |
| 4,269,476 | 5/1981 | Gauthier et al. | 350/174 |
| 4,303,394 | 12/1981 | Berke et al. | 434/40 |
| 4,310,849 | 1/1982 | Glass | 358/88 |
| 4,322,135 | 3/1982 | Freeman | 350/410 |
| 4,341,023 | 7/1982 | Marcus et al. | 33/363 K |
| 4,347,507 | 8/1982 | Spooner | 340/705 |
| 4,348,185 | 9/1982 | Breglia et al. | 434/43 |
| 4,361,384 | 11/1982 | Bosserman | 350/174 |
| 4,385,803 | 5/1983 | Ellis | 350/174 |
| 4,395,731 | 7/1983 | Schoolman | 358/88 |
| 4,398,799 | 8/1983 | Swift | 350/174 |
| 4,435,760 | 3/1984 | Kuno et al. | 364/444 |
| 4,437,113 | 3/1984 | Lee et al. | 358/93 |
| 4,439,157 | 3/1984 | Breglia et al. | 434/40 |
| 4,446,480 | 5/1984 | Breglia et al. | 358/104 |
| 4,465,347 | 8/1984 | Task et al. | 350/538 |
| 4,468,101 | 8/1984 | Ellis | 350/538 |
| 4,484,191 | 11/1984 | Vavra | 340/965 |
| 4,497,034 | 1/1985 | Kuno et al. | 364/571 |
| 4,521,777 | 6/1985 | Nakamura et al. | 340/995 |
| 4,539,760 | 9/1985 | Marchent et al. | 33/356 |
| 4,546,550 | 10/1985 | Marchent et al. | 33/356 |
| 4,546,551 | 10/1985 | Franks | 33/356 |
| 4,550,984 | 11/1985 | Reymond | 350/404 |
| 4,559,555 | 12/1985 | Schoolman | 358/88 |
| 4,561,723 | 12/1985 | Hamano et al. | 350/331 R |
| 4,571,628 | 2/1986 | Thornton | 358/224 |
| 4,590,680 | 5/1986 | Hanchett et al. | 33/366 |
| 4,614,041 | 9/1986 | Darton et al. | 33/313 |
| 4,621,283 | 11/1986 | Feinbloom | 358/93 |
| 4,622,644 | 11/1986 | Hansen | 364/559 |
| 4,622,843 | 11/1986 | Hormel | 73/1 E |
| 4,630,321 | 12/1986 | Sagemuehl et al. | 2/426 |
| 4,633,324 | 12/1986 | Giulie | 358/255 |
| 4,636,866 | 1/1987 | Hattori | 358/236 |
| 4,641,931 | 2/1987 | Loy | 350/538 |
| 4,642,786 | 2/1987 | Hansen | 364/559 |
| 4,651,201 | 3/1987 | Schoolman | 358/98 |
| 4,652,870 | 3/1987 | Steward | 340/705 |
| 4,667,414 | 5/1987 | Russell | 33/364 |
| 4,680,866 | 7/1987 | Johnson et al. | 33/356 |
| 4,682,159 | 7/1987 | Davison | 340/709 |
| 4,694,583 | 9/1987 | Blaney | 33/361 |
| 4,695,129 | 9/1987 | Faessen et al. | 350/96.25 |
| 4,703,522 | 11/1987 | Schürle et al. | 2/432 |
| 4,706,117 | 11/1987 | Schoolman | 358/88 |
| 4,711,512 | 12/1987 | Upatnieks | 350/3.7 |
| 4,720,992 | 1/1988 | Hormel | 73/1 E |
| 4,722,601 | 2/1988 | McFarlane | 356/152 |
| 4,726,075 | 2/1988 | Hinrichs | 2/13 |
| 4,737,972 | 4/1988 | Schoolman | 378/41 |
| 4,743,200 | 5/1988 | Welch et al. | 434/43 |
| 4,751,746 | 6/1988 | Rustin | 2/13 |
| 4,753,514 | 6/1988 | Kubik | 350/174 |
| 4,757,714 | 7/1988 | Purdy et al. | 73/597 |
| 4,761,056 | 8/1988 | Evans et al. | 350/174 |
| 4,763,990 | 8/1988 | Wood | 350/320 |
| 4,775,217 | 10/1988 | Ellis et al. | 350/538 |
| 4,784,468 | 11/1988 | Tierney | 350/276 R |
| 4,785,481 | 11/1988 | Palmer et al. | 2/436 |
| 4,786,966 | 11/1988 | Hanson et al. | 358/108 |
| 4,791,729 | 12/1988 | Suda | 33/356 |
| 4,792,761 | 12/1988 | King et al. | 324/350 |
| 4,796,987 | 1/1989 | Linden | 351/158 |
| 4,797,736 | 1/1989 | Kloots et al. | 358/93 |
| 4,799,765 | 1/1989 | Ferrer | 350/174 |
| 4,805,988 | 2/1989 | Dones | 350/137 |
| 4,806,011 | 2/1989 | Bettinger | 351/158 |
| 4,807,202 | 2/1989 | Cherri et al. | 367/129 |
| 4,807,462 | 2/1989 | Al-Attar | 73/1 E |
| 4,817,633 | 4/1989 | McStravick et al. | 128/782 |
| 4,826,287 | 5/1989 | Cook et al. | 350/174 |
| 4,839,809 | 6/1989 | Leighton et al. | 364/413.02 |
| 4,849,696 | 7/1989 | Brun et al. | 324/252 |
| 4,851,775 | 7/1989 | Kim et al. | 324/247 |
| 4,853,764 | 8/1989 | Sutter | 358/3 |
| 4,859,030 | 8/1989 | Rotier | 350/174 |
| 4,859,031 | 8/1989 | Berman et al. | 350/174 |
| 4,863,242 | 9/1989 | Correa | 350/276 R |
| 4,864,190 | 9/1989 | Orr | 313/478 |
| 4,865,420 | 9/1989 | Schmidt | 350/276 R |
| 4,867,551 | 9/1989 | Perera | 351/158 |
| 4,868,930 | 9/1989 | Blackstone | 2/439 |
| 4,869,575 | 9/1989 | Kubik | 350/174 |
| 4,874,214 | 10/1989 | Cheyason et al. | 350/3.7 |
| 4,874,235 | 10/1989 | Webster | 351/201 |
| 4,884,137 | 11/1989 | Hanson et al. | 358/108 |
| 4,884,219 | 11/1989 | Waldren | 364/514 |
| 4,897,715 | 1/1990 | Beamon | 358/93 |
| 4,900,133 | 2/1990 | Berman | 350/346 |
| 4,902,083 | 2/1990 | Wells | 350/6.6 |
| 4,902,116 | 2/1990 | Ellis | 350/501 |
| 4,902,120 | 2/1990 | Weyer | 351/158 |
| 4,904,049 | 2/1990 | Hegg | 350/96.27 |
| 4,930,888 | 6/1990 | Freisleben et al. | 356/152 |
| 4,932,731 | 6/1990 | Suzuki et al. | 350/3.7 |
| 4,933,755 | 6/1990 | Dahl et al. | 358/88 |

| | | | | | | | |
|---|---|---|---|---|---|---|---|
| 4,934,773 | 6/1990 | Becker | 350/6.6 | 5,255,211 | 10/1993 | Redmond | 364/578 |
| 4,945,305 | 7/1990 | Blood | 324/207.17 | 5,267,708 | 12/1993 | Monson et al. | 244/122 AG |
| 4,952,024 | 8/1990 | Gale | 350/143 | 5,274,405 | 12/1993 | Webster | 351/158 |
| 4,953,305 | 9/1990 | Van Lente et al. | 33/356 | 5,274,501 | 12/1993 | Stroll | 359/613 |
| 4,961,625 | 10/1990 | Wood et al. | 350/174 | 5,276,471 | 1/1994 | Yamauchi et al. | 351/153 |
| 4,961,626 | 10/1990 | Fournier et al. | 350/174 | 5,278,680 | 1/1994 | Karasawa et al. | 359/40 |
| 4,963,827 | 10/1990 | Popovic et al. | 324/251 | 5,281,957 | 1/1994 | Schoolman | 345/8 |
| 4,968,123 | 11/1990 | Fournier et al. | 350/538 | 5,282,318 | 2/1994 | Steiner | 33/355 R |
| 4,969,714 | 11/1990 | Fournier et al. | 353/174 | 5,287,119 | 2/1994 | Drumm | 345/158 |
| 4,969,724 | 11/1990 | Ellis | 350/503 | 5,293,271 | 3/1994 | Merritt et al. | 359/858 |
| 4,970,589 | 11/1990 | Hanson et al. | 358/108 | 5,300,942 | 4/1994 | Dolgoff | 345/32 |
| 4,972,146 | 11/1990 | Eckardt et al. | 324/253 | 5,303,085 | 4/1994 | Rallison | 359/631 |
| 4,972,593 | 11/1990 | Dahlen et al. | 33/356 | 5,305,244 | 4/1994 | Newman et al. | 364/708.1 |
| 4,982,278 | 1/1991 | Dahl et al. | 358/88 | 5,309,169 | 5/1994 | Lippert | 345/8 |
| 4,983,014 | 1/1991 | Nattermann | 350/96.24 | 5,320,538 | 6/1994 | Baum | 434/307 |
| 4,984,179 | 1/1991 | Waldern | 364/514 | 5,321,416 | 6/1994 | Bassett et al. | 345/8 |
| 4,988,981 | 1/1991 | Zimmerman et al. | 340/709 | 5,322,441 | 6/1994 | Lewis et al. | 434/307 |
| 4,993,790 | 2/1991 | Vick | 350/3.73 | 5,323,174 | 6/1994 | Klapman et al. | 345/156 |
| 4,995,165 | 2/1991 | Daniels | 33/361 | 5,327,175 | 7/1994 | Kim | 348/526 |
| 5,003,300 | 3/1991 | Wells | 340/705 | 5,331,149 | 7/1994 | Spitzer et al. | 250/221 |
| 5,005,213 | 4/1991 | Hanson et al. | 455/617 | 5,334,991 | 8/1994 | Wells et al. | 345/8 |
| 5,015,072 | 5/1991 | Howell | 350/276 R | 5,335,299 | 8/1994 | Atkinson | 382/56 |
| 5,019,828 | 5/1991 | Schoolman | 342/457 | 5,347,400 | 9/1994 | Hunter | 359/815 |
| 5,034,809 | 7/1991 | Katoh | 358/88 | 5,351,005 | 9/1994 | Rouse et al. | 324/252 |
| 5,035,473 | 7/1991 | Kuwayama et al. | 350/3.7 | 5,353,042 | 10/1994 | Klapman et al. | 345/156 |
| 5,039,198 | 8/1991 | VanBeek | 385/117 | 5,357,372 | 10/1994 | Chen et al. | 359/637 |
| 5,046,260 | 9/1991 | Wellhausen | 33/356 | 5,373,857 | 12/1994 | Travers et al. | 128/782 |
| 5,046,827 | 9/1991 | Frost et al. | 359/54 | 5,381,603 | 1/1995 | Lee | 33/355 R |
| 5,050,966 | 9/1991 | Berman | 359/38 | 5,383,053 | 1/1995 | Hegg et al. | 359/486 |
| 5,053,755 | 10/1991 | Smith et al. | 340/705 | 5,388,276 | 2/1995 | Holmes | 2/421 |
| 5,059,958 | 10/1991 | Jacobs et al. | 340/706 | 5,392,158 | 2/1995 | Tosaki | 359/633 |
| 5,068,645 | 11/1991 | Drumm | 340/710 | 5,408,346 | 4/1995 | Trissel et al. | 359/65 |
| 5,069,529 | 12/1991 | Takahashi | 359/601 | 5,422,715 | 6/1995 | Clarke | 356/141.3 |
| 5,079,845 | 1/1992 | Childers | 33/363 K | 5,432,626 | 7/1995 | Sasuga et al. | 359/83 |
| 5,081,542 | 1/1992 | Efron et al. | 359/41 | 5,451,976 | 9/1995 | Ito | 345/8 |
| 5,089,903 | 2/1992 | Kuwayama et al. | 359/15 | 5,486,841 | 1/1996 | Hara et al. | 345/8 |
| 5,091,697 | 2/1992 | Roth et al. | 324/253 | 5,526,184 | 6/1996 | Tokuhashi et al. | 359/630 |
| 5,091,719 | 2/1992 | Beamon | 340/705 | 5,528,262 | 6/1996 | McDowall et al. | 345/151 |
| 5,093,567 | 3/1992 | Staveley | 250/221 | 5,696,521 | 12/1997 | Robinson et al. | 345/8 |
| 5,101,298 | 3/1992 | Lentz et al. | 359/612 | 5,774,096 | 6/1998 | Usuki et al. | 345/8 |
| 5,115,345 | 5/1992 | Hobson et al. | 359/601 | | | | |
| 5,121,253 | 6/1992 | Waintroob | 359/601 | | | | |

FOREIGN PATENT DOCUMENTS

| | | | |
|---|---|---|---|
| 5,123,726 | 6/1992 | Webster | 351/201 |
| 91309108 | 10/1991 | European Pat. Off. | |
| 5,124,821 | 6/1992 | Antier et al. | 359/14 |
| 0 461 942 | 12/1991 | European Pat. Off. | G09B 9/32 |
| 5,129,716 | 7/1992 | Holakovszky et al. | 351/50 |
| 0 461 942 A1 | 12/1991 | European Pat. Off. | G09B 9/32 |
| 5,130,794 | 7/1992 | Ritchey | 358/87 |
| 0 477 888 | 4/1992 | European Pat. Off. | G01S 17/87 |
| 5,138,555 | 8/1992 | Albrecht | 364/424.06 |
| 0 479 605 | 4/1992 | European Pat. Off. | G09B 9/30 |
| 5,142,655 | 8/1992 | Drumm | 379/52 |
| 0 519 630 | 12/1992 | European Pat. Off. | G01C 21/20 |
| 5,144,294 | 9/1992 | Alonzi et al. | 340/825.49 |
| 2517916 | 6/1983 | France | H04N 9/54 |
| 5,146,623 | 9/1992 | Paysan et al. | 2/12 |
| 2 636 134 | 3/1990 | France | G01C 21/20 |
| 5,150,104 | 9/1992 | Thomas et al. | 340/686 |
| 2 660 428 | 10/1991 | France | G01C 17/02 |
| 5,151,722 | 9/1992 | Massof et al. | 351/158 |
| 224691 | 7/1910 | Germany | 34/20 I |
| 5,155,627 | 10/1992 | Keehn et al. | 359/609 |
| 1 623 555 | 5/1971 | Germany | G01C 17/30 |
| 5,157,841 | 10/1992 | Dinsmore | 33/361 |
| 2 536 140 | 4/1976 | Germany | G01C 17/10 |
| 5,162,828 | 11/1992 | Furness et al. | 353/122 |
| 3532730 | 3/1987 | Germany | A61B 1/04 |
| 5,162,928 | 11/1992 | Taniguchi et al. | 359/13 |
| 3628458 | 2/1988 | Germany | H04N 1/20 |
| 5,164,848 | 11/1992 | Firth et al. | 359/13 |
| 3 644 681 | 7/1988 | Germany | G01C 21/08 |
| 5,166,778 | 11/1992 | Beamon | 358/3 |
| 3 708 582 | 12/1988 | Germany | G01C 21/08 |
| 5,170,153 | 12/1992 | Migozzi et al. | 340/705 |
| 4 102 896 | 8/1992 | Germany | G01P 13/00 |
| 5,182,817 | 2/1993 | Branum | 2/439 |
| 4225589A1 | 2/1994 | Germany | G09F 9/00 |
| 5,184,231 | 2/1993 | Ellis | 359/13 |
| 59-117889 | 7/1984 | Japan | H04N 9/54 |
| 5,187,871 | 2/1993 | McDermott | 33/354 |
| 59-219092 | 12/1984 | Japan | H04N 9/54 |
| 5,189,512 | 2/1993 | Cameron et al. | 358/93 |
| 62-272698 | 11/1987 | Japan | |
| 5,192,960 | 3/1993 | Komamura | 351/41 |
| 63-82192 | 4/1988 | Japan | |
| 5,198,628 | 3/1993 | Bitko | 200/61.47 |
| 63-177689 | 7/1988 | Japan | |
| 5,198,928 | 3/1993 | Chauvin | 359/465 |
| 1-61723 | 3/1989 | Japan | |
| 5,200,844 | 4/1993 | Suvada | 359/40 |
| 5-46161 | 2/1993 | Japan | G09G 5/36 |
| 5,216,759 | 6/1993 | Hewitt et al. | 2/439 |
| 6-59217 | 3/1994 | Japan | G02B 27/28 |
| 5,227,985 | 7/1993 | DeMenthon | 364/559 |
| 61-10014 | 4/1994 | Japan | C01B 25/45 |
| 5,231,379 | 7/1993 | Wood et al. | 340/705 |
| 1010641 | 4/1983 | U.S.S.R. | G09B 9/04 |
| 5,231,483 | 7/1993 | Sieber et al. | 358/125 |
| 1218416 | 3/1986 | U.S.S.R. | G09B 9/04 |
| 5,239,264 | 8/1993 | Hawks | 324/253 |
| 1399802 | 5/1988 | U.S.S.R. | G09B 9/04 |

| | | | |
|---|---|---|---|
| 1485015 | 6/1989 | U.S.S.R. | G01C 17/00 |
| 1560091 | 4/1990 | U.S.S.R. | A61B 5/103 |
| 1607775 | 11/1990 | U.S.S.R. | A61B 5/11 |
| 1616603 | 12/1990 | U.S.S.R. | A61B 5/103 |
| 1700573 | 12/1991 | U.S.S.R. | G09B 9/04 |
| 2 093 591 | 9/1982 | United Kingdom | G01C 17/28 |
| 2 117 609 | 10/1983 | United Kingdom | G09B 9/00 |
| 2 143 948 | 2/1985 | United Kingdom | G01C 1/00 |
| 2 157 426 | 10/1985 | United Kingdom | G01B 11/26 |
| 2 164 748 | 3/1986 | United Kingdom | G01C 17/08 |
| 2 177 512 | 1/1987 | United Kingdom | G01C 17/28 |
| 2 179 543 | 3/1987 | United Kingdom . | |
| 2 195 180 | 3/1988 | United Kingdom | G01C 17/04 |
| 2266385A | 10/1993 | United Kingdom | G02B 23/10 |
| 2270775A | 3/1994 | United Kingdom | G02B 27/02 |
| 2 279 201 | 12/1994 | United Kingdom | H04R 1/10 |
| 2 281 846 | 3/1995 | United Kingdom | A45F 3/00 |
| 84/01680 | 4/1984 | WIPO | H04N 5/64 |
| WO 92/01276 | 1/1992 | WIPO | G09B 9/10 |
| WO 92/03756 | 3/1992 | WIPO | G02B 27/00 |
| WO 92/15078 | 9/1992 | WIPO | G09B 9/00 |
| WO 92/21117 | 11/1992 | WIPO | G09B 9/34 |
| 93/23783 | 11/1993 | WIPO . | |
| WO 94/11855 | 5/1994 | WIPO | G09G 3/02 |
| WO 94/14152 | 6/1994 | WIPO | G09G 3/02 |
| WO 95/21395 | 8/1994 | WIPO | G02B 27/01 |
| WO 94/24658 | 10/1994 | WIPO | G09G 3/02 |
| WO 95/10061 | 4/1995 | WIPO | G02B 26/10 |
| WO 95/10106 | 4/1995 | WIPO | G09G 3/02 |

OTHER PUBLICATIONS

Antonoff, "Living in a Virtual World", *Popular Science*, Jun. 1993, pp. 83–86, 124–125.

Applewhite, "Position Tracking in Virtual Reality", *Beyond the vision: the technology, research, and business of virtual reality*, Proceedings of Virtual Reality '91, the Second Annual Conference on Virtual Reality, Artificial Reality, and Cyberspace, 1991 San Francisco, pp. 1–8.

Black, "Digi–Compass, Is your house rotating . . . what about your computer?", *Radio Electronics*, Nov. 1989, pp. 43–45, 50–51, 82.

Bridges, "Three–dimensional displays in the future flight station", *SPIE*, vol. 507, 1984, pp. 143–154.

Brooks, "Head Sensor Ideas", Oxford University, Nov. 22, 1991.

Burley et al., "A full–color wide–field–of–view holographic helmet–mounted display for pilot/vehicle interface development and human factors studies", *SPIE*, vol. 1290, 1990, pp. 9–15.

Caristi, "Build An Electronic Compass", *Radio Electronics*, Jun. 1991, pp. 39–42.

Carr, "Is Virtual Reality Virtually Here?", *Training & Development*, Oct. 1992, pp. 37–41.

Casey et al., "Survey of Available Head Tracking Technology", *PCVR*, vol. 1, Issue 5, Sep./Oct. 1992, pp. 2–11.

Clarke, "Cheap Head Orientation Sensors", University of Central Florida, Nov. 25, 1991.

Clarke, "Hybrid Approaches to Orthogonal Localization and Orientation Systems", Small Business Innovation Research Program, Proposal Cover Sheet and Project Summary, Jan. 9, 1992.

Clarke, "Keeping Your Virtual Feet on the Ground", *PCVR*, Issue 13, Jan./Feb. 1994, pp. 13–24.

Deering, "High Resolution Virtual Reality", *Computer Graphics*, 26, 2, Jul. 1992, pp. 195, 197, 201.

"Electrical Devices", Dinsmore No. 1525 Analog Sensor, *R & D Magazine*, Oct. 1991.

Extance et al., "GaAs Magnetic Field Sensors", *IEEE*, 1985, p. 304–307.

Ferrin, "Survey of helmet tracking technologies", *SPIE*, vol. 1456, 1991, p. 86–94.

Fisher et al., "Living in a Virtual World", *Byte*, Jul. 1990, pp. 215–216, 218, 220–221.

Foley, Interfaces for Advanced Computing, *Scientific American*, Oct. 1987, vol. 257, No. 4, pp. 126–135.

The Fredericks Co., specifications, memoranda, and graphs, Nov. 16, 1992.

Garner, "Forum Building the Smart Compass", Oshkosh 1986, Hampton, Virginia, 1986.

Gottschalk, et al., "Autocalibration for Virtual Environments Tracking Hardware", Computer Graphics Proceedings, Annual Conference Series, 1993, pp. 65–72.

Grenoble, "Sensor and logic form digital compass", Dinsmore No. 1490 Digital Sensor, *EDN*, Dec. 6, 1990.

Honeywell, "One–Axis Magnetoresistive Microcircuit HMC1001", specifications, Mar. 1995.

Honeywell, "Two–Axis Magnetoresistive Microcircuit HMC1002", specifications, Mar. 1995.

Horn, "Seeing the invisible", *U.S. News & World Report*, Jan. 28, 1991, pp. 56–58.

James, "Goggles Brighten Dark Subway", *The New York Times*, Apr. 10, 1992.

Jones et al., "Evaluation of conformal and body–axis attitude information for spatial awareness", *SPIE*, vol. 1695, 1992, pp. 146–153.

Kopin Corporation, "Kopin Corporation Affiliate Announces Strategic Alliance With Marubeni Australia Ltd.; Marubeni to Distribute Forte Technologies' VFX1(TM) in the Far East and Pacific Rim Markets", *Business Wire*, May 31, 1995.

Krueger, *Artificial Reality*, 1983 Addison–Wesley Publishing Company, pp. 67–68.

Krueger, *Artificial Reality II*, 1991 Addison–Wesley Publishing Company, Inc., pp. 66–82, 102–116, 130–149, 179–182, 237–239, 267–279.

Lancaster, "Hardware Hacker, A solid–state digital compass", *Radio–Electronics*, Dec. 1988, pp. 33–36, 96.

Lindquist, "Demo 92: From the practical to the playful", *Computerworld*, Feb. 10, 1992, p. 37.

Merritt et al., "Stereoscopic Displays and Applications II", *SPIE*, vol. 1457, 1991, pp. 327–343.

Merritt et al., "Stereoscopic Displays and Applications III", *SPIE*, vol. 1669, 1992, pp. 84–89.

Meyer et al., "A Survey of Position Trackers", *Presence*, vol. 1, No. 2, Spring 1992, p. 173–200.

Micronta, Service Manual, Flux–Gate Electronic Compass Catalog No.: 63–641, 1992, pp. 1–12.

Miller, "Online Interviews Dr. Thomas A. Furness III, Virtual Reality Pioneer", ONLINE, Nov. 1992, pp. 14–15, 17–18, 20–22, 24–27.

Noble, "Electronic fluxgate compass", *Electronics World & Wireless World*, Jan. 1992.

Ono–Sendai Corporation, Specifications, Dec. 22, 1993.

Petersen, "Magnetoresistive sensors for navigation", *IMechE*, C391/028, 1989, pp. 87–92.

Philips Semiconductors, "Magnetic field sensor", Product specification, KMZ10B, Oct. 1994, p. 61, 64.

Pietila et al., "Vector Magnetometer as an Attitude Determining Instrument", NASA Grant NGR 05–017–031, Research Report, Dec. 27, 1974, pp. 1–16.

Primdahl, "The fluxgate magnetometer", *Journal of Physics E: Scientific Instruments,* vol. 12, No. 4, Apr. 1979, pp. 241–253.

Raab et al., "Magnetic Position and Orientation Tracking System", *IEEE,* vol. AES–15, No. 5, Sep. 1979, p. 709–718.

Raman, "Magnetic heading sensor", *Electronics & Wireless World,* Oct. 1988, pp. 1023–1024.

Smith, "VA to Test PC System for Handicapped", *Government Computer News,* vol. 9, No. 6, Mar. 19, 1990, p. 114, ISSN 0738–4300.

Stewart, "Through the looking glass into an artificial world—via computer", *Smithsonian,* vol. 21, No. 10, Jan. 1991, pp. 36–45.

Sutherland, "A head–mounted three dimensional display", Fall Joint ComputerConference, 1968, pp. 757–763.

Travers, "Consumer Markets—The Cybermax HMD", *Virtual Reality,* 1994.

"Virtual Reality Resource Guide", *AI Expert,* Aug. 1992, pp. 42–47.

"Airlines Weigh Benefits, Costs of At–Seat Video", *Aviation Week & Space Technology,* Aug. 15, 1994, pp. 44–45.

Antonorff, "Real estate is cheap here, but the places you'd most want to visit are still under construction", *Popular Science,* Jun. 1993, pp. 83–86, 124–125.

Assenheim et al., "Large–Screen–Projection, Avionic, and Helmet–Mounted Displays", Proceedings, The International Society for Optical Engineering, Feb. 26–28, 1991, vol. 1456, pp. 179–180.

Benton, "Practical Holography VIII", Proceedings, The International Society for Optical Engineering, Feb. 7–9, 1991, vol. 2176, pp. 241–248.

Burley, et al., "A full–color wide–field–of–view holographic helmet–mounted display for pilot/vehicle interface development and human factors studies", *SPIE,* vol. 1290 Helmet-–Mounted Displays II (1990), pp. 9–15.

Driscoll et al., *Handbook of Optics,* McGraw–Hill Book Company, 1978, p. 13–6.

Farmer, "The right solution to the right problem . . . now", *Comdex Daily,* Nov. 15, 1994, p. 4.

Fischer, "Fundamentals and Optics for Head Mounted Displays", Photonics West '95, Feb. 4–10, 1995.

Horn, "Seeing the invisible", *U.S. News & World Report,* Jan. 28, 1991.

Pope, "Say ahhh! Videos help you relax", *The Times–Picayune,* Oct. 25, 1994, pp. 1, A–6.

Rotier, "Optical Approaches to the Helmet Mounted Display", *SPIE,* 1989, vol. 1116, pp. 14–17.

Siggraph, *Nikkei Electronics,* Aug. 22, 1994, pp. 13–14.

Starks, "Stereoscopic video and the quest for virtual reality: an annotated bibliography of selected topics", *SPIE,* vol. 1457 Stereoscopic Displays and Applications II (1991), pp. 327–343.

"Survey of Head Mounted Displays", *Real Time Graphics,* Aug. 1994, vol. 3, No. 2, pp. 1, 8–12.

Virtual I/O, "i–glasses!", *Twice CES Daily,* Jan. 6, 1995, p. 30.

Virtual I/O. Specifications, *Virtual Reality World,* Nov./Dec. 1994, p. 11.

Virtual I/O, *VR News,* "Tele–Communications Inc. to market test Virtual I/O HMDs for cable TV applications", Aug./Sep. 1994, p. 17.

*VR News,* Dec. 1994, vol. 3, Issue 10, pp. 4, 8, 12.

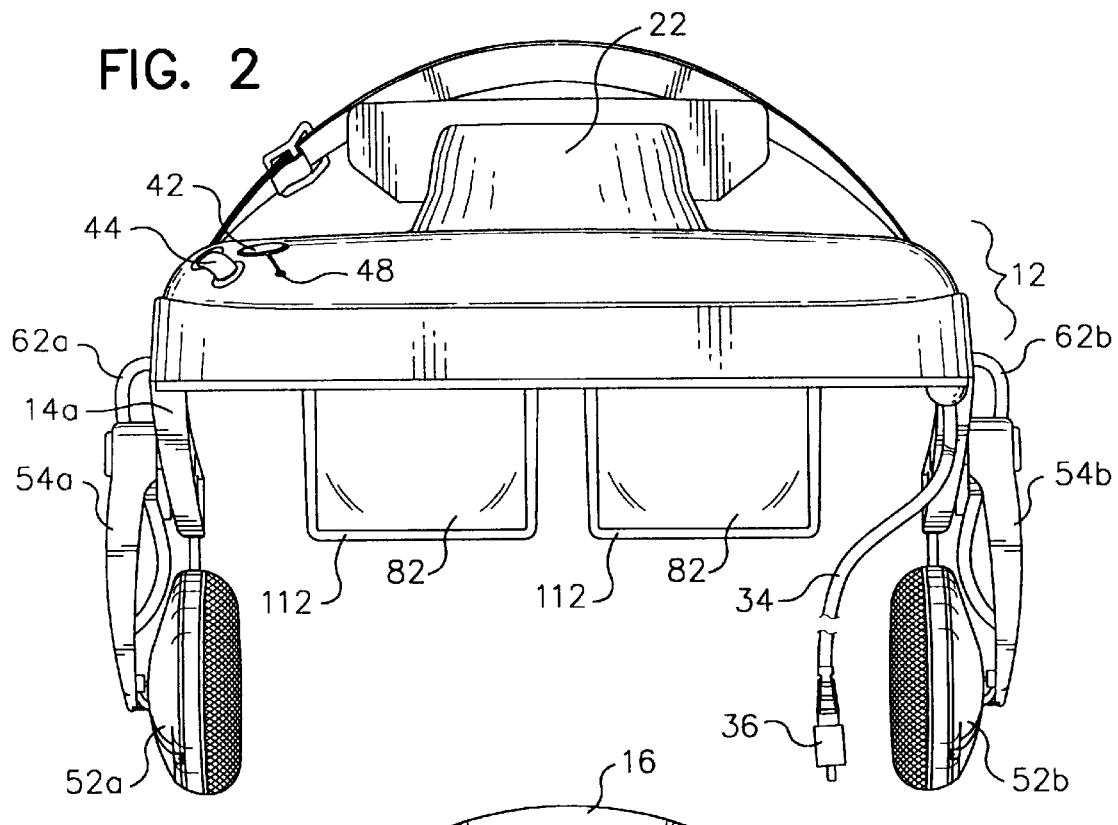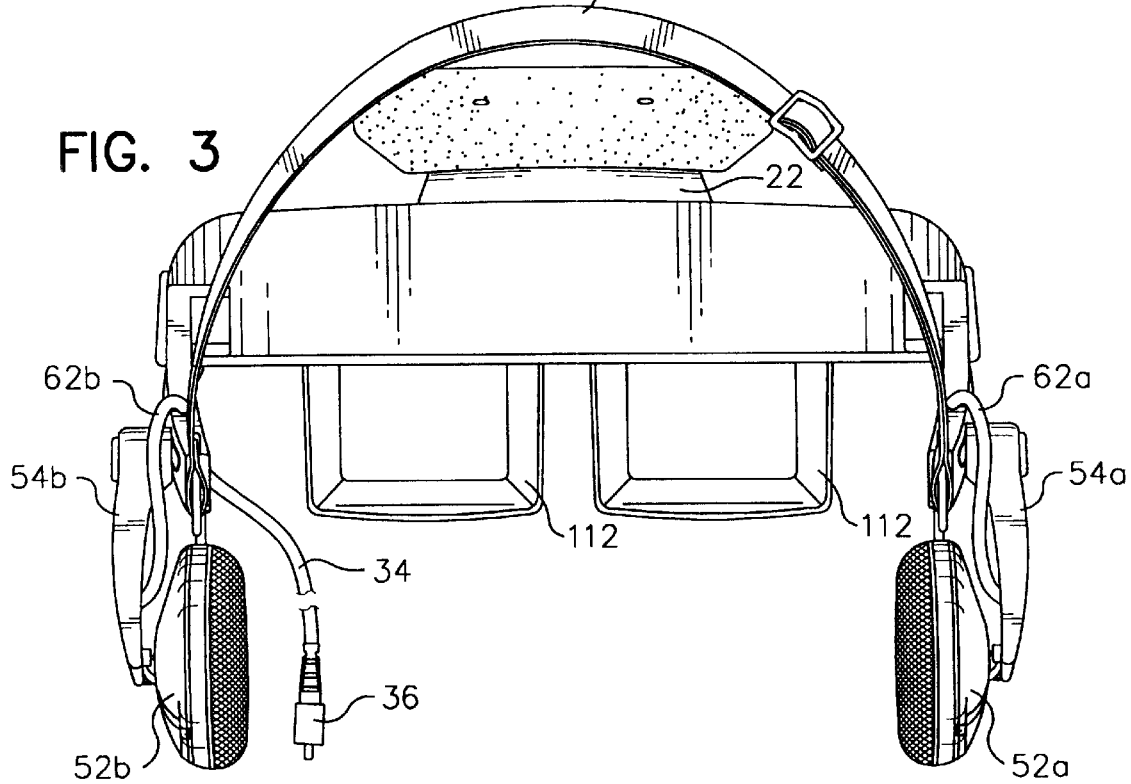

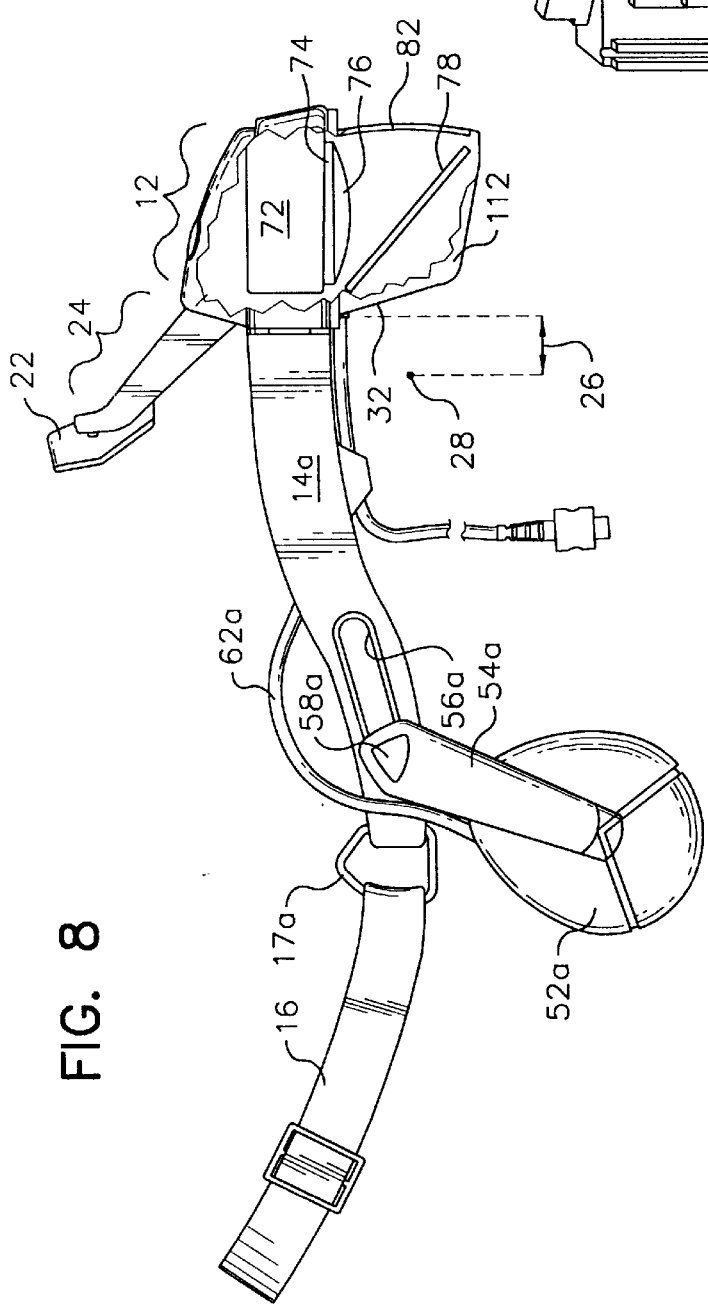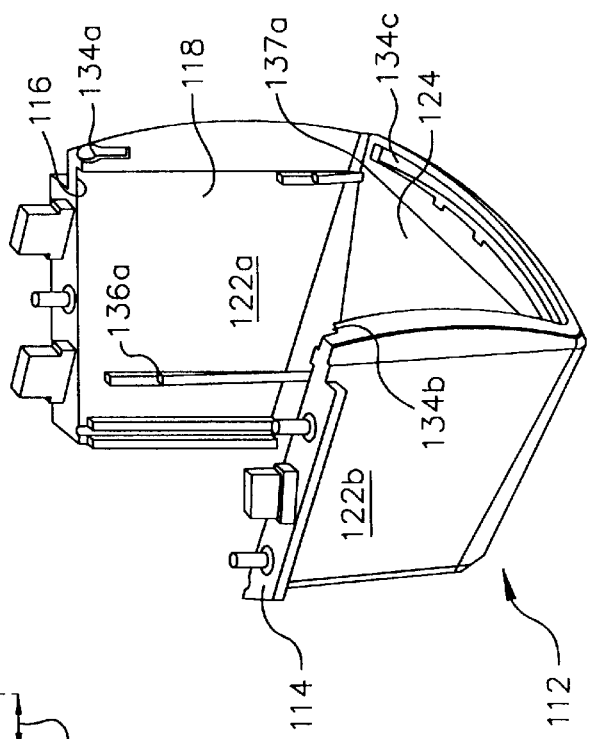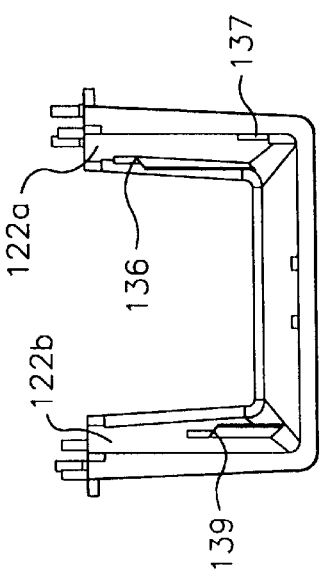

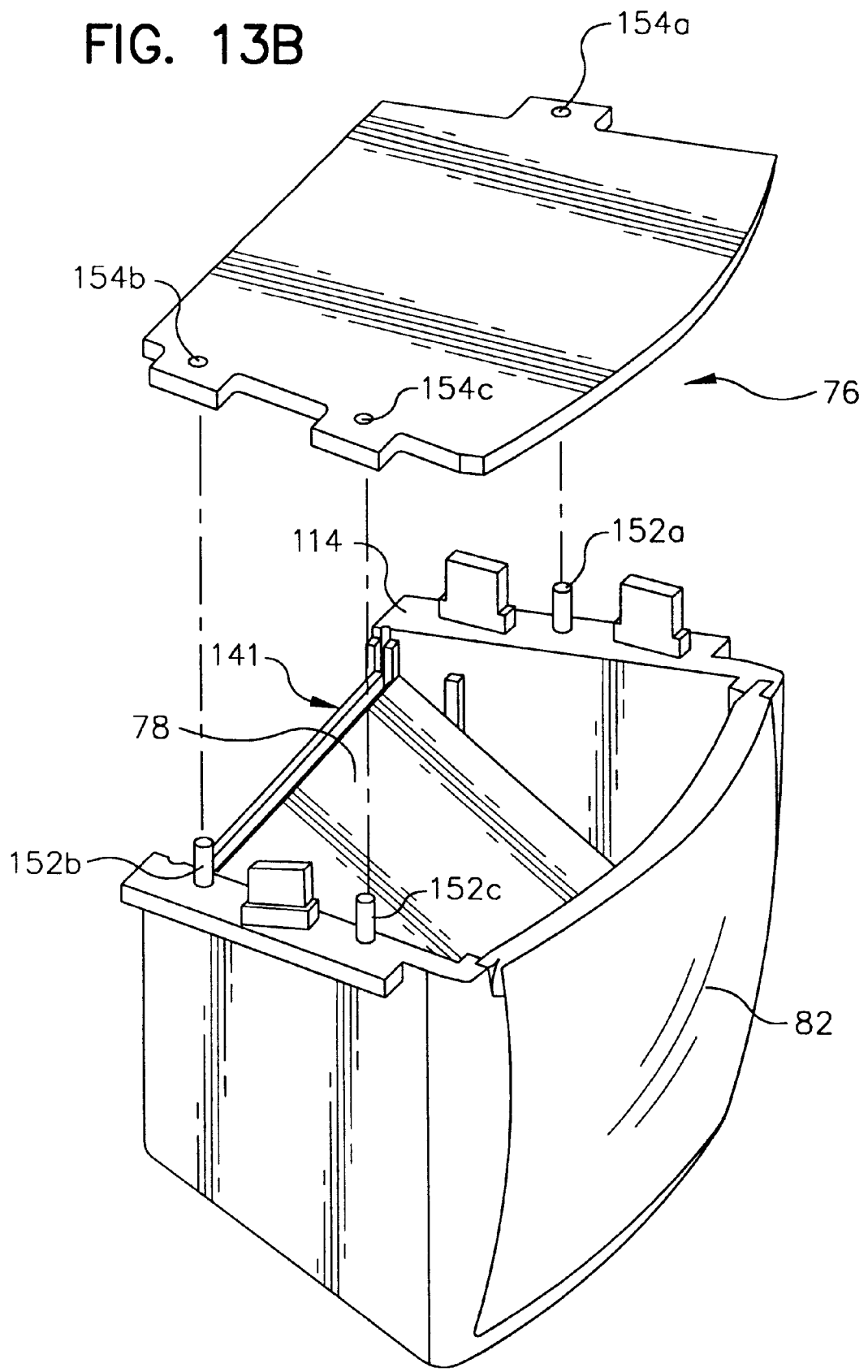

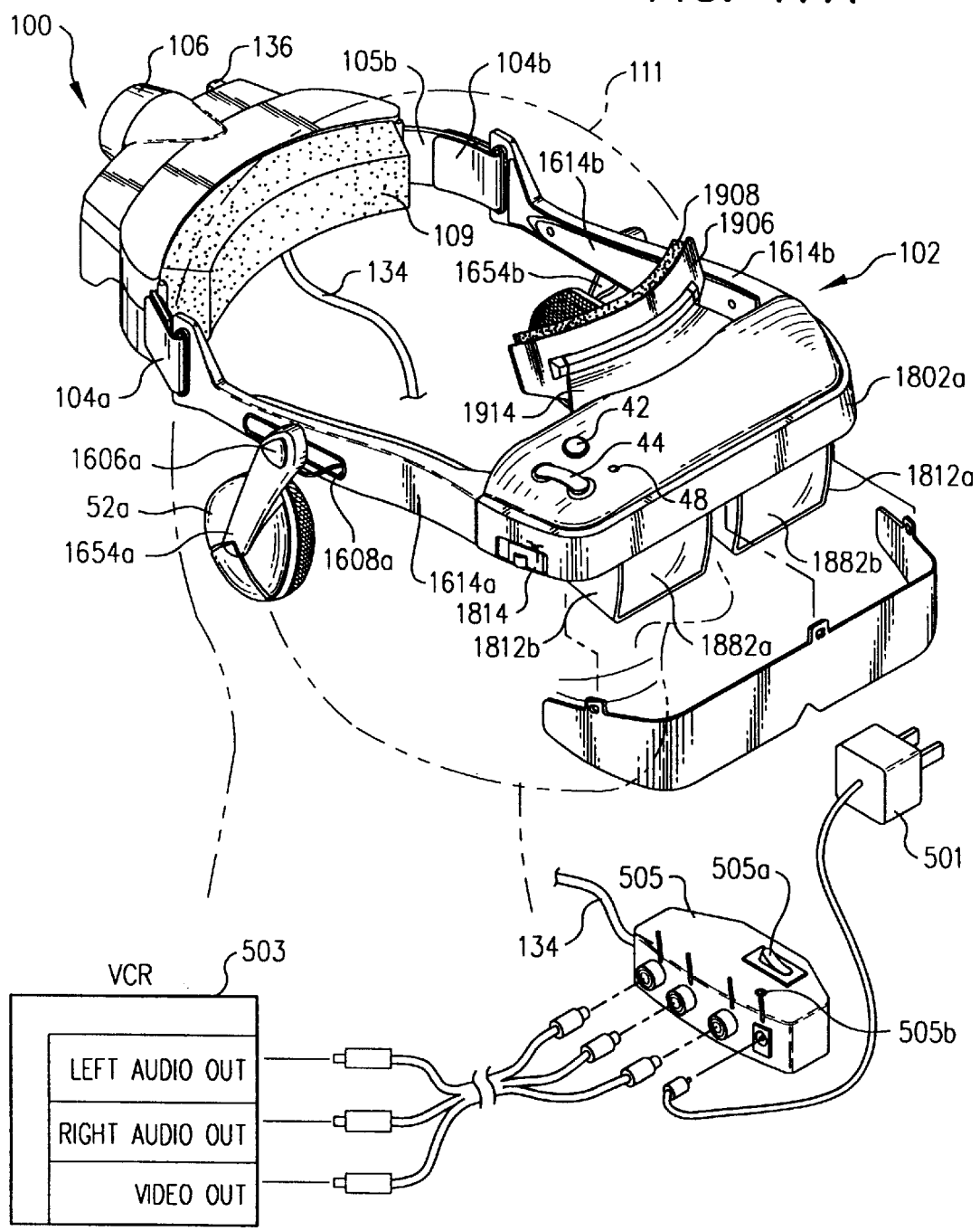

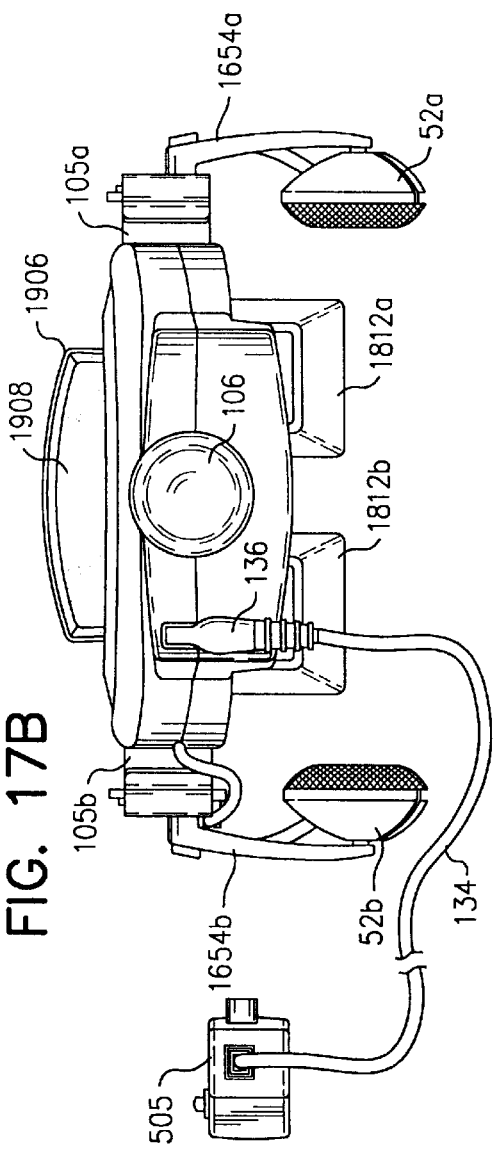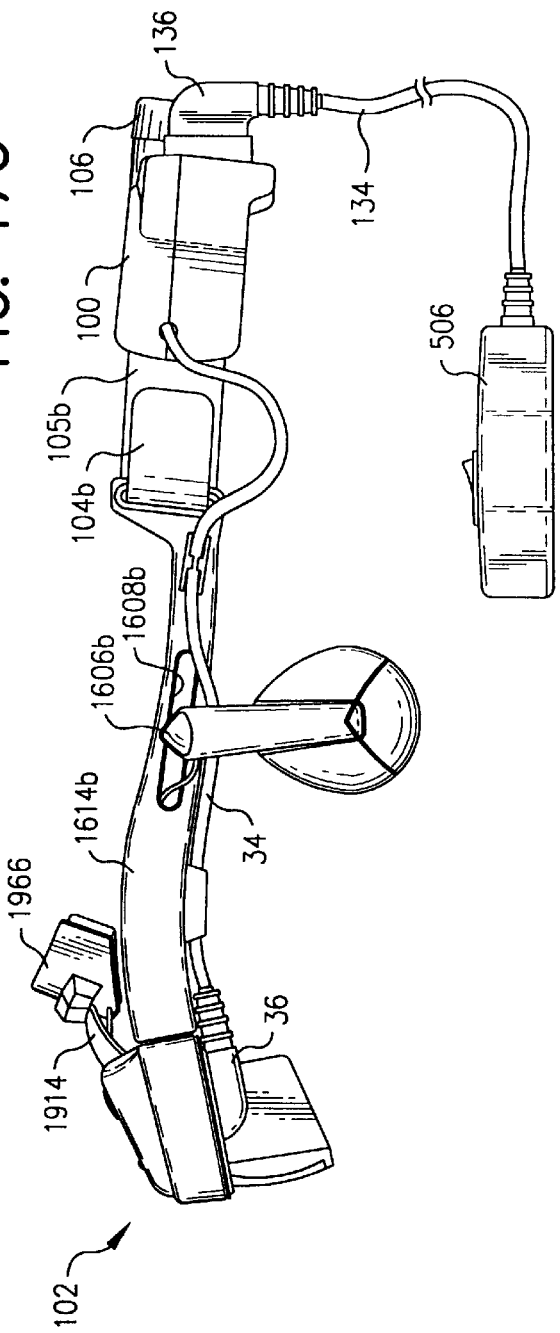

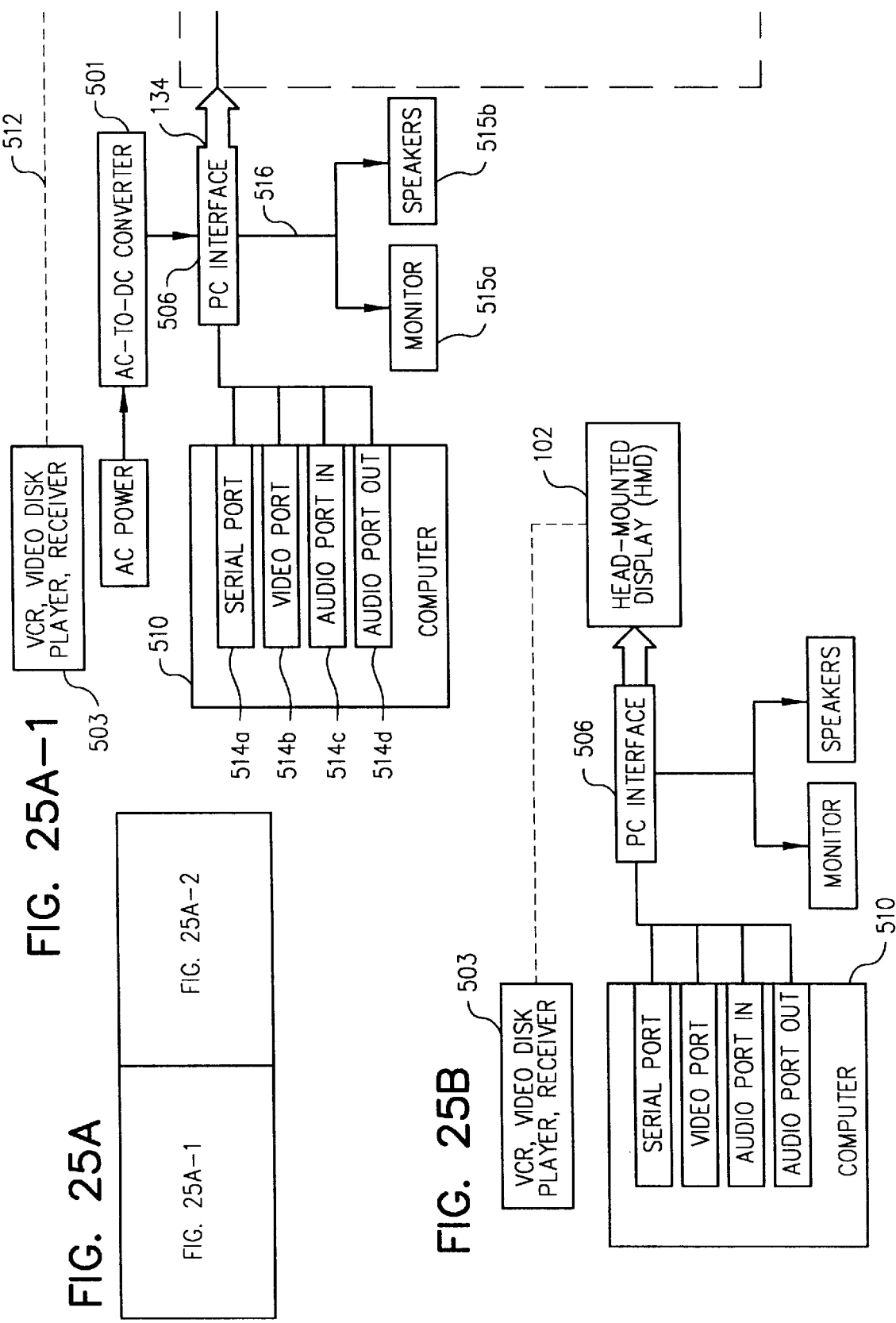

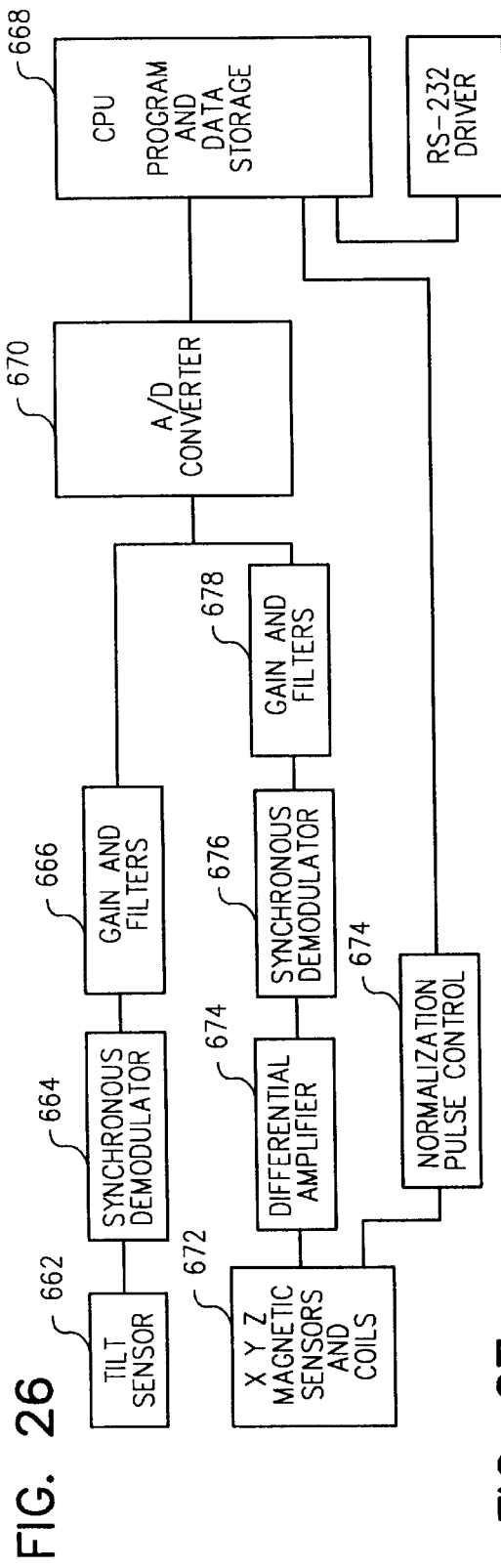

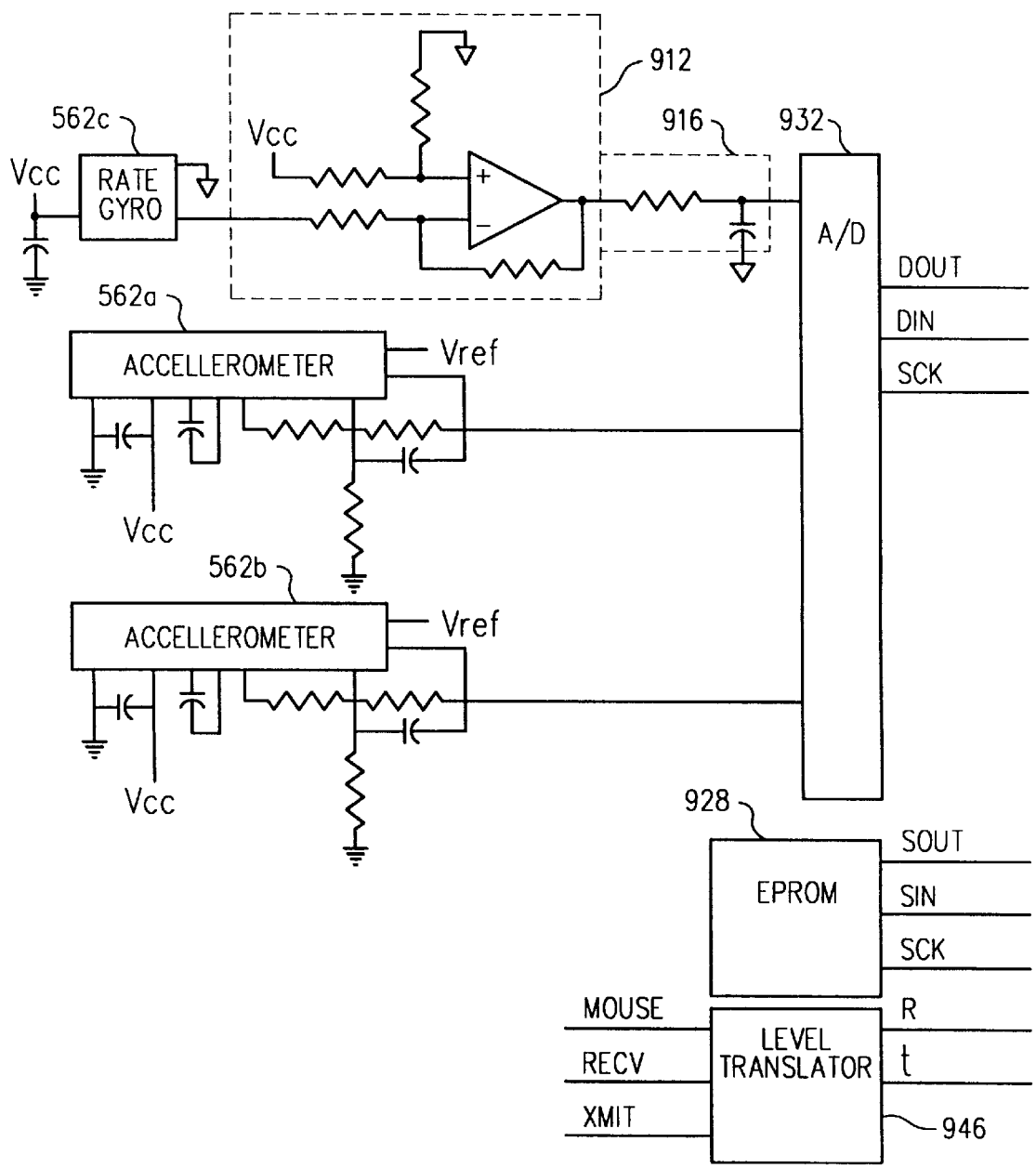

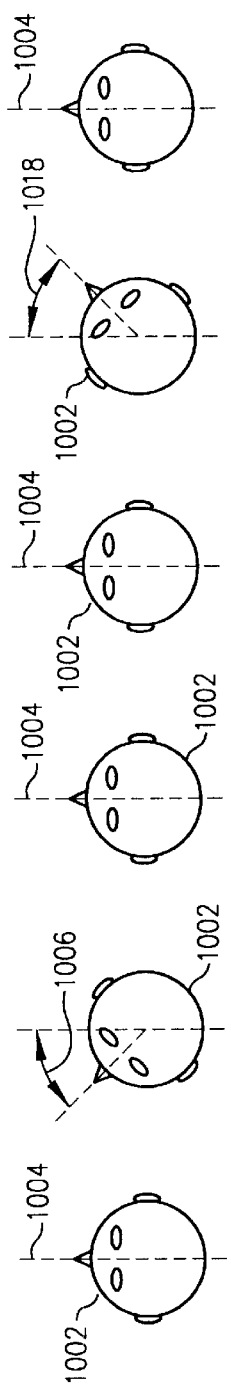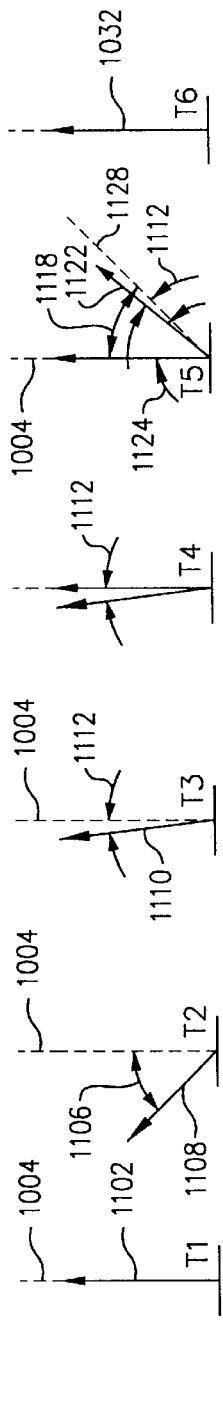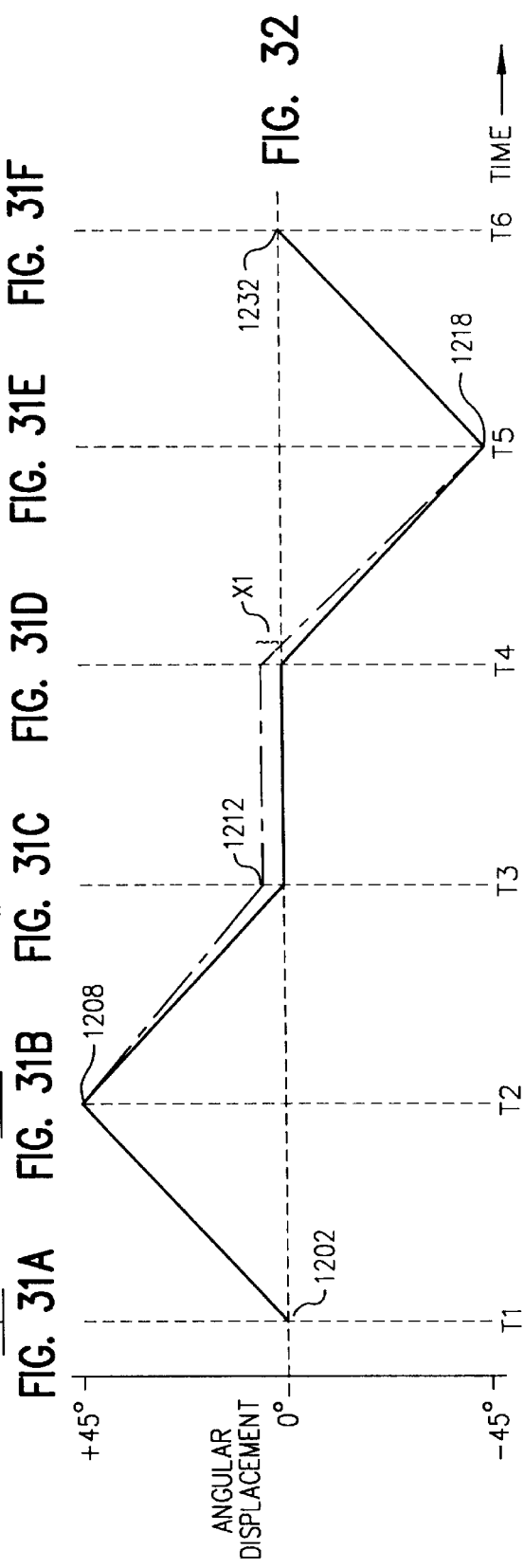

HEAD-MOUNTED PERSONAL VISUAL DISPLAY APPARATUS WITH IMAGE GENERATOR AND HOLDER

This patent application is based, in part, on U.S. Provisional Application Ser. No. 60/001,151 (attorney docket number 91193/91000) filed Jul. 14, 1995 by Eric Tseo, Douglas Donaldson and Robert T. Etter for Head Tracker for Head-Mounted Display, commonly assigned herewith and incorporated herein by reference, for which priority is claimed under 35 U.S.C. 119(e), and is a continuation of PCT/US95/11344 filed Aug. 31, 1995, which is a continuation-in-part of U.S. patent application Ser. No. 08/416,919, now U.S. Pat. No. 5,903,395, filed Apr. 21, 1995. Cross reference is made to U.S. Design Application Ser. No. 29/027,898, filed Aug. 31, 1994, and Design Application Ser. No. 29/043,936 filed on Aug. 31, 1995, both incorporated herein by reference.

This invention relates to visual displays which preferably can combine generated images with a view of the environment surrounding a user and transmit such combined visual information to the eye position of the user.

BACKGROUND INFORMATION

It is often desirable to provide people with visual information. Frequently, one wishes to superimpose such visual information upon a view of the real world. In other applications, it is desired to shield the user from a view of the environment, providing an exclusive view of the visual information. Such displays may include a number of components including, in a form known as a folded catadioptric display, an image generator, a beam splitter which receives the image light from the image generator, often via a series of lenses and other optic elements and sends a fraction, designated the reflected fraction, of such image light to a reflective combiner that is either non-transmissive or both allows light from the real world to pass through such combiner and reflects the image light such that both the real-world light and the image light are transmitted to the eye of the user through the beam splitter, often via another series of lenses or other optical elements. The beam splitter will transmit a fraction, designated the transmitted fraction, of the image light reflected from the collimator-combiner. In embodiments in which the combiner is at least partially transmissive, a fraction of the real-world light is also transmitted by the beam splitter.

Previous devices included a number of additional components. Some devices have included corrective optical elements. Other devices have included a depixelator, e.g., as described in PCT/US94/01390 filed Feb. 7, 1994 for "Depixelated Visual Display" (incorporated herein by reference). Still other devices have included apparatus for intensifying the visual display such as those described in PCT/US94/01391, filed Feb. 7, 1994 for "Intensified Visual Display" (incorporated herein by reference).

In designing a system for providing a generated image to the eye or eyes of a user, various factors are often in opposition. Although it is desirable to provide an image which has high quality so as to not only provide a pleasing and attractive display for the user but also to reduce eyestrain, very often the techniques used to produce such a high quality image have been contrary to goals of an apparatus which is lightweight, low-cost, and relatively easy to design, fabricate and/or repair. Many previous devices have required expensive and heavy series of optical elements such as lenses to achieve a desired picture quality. Other devices have simply accepted a lower-quality image in order to achieve goals of low-cost or light weight. For example, some previous devices have failed to provide a flat focal field to the user. Others have resulted in a poor image contrast, particularly at high viewing angles of the image. Many devices have deprived the user of the full image in order to mask-off unwanted light near the edge of an image generator.

Accordingly, it would be useful to provide a personal, visual display apparatus which provides a high quality of image, which is low cost, lightweight, comfortable and has increased ease of design, fabrication, repair and the like.

In many uses of a head mounted display, it is desired to collect information regarding the position, posture, orientation, attitude, location and/or movement of the user's head. This information can be used to control the image generated to the eyes of the user for a number of purposes, such as to provide a "virtual reality" or simulated environment to the user, to allow the user to navigate through various displayed images to observe a simulated object from various angles and the like. For example, this information can be used to control the characteristics of the image shown in a head-mounted display or other virtual reality device, such as to produce changes in the image that would correspond to movement of the user's head. For example, in a flight simulator program, when the user's head rotates from a straight ahead position to a 90° left position, the display should change from a display simulating a forward view, out the cockpit window, to a display simulating a view over the left wing of the aircraft.

Head trackers have been attempted in the past, such as those described in U.S. Pat. Nos. 5,373,857; and 5,345,944. However, many previous head trackers have suffered from a number of deficiencies. In some devices, head trackers were formed as an integral part of a head-mounted display and were not readily detachable. This, however, led to head-mounted displays which are heavier than necessary when used in applications where head tracking is not needed or desired. Furthermore, integral head trackers add to the cost of a head-mounted display in a manner which may be unnecessary for some uses when head tracking is not desired.

Some head tracking devices have included mounting some of the components in positions which do not provide a desirable balancing of weight in the head-mounted display device, such that there may be an undesirable neck strain for the user.

Some previous head trackers provided communication to the computer which was difficult for the end user to install and/or awkward in operation. For example, in some devices, it was required that the user install a card inside the chassis of a personal computer (PC) which, effectively, meant that many users would need to make a trip to a computer service facility.

In a configuration in which communication from the head tracker to the computer is via a cable which is separate from the head-mounted display cable, the user must wear a device which is "tethered" via two separate cables, which can tangle and inhibit free movement of the user. In devices where a single cable provides for communication of both head tracker and video information, the head tracker was not readily detachable from the head-mounted display.

In some previous devices, the output from the head tracker was provided in only a single format and the software which employed head tracker information had to be written so as to accommodate that data format.

In some devices, a head tracker used magnetic sensors. While magnetic sensors can be useful in many situations, head tracking information may be distorted by spatial variations and/or changes in the local magnetic field, such as may arise from adjustment of earphones or other audio output devices.

Accordingly, it would be useful to provide a head tracker which is of modular or detachable construction, can be located in a well-balanced position, provides for communication with the computer in a fashion which is easy for the end user to install and avoids awkwardness of use, reduces or eliminates errors from magnetic field changes and/or which provides output in a number of different output formats.

SUMMARY OF THE INVENTION

One embodiment of the invention is a head-mounted display (HMD) that can project an image from an image generator such as a cathode ray tube (CRT) or a liquid crystal display (LCD) to one or both of the eyes of the observer or both transmit such an image and combine it with a direct view of the surrounding environment. The combiner images a CRT or LCD display surface mounted above the eye with a simple metallic, dielectric or holographic fold mirror reflecting the image towards the combiner.

According to one aspect of the present invention, the device simplifies the imaging optics by reducing the total number of elements. One embodiment of the invention consists essentially of an image generator such as a CRT or LCD, a combiner such as a spherical metallic, dielectric or holographic combiner or collimator-combiner and a fold mirror such as a metallic, dielectric or holographic fold mirror.

In one embodiment, few optical elements are needed to achieve the desired high quality image. Preferably, the visual display is simplified and made lightweight and less expensive by eliminating the need for certain optic elements such as relay lenses or additional corrective refractive optics. In one embodiment, a visual display provides for monochromatic and/or three-color display without refractive optics, such as by using reflective imaging optics only.

Because the weight of the device required for image display is low, it is possible to include any or all of a number of additional functions while maintaining a relatively light device, including functions such as headtracking, eyetracking, three-dimensional display decoding or other 3-D capability, ability to be used by a wide range of sizes and shapes of users, compatability with both computer and video source material, comparability with eyeglasses and the like.

In one embodiment of the invention, the apparatus provides a high-quality image while using a lightweight and visually attractive configuration. In one embodiment, the apparatus is a glasses-like structure with optics configured to deliver an image to the user's eye position, preferably to deliver generated images to the left and right eyes of a user, and with temple pieces projecting backward on each side of the user's head in the fashion of eyeglasses. A strap may be used to assist in holding the device in a desired location. Headphone-like loud speakers are positionable near the user's ears to provide simultaneous video and audio to the user. In one embodiment, a brace is used to contact the user's forehead to further assist in proper positioning and weight-bearing. This configuration is particularly useful when it is desired to leave enough space between the apparatus and the user's eyes to accommodate ordinary eyeglasses. Preferably, various controls are available such as being mounted on the headmountable apparatus. These can include, for example, a mute button such as an audio and video mute, volume control, image selector and the like. Preferably, the temple pieces can be folded, similarly to folding of typical eyeglasses to achieve a compact storage or carrying configuration.

In one embodiment, the display device is modifiable by addition, preferably snap-on addition, of further components. For example, a light shield may be snapped on to convert a see-through display into an immersion display. Head position tracker components can be added to provide an indication, e.g., to a computer and/or video game device, of the orientation, movement, and/or location of the user's head.

In one embodiment, an optical element is configured to reduce or eliminate loss of image contrast such as that which may occur from an image generated by a backlit LCD display, particularly near the edges of the image. In one embodiment, a color display with high density is provided by the combination of a white or monochrome display coupled with a color shutter. In one embodiment, the shutter is located spaced from the screen or output plane of the image generator, and may be positioned substantially immediately in front of the eyes of the user. In another embodiment the shutter is located adjacent to the image generator output plane or to an optical element, such as a field curvature correction lens, which is adjacent to the image generator output plane.

According to one embodiment, shrouds provide proper shielding, holding and alignment of various components of the device. A shroud can be configured to not only block stray light but also to hold, for example, a fold mirror and/or combiner. In one embodiment, two or more masks are provided for the image generator to achieve elimination of unwanted light source angles without masking desired portions of the image. Preferably, such masks are provided as a unitary piece which can also function to hold other elements such as the LCD or other image generator, a light source, a lens, etc. By providing for an adjustment in the position of such a holder, it is possible to correct positional disparity, particularly vertical positional disparity between the left and right image generators when the apparatus is used in a binocular fashion.

According to one embodiment of the invention, tracking devices are configured so as to permit the user to attach and detach the tracking devices as desired. In one embodiment the head tracker can be mechanically coupled to a head-mounted display by a simple coupling such as a hook and loop type of coupling. Preferably, the head tracker can be located at the back of the head to act as a partial counter-weight to the video electronics and optics which are typically mounted near the front of the head. In one embodiment the head tracker contains pass-through wiring or circuitry so that a single cable provides communication between the host computer and the tracker/HMD but such that, when the tracker is detached, a single cable can be unplugged from the tracker and coupled to the computer for providing communication between the computer and the HMD. Preferably communication with the computer is accomplished via commonly-available ports such as a serial port, video port, and/or audio ports, and it is not necessary to install a card or other hardware device in the host computer.

Preferably, data is output from the tracker in a variety of user-selectable formats including hardware-filtered, hardware- and software-filtered, Euler, and mouse-emulation formats, in either polled or streaming fashion.

A number of sensor technologies can be used for sensing head movement or position including magnetic sensors, inertial sensors and mechanical sensors. In one embodiment, inertial sensors are used for both yaw sensing and pitch/roll sensing such as by using a rate gyro for yaw sensing and two accelerometers for sensing pitch and/or roll, respectively. Other embodiments include using a rate gyro for detecting yaw and one or more gravimetric sensors for detecting pitch and/or roll, and using a magnetic sensor for detecting yaw and inertial sensors (such as one or more accelerometers) for detecting pitch and/or roll. In another embodiment, magneto resistors are used for yaw sensing and gravimetric sensors are used for pitch and roll sensing. In one particular embodiment, three pairs of orthogonally-mounted magnetoresistive sensors, each pair forming two legs of one of three Wheatstone bridges provide yaw detection. Preferably, fewer than three normalizing coils are required, such as by using one normalizing coil for normalizing two of the three pairs of magnetoresistors.

BRIEF DESCRIPTION OF THE DRAWINGS

FIG. 3 is a rear view of the apparatus of FIG. 1;

FIG. 8 is a plan view similar to that of FIG. 4 but having portions cut away to show interior components thereof;

FIG. 10 is a perspective view of an optical shroud according to one embodiment of the present invention;

FIG. 11 is a front view of an the optical shroud of FIG. 10;

FIG. 13B is a partially exploded perspective view of the optical shroud of FIG. 10, fold mirror, combiner and field curvature correction lens;

FIG. 25B is a block diagram of a display system including an HMD;

FIG. 26 is a block diagram of a magnetic tracker system according to one embodiment of the present invention;

FIG. 28 is a block diagram of a PC interface device connected to a PC and peripherals;

FIGS. 30A–30F are schematic top plan views of the head of a user showing positions at six times;

FIGS. 31A–31F are schematic representations of the relationship of a direction indicated by a tracker with respect to a reference direction corresponding to the times represented by FIGS. 30A–30F; and FIG. 32 is a graph of head position angular displacement shown in sold line and tracker-indicated displacement, shown in dash-dot line for time periods corresponding to the times depicted in FIGS. 30A–30F.

DETAILED DESCRIPTION OF THE PREFERRED EMBODIMENT

Figure 1:
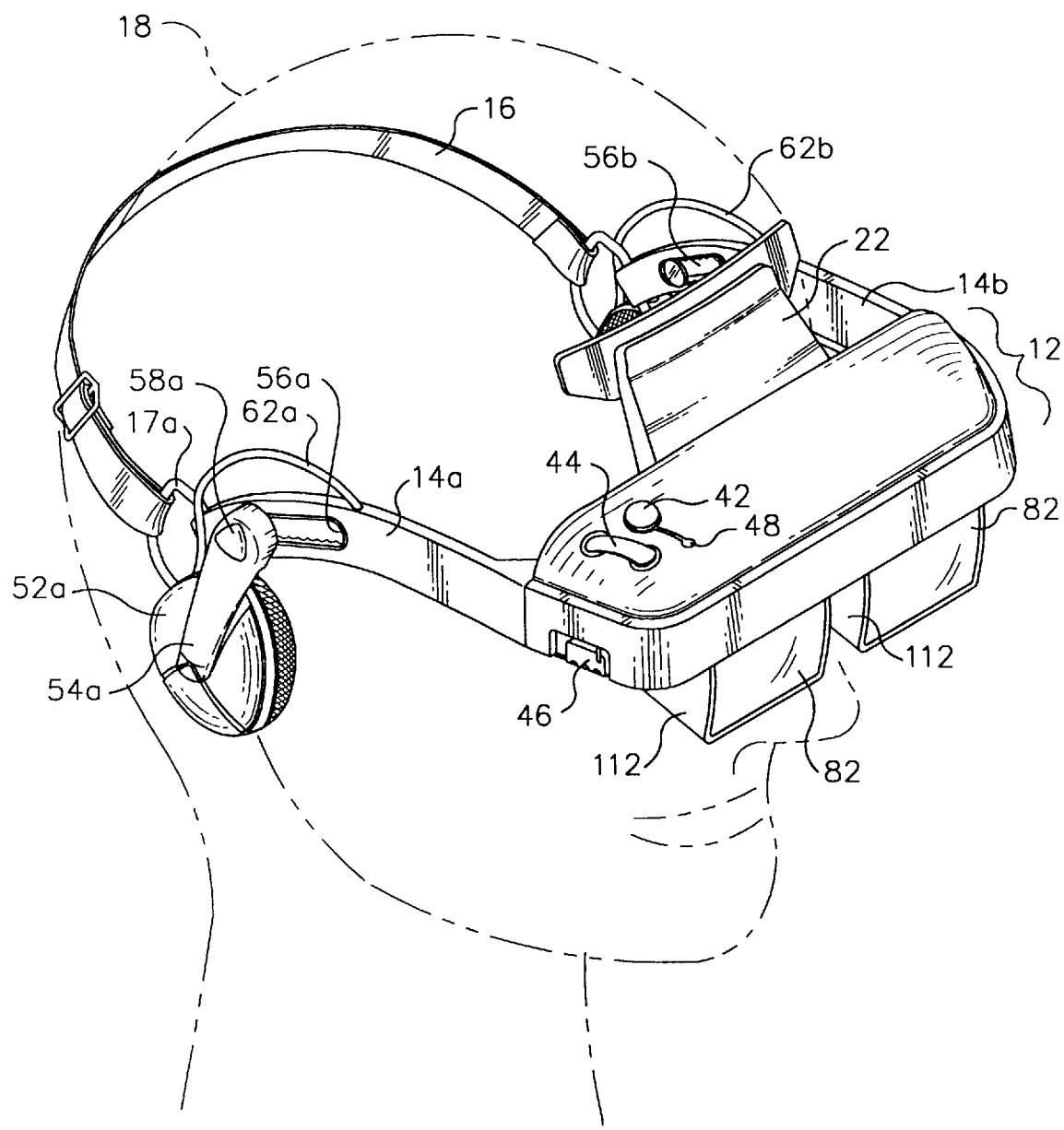
FIG. 1 is a perspective view of a head-mounted display according to one embodiment of the present invention.
Figure 4:
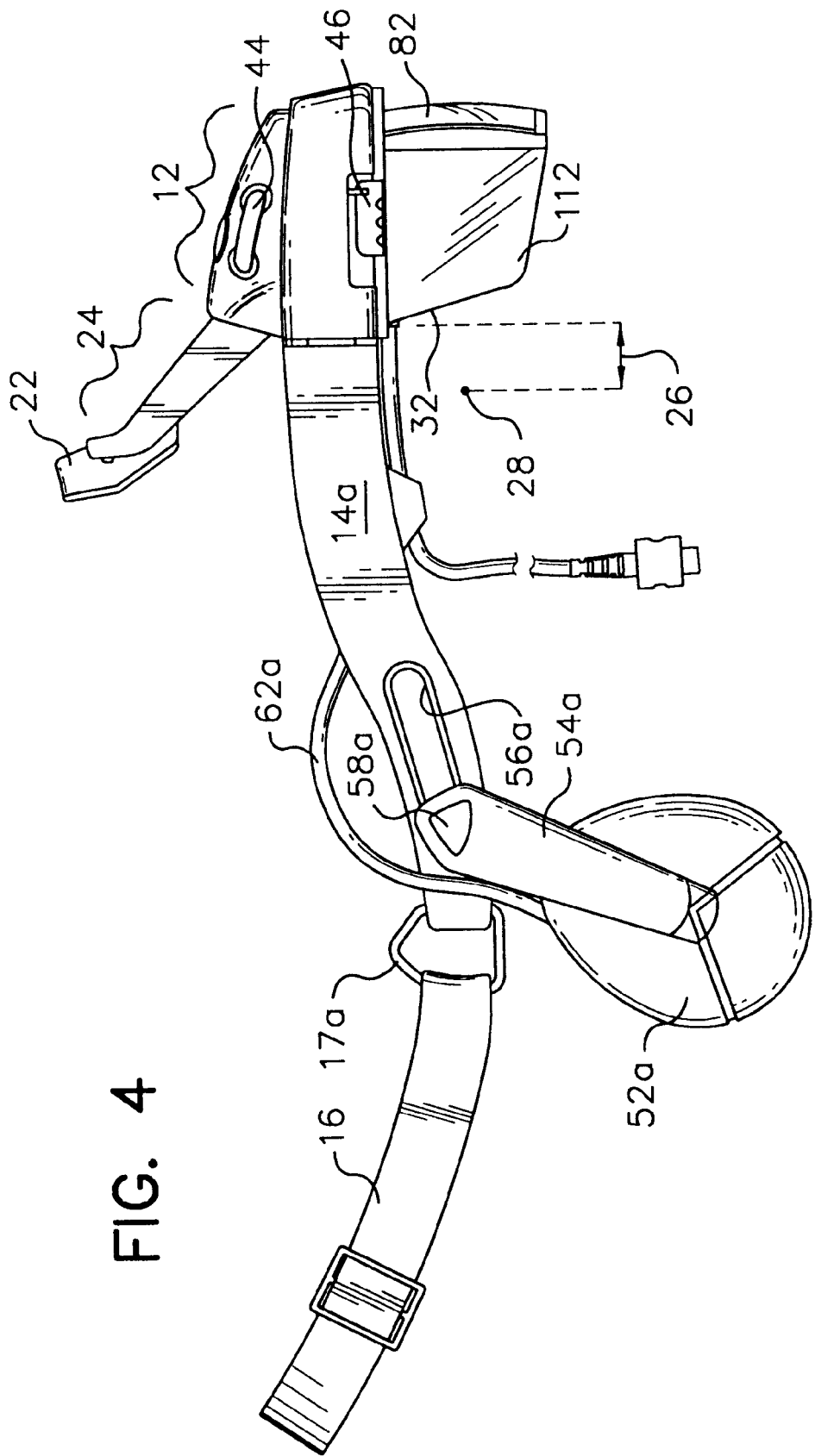
FIG. 4 is a right side elevational view of the apparatus of FIG. 1.
Figure 5:
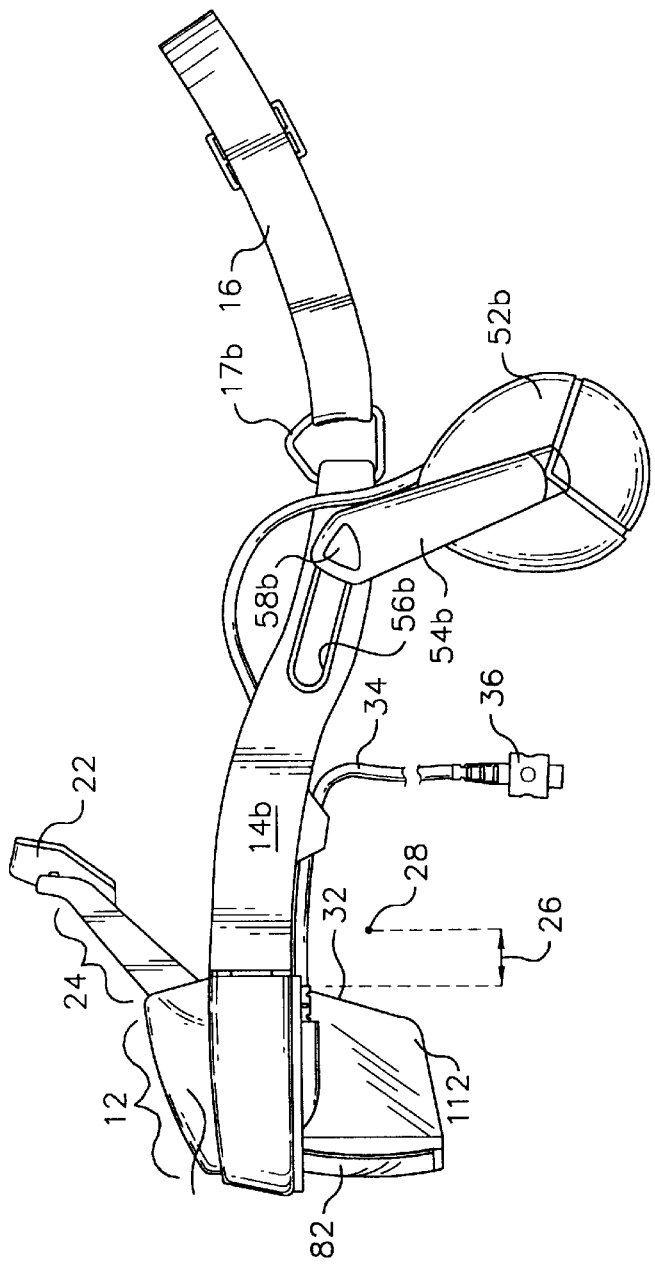
FIG. 5 is a left side elevational view of the apparatus of FIG. 1.
Figure 19:
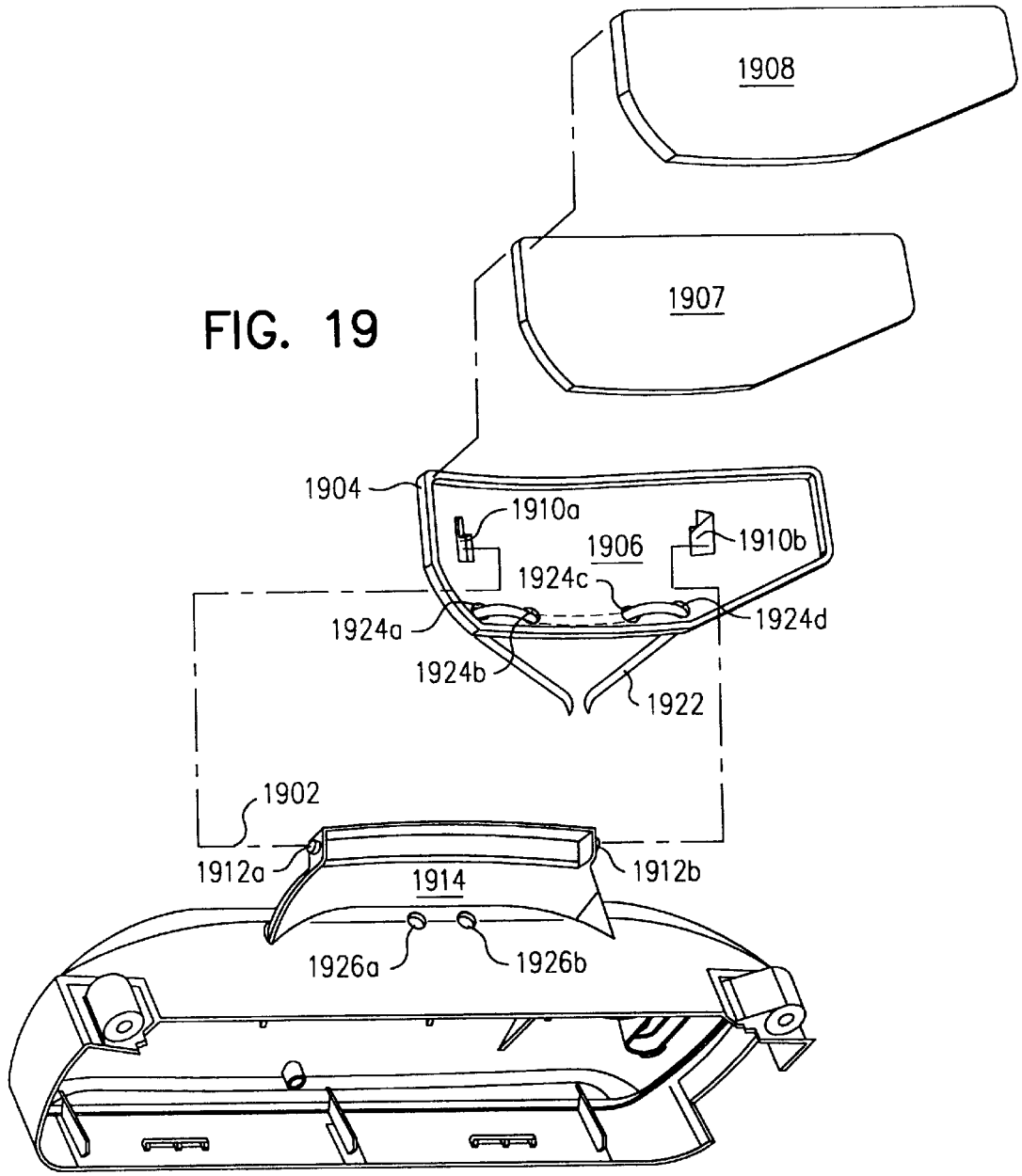
FIG. 19 is an exploded perspective view of an HMD forehead brace and upper housing according to an embodiment of the present invention.

As depicted in FIG. 1, one embodiment of the present invention provides a main component 12, preferably containing some or all of the electronics or optics used for the visual display and left and right temple pieces 14a, 14b. The temple pieces may be used for assisting and holding the main portion 12 in the desired position to deliver video output to the user's eyes. A strap 16 can be provided to further assist in holding the apparatus in the desired position with respect to the head 18 of the user. A forehead brace 22 can be provided to further assist in proper positioning of the main portion 12. The forehead brace 22 is useful to transfer some of the weight of the apparatus to the user's forehead. This may provide a more comfortable configuration than having substantially all of the weight transferred via other components such as the temples 14a, 14b, headstrap 16 and/or a nose bridge piece such as may be used in some devices. As can be seen in FIGS. 4 and 5, the forehead brace 22 extends back a distance 24 from the main portion 12 of the apparatus. As a result, there is an amount of space 26 or "eye relief" between the eye position of the user 28 and the portion of the apparatus 32 which resides in front of the user's eyes, preferably sufficient to accommodate the user's eyeglasses, e.g., about one inch or more (in one embodiment, about 28 mm). In the embodiment depicted in FIG. 1, the forehead brace 22 includes an upward extending and slanted bracket portion and a forehead contact portion. In one embodiment, the forehead contact portion is coupled so as to be pivotable, e.g. about axis 1902 (FIG. 19). If desired, the contact plate 1904 may be urged to a desired pivoted position, e.g. to avoid improper positioning of the forehead brace during use. A number of devices can be used to provide such an urging force including springs, elastic bands or ropes, pneumatic or hydraulic devices, living hinges and the like. In the depicted embodiment elastic shock cord 1922 is threaded through openings 1924a, 1924b, 1924c, 1924d and anchored through holes 1926a, 1926b. In the depicted embodiment the inner surface 1906 of plate 1904 is covered with a pad 1908 which may be coupled to the plate 1904 via an intermediary connecting material 1907 such as a hook and loop material (e.g. Velcro®), an adhesive material or by snaps, spot welding, peripheral crimping and the like. The plate 1906 includes receptacles 1910a 1910b (engaging with pivot pins 1912a 1912b on the bracket 1914). Providing a spacing device 1908 which is removable from the plate 1906, enables the user to install pads of various thicknesses, e.g. in order to adjust the distance which the HMD is positioned in front of the user's face, and thus to adjust the amount of eye relief 26, for example, to accommodate children.

Figure 15:
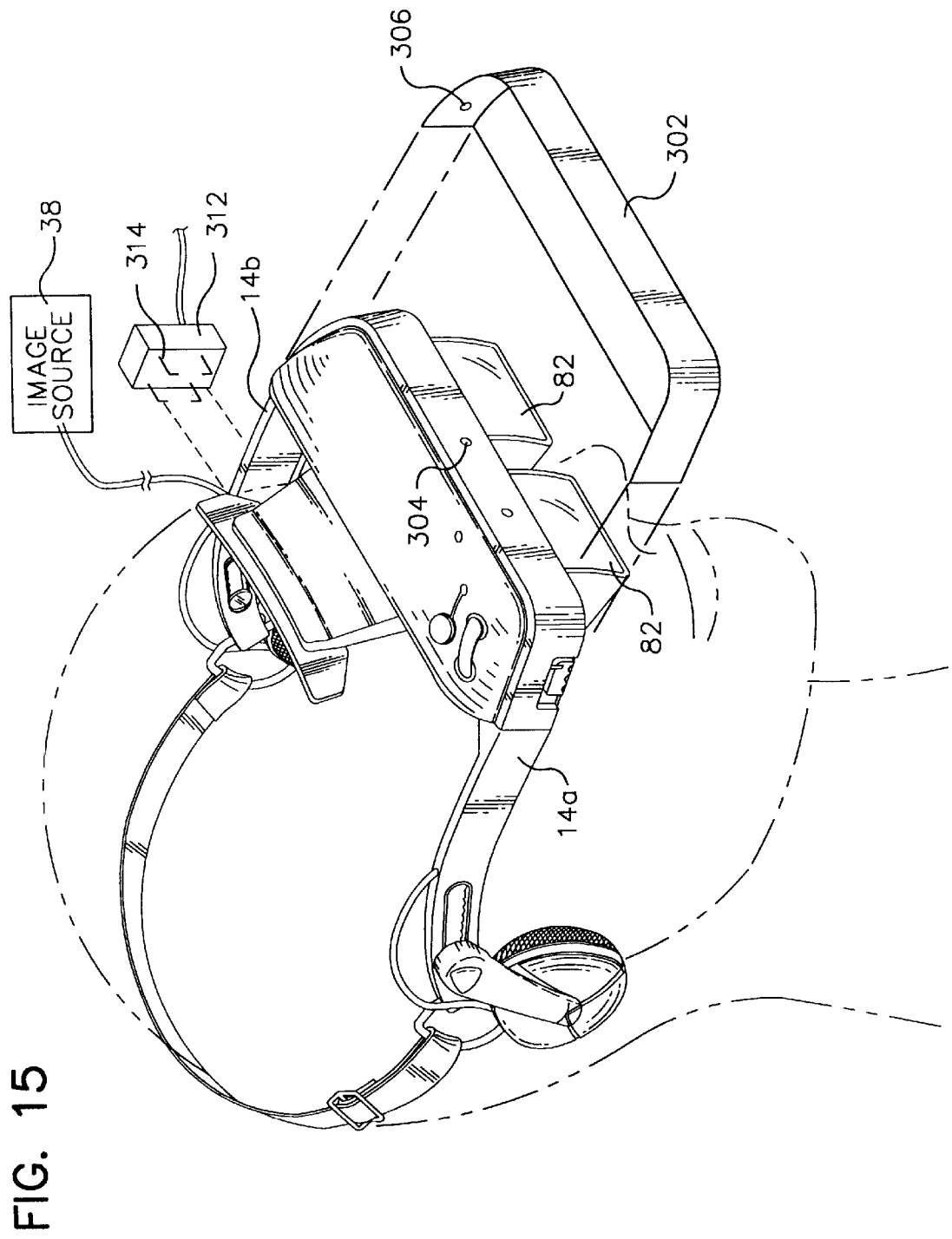
FIG. 15 is a perspective view of the apparatus of FIG. 1 showing attachment of additional components.
Figure 17D:
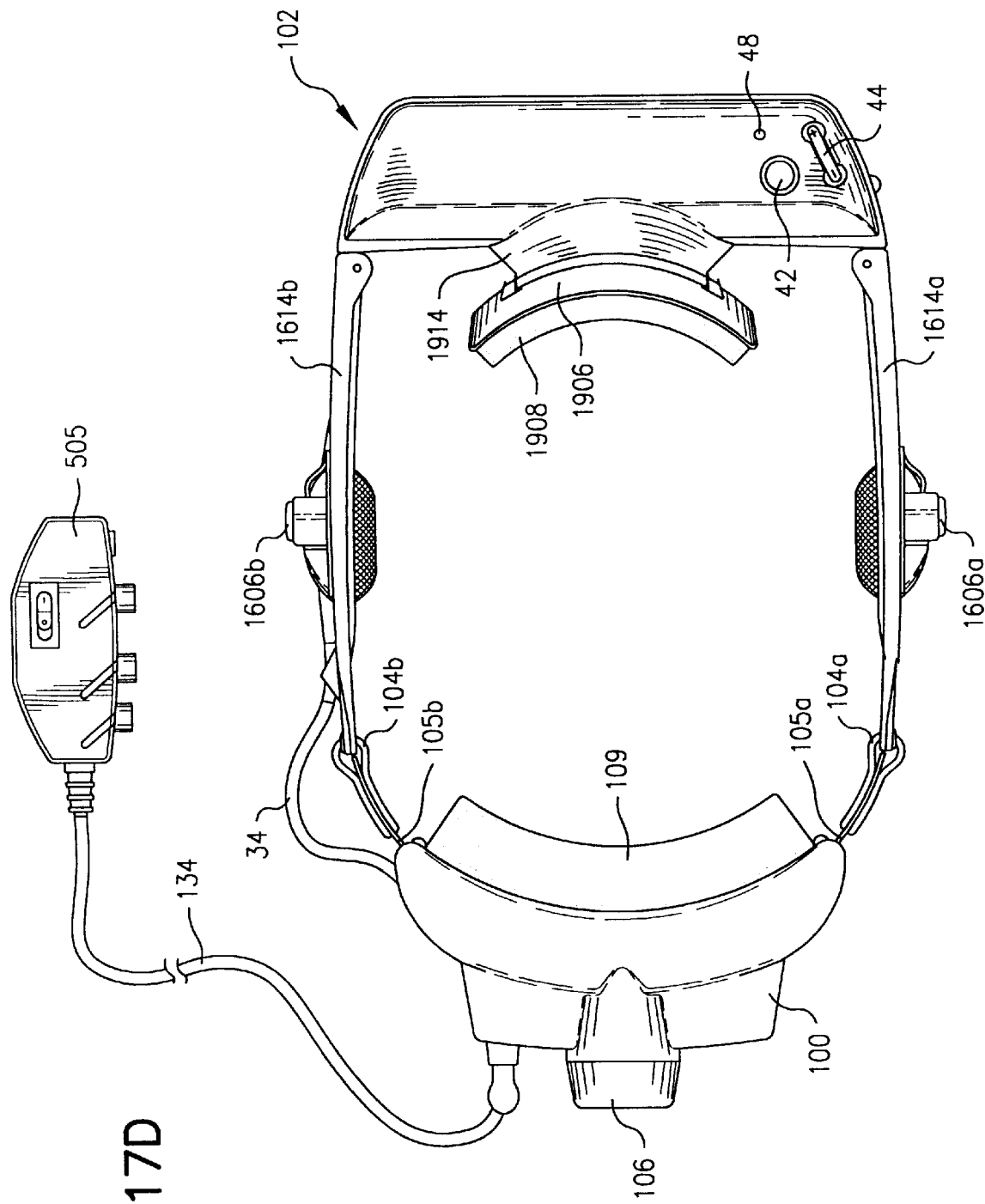
FIGS. 17A, B, C, D are perspective, rear elevational, side elevational and top plan views of a head-mounted display and head tracker, according to one embodiment of the invention.

A connection is provided for establishing communication or data transfer to the display apparatus which, in the depicted embodiment, involves a cable 34 mounted along the underside of the left temple piece 14b and terminating in a connector 36. Typically, the connector 36 will be connected to a cable which provides for data transfer or other communication (directly or via a junction box or an interface) with a video/audio source 38 (FIG. 17) such as a computer, a video cassette recorder (VCR), video disk (laser disk) player (including a portable video disk player), broadcast television receiver, television cable or optical fiber source, gaming device such as Personal Computer (PC) games, or non-PC game devices, e.g., those available from Nintendo™, Sega™, Atari™, 3DO™, CD-i™ and the like, or video telephone service. Preferably, the cable 34 is also used to deliver power to the apparatus. In other embodiments, data communication can be made via permanently attached cables (e.g. without using plug-type connectors) or without using a wire cable, such as by using a fiber optic cable, or by using wireless communication such as infrared, or radio communication. In one embodiment, the HMD is configured to accept a particular type of video format or signal over the cable 34, such as an NTSG signal. An NTSG format for a video signal is a format commonly used in the United States for output from video cassette recorders and many video games. Most personal computers output video signals using a VGA (video graphics array) video output format Thus, in one embodiment, when it is desired to display video output by the personal computer, an interface device 506 (FIGS. 5A and 15) is used to convert the VGA signal to an NTSG signal. As depicted in FIG. 15, the output from the personal computer 510 is conveyed by a first cable 511 to the interface device 506 which converts the VGA signal to an NTSG signal in a manner well known in the art. The NTSG signal then travels from the interface device 506 over cable 34 (or, over cable 134 via head tracker device 100 and then via cable 34) to the optics and electronics of the END 102.

In some embodiments, it is useful to provide the user with controls. Although it is possible to provide controls which are not mounted on the head-mounted unit (such as a remote control unit or a console) in the depicted embodiment, at least some controls are on the head-mounted unit. In the depicted embodiment, a first button 42 can be used to provide, for example, a mute function. Preferably, activation of this button provides for both discontinuing display of the video image which is currently being output and discontinuing the audio being provided to headphones 52 (if any) to provide both a video mute and an audio mute. However, it is also possible to provide for controls that mute video only or that mute audio only. Preferably, the mute control is configured so that the user can easily turn off at least the image, without requiring turning off of power to the HMD or interrupting the stream of data (although, in one embodiment, the mute button can be configured to simultaneously pause the data stream, such as by sending an interrupt command or other signal to a PC via the serial port). In one embodiment, the mute control turns off power for the LCD backlight, LCD and/or audio functions. Preferably, the current control setting, e.g., monoscopic/3-D, volume, contrast) are still maintained, allowing the user to quickly return to viewing e.g., without having to reset the controls.

In the depicted embodiment, a rocker switch 44 can be used to provide control of a parameter which varies through a range, such as volume of the audio. Other items that could be controlled in this fashion include tint, hue or contrast of the video image, selection of a video and/or audio source such as channel selection, image brightness, audio tone (i.e., treble/bass control) and the like. A slider switch 46 can be used, e.g., to select among discrete choices to select left, right or no relative frame phasing, to select between stereo and non-stereoscopic views, and the like. In one embodiment a slider switch 46 can switch between standard (non-3D) display, display of video which is encoded for field sequential three-dimensional display (3-D) with the right eye encoded first (3D1) or video encoded for field sequential 3-D with the left eye encoded first (3D2). One or more visible displays can be provided. In the depicted embodiment, an LED "power on" indicator is provided. In one embodiment the indicator light 48 can also provide information regarding the setting of the slider switch 46, such as by displaying a first color when the switch 46 is in the standard setting and a second color when the switch 46 is in one of the two 3D (stereoscopic) settings. If desired, the electronics can be configured to display, to the eyes of the user, visual indication, e.g. of status (3D or monocular, Battery law, Mute on, etc.), alongside or superimposed on the displayed image such as in the form of illuminated lights, words or icons. Other controls and/or indicators can also be used and can be mounted on various surfaces of the head-mounted apparatus of FIG. 1. If desired, controls can be mounted on other devices such as hand-held devices and/or devices worn, e.g. on a belt loop and communicated to the HMD via infrared, radio or other wireless communication, cable and the like.

In the depicted embodiment, audio devices such as earphone-type loudspeakers 52a, 52b are provided. Other audio devices can be used such as "earbud" devices worn in the ear. Left and right loudspeakers 52a, 52b are preferably movably attached to the ends of the temple pieces 14a, 14b, e.g., by pivotable arms 54a, 54b which can be laterally adjusted in a mounting slot 56a, 56b in each temple 14a, 14b. The speakers 52a, 52b can be held in position by friction, or detent tighteners 58a, 58b can be used to secure the speakers 52a, 52b in the desired position. Cables 62a, 62b are used to provide the desired signal to the loudspeaker 52a, 52b.

Figure 7:
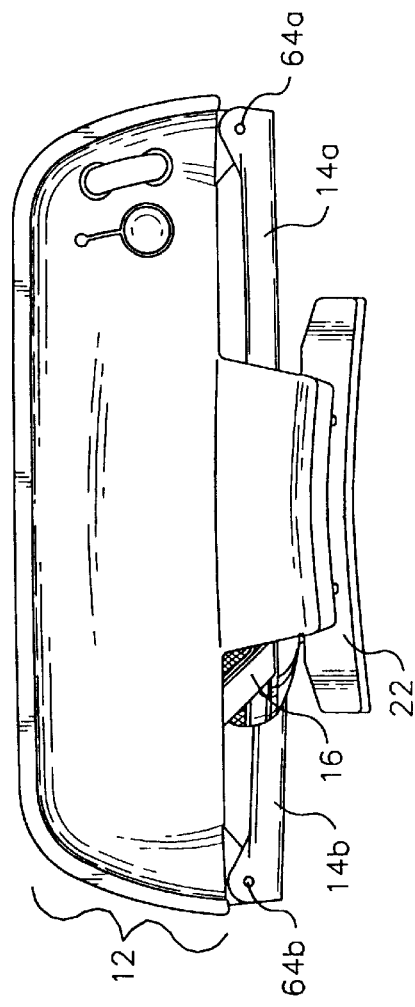
FIG. 7 is a top view generally corresponding to that of FIG. 6 but showing the temple pieces in a folded configuration.
Figure 6:
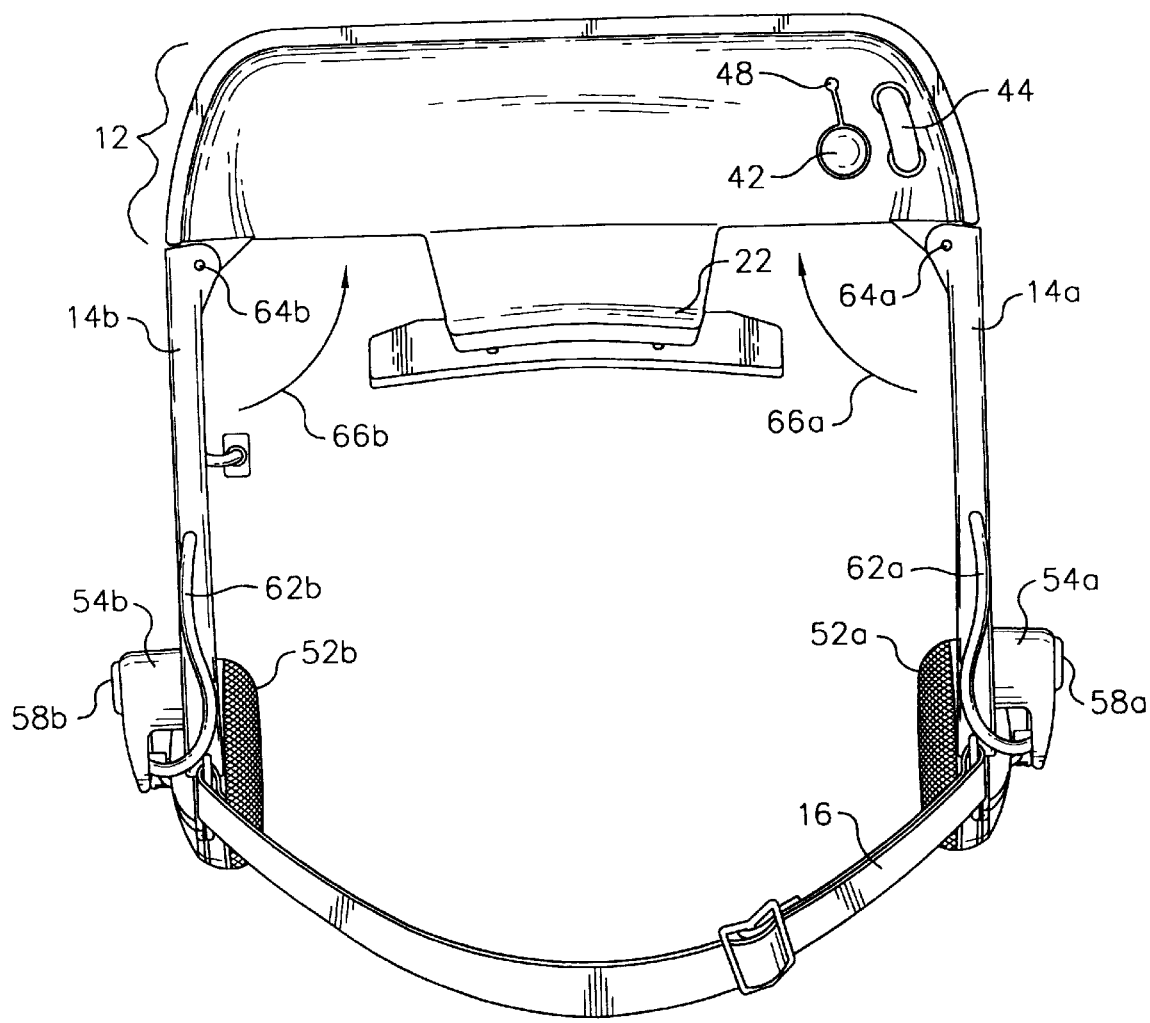
FIG. 6 is a top plan view of the apparatus of FIG. 1.
Figure 16:
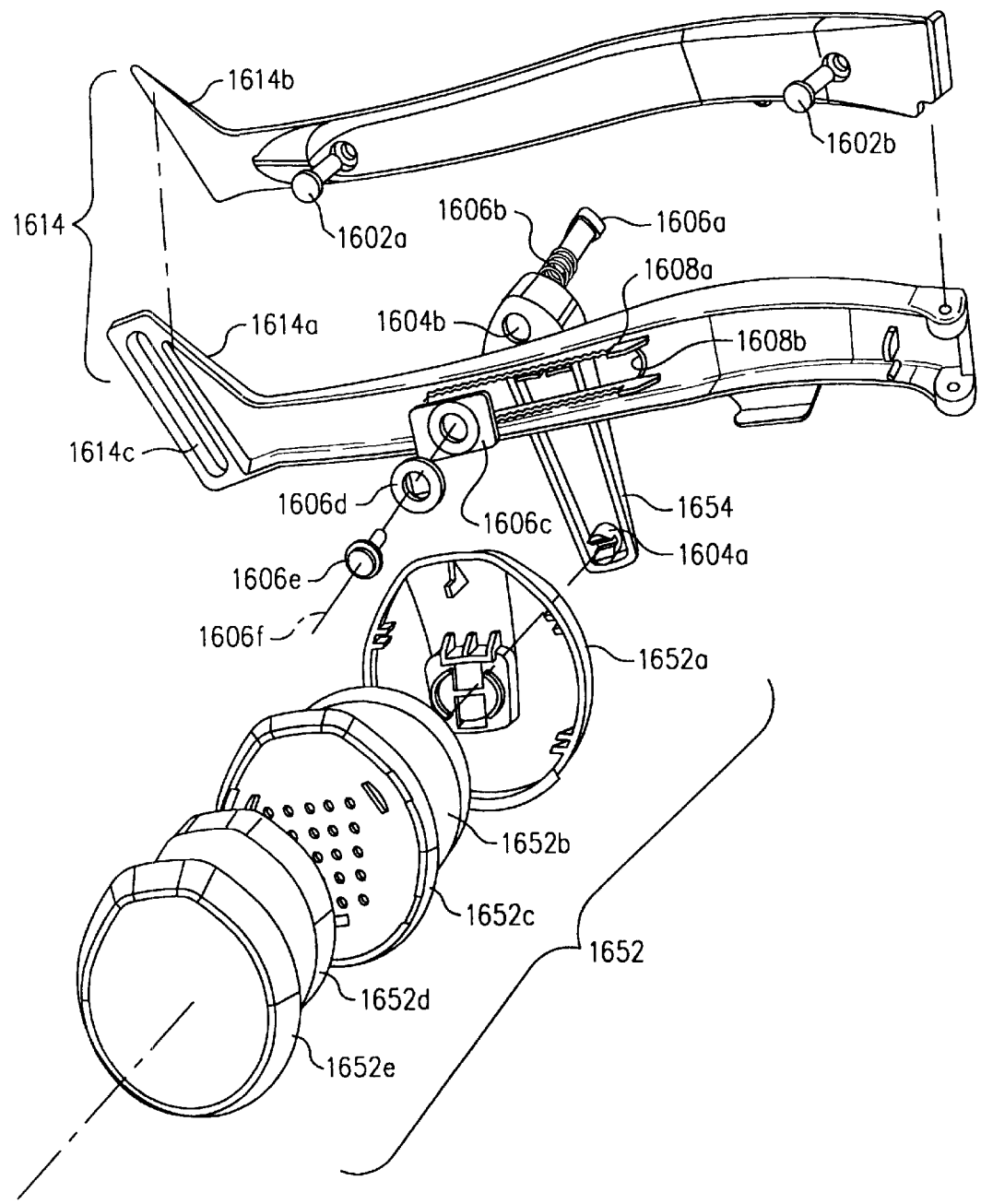
FIG. 16 is an exploded perspective view of a temple piece and earphone according to an embodiment of the present invention.

FIG. 16 depicts another embodiment for providing an adjustable earphone. In the embodiment of FIG. 16 the temple piece 1614 includes an outer member 1614a and an inner member 1614b coupled by rivets or pins 1602a 1602b to form a hollow structure therebetween. In one embodiment, the hollow structure can be used to accommodate cables, fiberoptics or other communication lines, e.g. for providing signals to and from the earphones, or other components, such as a head tracker. In this case, the cables preferably have sufficient slack to accommodate temple folding (FIG. 7). In the depicted embodiment an adjustable arm 1654a connects the temple piece 1614 to an earphone 1652. In the depicted embodiment the earphone 1652 is made up of an outer cover 1652a, a first spacer 1652b, a transducer or speaker 1652c, a second spacer 1652d and an outer cover 1652e. The interior components 1652b, 1652c, 1652d are held in place by being sandwiched between the inner and outer cover 1652a, 1652e which may be held in place by clips, latches, adhesives, ultrasonic welding and the like. In the depicted embodiment the arm 1654 contains a clip 1604 in its lower end for engaging a rib on the outer cover 1652a and a hole 1604b in its upper end for accommodating a connector which couples the arm 1654 to the temple piece 1614 in a rotatable and slidable manner. In the depicted embodiment the coupling of the arm 1654 to the temple 1614 is by way of a button 1606a, spring 1606b, plate 1606c, washer 1606d and pin 1606e. When assembled the spring 1606b normally maintains the plate 1606c pressed against the detent or toothed edges 1608a of a slot 1608b formed in the outer temple piece 1640a. The surface of the plate 1606c which is adjacent the teeth 1608a and which, if desired, can be ridged so as to mate with the teeth 1608a, acts to prevent sliding of the plate 1606c, and thus the attached arm 1654, within the slot 1608b. The spring 1606b further normally avoids rotation of the arm 1654 about the coupling axis 1606f e.g. by frictional interaction of the washer 1606d with the plate 1606c. When the user wishes to adjust the position of the earphone 1652 the user compresses button 1606a which reduces the pressure of the washer 1606d against plate 1606c and of the plate 1606c against the teeth 1608a. This reduction in pressure allows the user to slide the connector assembly and thus the arm 1654 within the slot 1608b and also to rotate the arm 1654 about axis 1606f. Rotation about axis 1606f adjusts the vertical distance between the earphone 1652 and the temple 1614 (as well as the horizontal location) and sliding along slot 1608b adjusts the horizontal or lateral location of the earphone 1652.

In one embodiment of FIG. 1, the head strap 16 is coupled to the temples 14a, 14b via left and right strap pivots, loops or D-rings 17a, 17b (FIG. 1). A length and/or tightness adjustment mechanism such as a buckle, can be provided on the strap.

Figure 21:
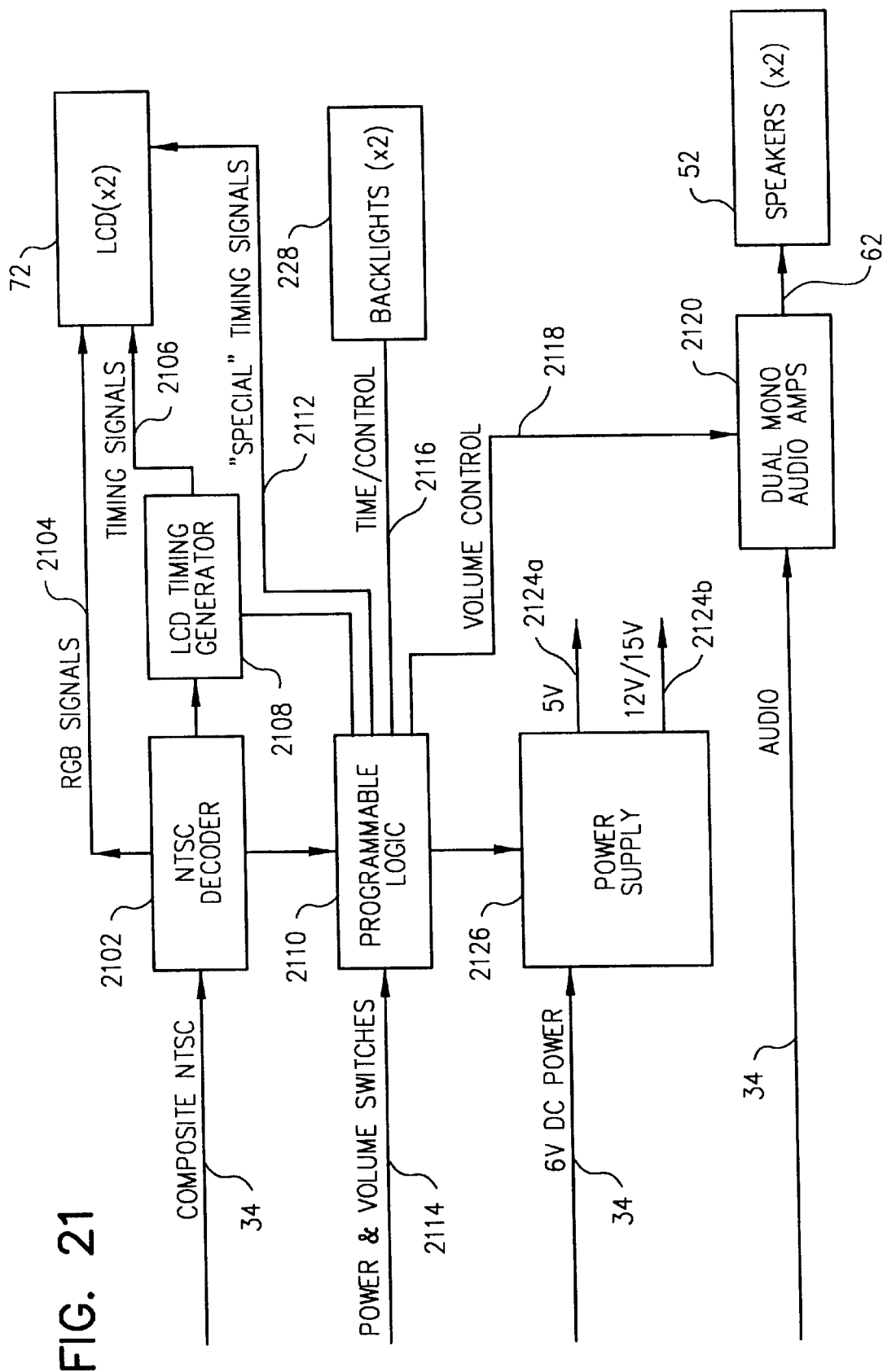
FIG. 21 is a block diagram of electronic components according to an embodiment of the present invention.

Preferably, the temples 14a, 14b are connected to the main portion 12 using left and right hinges 64a, 64b. The hinges 64a, 64b permit the temple pieces 14a, 14b to be folded in directions inwardly 66a, 66b to provide the compact configuration depicted in FIG. 7. The compact configuration is achieved partially by locating much or all of the electronics associated with the production of the video device in the main portion 12 (as described more fully below). In one configuration, there are little or no optical or video elements or electronics in the temple pieces 14a, 14b (although in some embodiments these may contain, for example, cables and connectors). As a result, the temples 14a, 14b can be folded nearly flat against the main portion 12, as depicted in FIG. 7, residing underneath the forehead brace 22. Such compact configuration provides for ease of shipment, storage, transport and the like. In one embodiment, the electronics used in generating the image 72 are substantially all contained in the upper portion of the main section 12 of the apparatus as depicted in FIG. 8. The electronics used for this purpose can be those generally well-known in the art for producing video images, such as the electronics used in producing video images in the eyepiece of a video recorder and can include, for example, power supply, timing circuitry (e.g. to assure that the data which arrives is routed to the proper position of the image generators), buffer memory or other memory devices, and/or image processor circuitry. FIG. 21 depicts, in block diagram fashion, electronic components for use in connection with the present invention, such as may reside, e.g., on circuit board 1806 (FIG. 18) and the connection to various components of the HMD. In the depicted embodiment, the video signal, which may be in NTSC format is input, e.g. by a cable 34, to an NTSC decoder 2102 of a type well known in the art. The NTSC decoder 2102 provides image data such as red green blue (RGB) signals 2104 to the first and second LCDs 72. Normal display of the data by the LCD 72 is controlled using timing signals 2106 provided from a LCD timing generator 2108 of a type well known in the art, which receives timing information such as frame synch information from the NTSC decoder 2102 and/or a programmable logic device 2110 which may be coupled to the NTSC decoder 2102. Special timing signals 2112, e.g. for three dimensional display, may be provided directly from the programmable logic device 2110 to the LCD 72. The programmable logic device 2110 receives input from switches such as a power switch, a mute switch, a volume switch, a video mode switch and the like 2114. The programmable logic device 2110 provides timing and/or control signals 2116 to the back light device 228, e.g. for video mute, field sequencing or other purposes. The programmable logic device 2110 provides volume control signals 2118 to first and second audio amplifiers 2120 which receive an audio signal e.g. over cable 34 and output an amplified signal over cable 62 to the headphones 52. Power, which may be received over cable 34, is stabilized and/or transformed to desired voltages e.g. for supplying digital electronics 124 and/or components such as back lights LCDs etc. 2124b by a power supply 2126.

The electronic signals constituting the video signal are converted into an image. or a series of images, e.g., simulating motion, by an image generator 74. The image generator 2 can be any of a plurality of color or monochrome imaging devices including a cathode-ray tube (CRT), light emitting diode (LED) array, liquid crystal display (LCD), field emissive device (FED), as well as laser devices such as laser diode arrays.

One example of an LCD that can be used for this purpose is a 0.7" diagonal LCD of the type commonly used for the view finder of a camcorder, for example, Model FO7KM200 available from Seiko Epson Corporation. Other sizes and types of LCDs can also be used such as a 1 inch diagonal LCD available from Hitachi, Inc. Preferably, an LCD device includes the capability for being backlit using any of a number of backlighting devices such as incandescent lighting, fluorescent lighting, electro-luminescent and ambient lighting.

Once the image generator 74 generates the optical image, the light from the image generator is configured by various optical elements to deliver the desired image to the eye position 28 of the user. A number of different optical configurations can be used for this purpose including those described in U.S. Ser. No. 08/150,996 filed Nov. 12, 1993 for "Optically Corrected Helmet Mounted Display," a divisional of U.S. Pat. No. 5,303,085, filed Feb. 7, 1992, both of which are incorporated herein by reference or PCT application No. PCT/US94/09820 for "Personal Visual Display" filed Aug. 31, 1994, and incorporated herein by reference. In the embodiment depicted in FIG. 8, the optical devices include the image generator 74, a field correction device such as a plano-convex or meniscus lens 76 for providing a substantially flat field of focus to the user, a fold mirror 78 for reflecting at least a part of the image from the image generator towards a combiner 82 which reflects at least a portion of the image received from the fold mirror 78 through the fold mirror 78 and towards the eye position of the user 28, preferably magnifying the image (e.g., by virtue of a reflection from its substantially spherical surface) and, in embodiments where the combiner is at least partially transparent, combines the image light with light from the environment to provide the user with a simultaneous view of the environment and of the generated image. Preferably, the combiner serves as the primary magnification element for the image light. An optical element is referred to as being a "powered" element if it provides image two-dimensional magnification. Although, for convenience, this item is referred to as a "combiner", in some embodiments the combiner may be used without providing for a combination of image light with environmental light, as described more fully below.

In the depicted embodiment, the image generator 2 is mounted substantially above the fold mirror 1 (meaning vertically above, when the device is oriented so that the axis between the eye position 5 and combiner 4 is substantially horizontal). With reference to this configuration, the image light travels downward from the image generator 2 towards the fold mirror 1. The image light is at least partially reflected by the fold mirror 1 in a substantially horizontal direction away from the eye of the user 5 and towards the combiner 4. At the combiner 4, the image light is at least partially reflected back towards the fold mirror 1. In an embodiment in which the user will simultaneously view the image or the environmental light, light from the environment passes through the substantially transparent combiner 4 and travels along with the image light reflected from the combiner 4 to produce combined light. In an embodiment in which the user will view only the generated image, without being able to view the environment (referred to as an "immersive" device), the combiner can be substantially fully reflective and substantially non-transmissive. The image light and/or the combined light is at least partially transmitted through the fold mirror 1 towards the eye of the user 5. The amount of light, if any, which passes from the surrounding environment to the eyes of the observer can be at least partially controlled by coatings placed on the surfaces of the combiner, and the fold mirror.

In one embodiment, the image appears to the user to have a field of view (for each eye) of about 30°, a fixed focus of about eleven feet (about 4 m), and a resolution of about 180,000 pixels per LCD panel.

In many applications, it is desired to provide the user with the impression of a color image. Full color images can be achieved by displaying discrete color components, such as red, green and blue components. Most current technologies for providing a color video image are arranged so that the various component colors are displaced from one another either in space or in time. For example, in a typical television screen, the red, green and blue positions for a given image pixel form a pixel triad displaced in space, i.e., which lie adjacent one another rather than at the same location. This necessarily increases the average size of the pixel triad with the result that pixel density is less intense than it would otherwise be.

Another approach is the approach of displacing the component colors in time such that the red, green and blue colors for a given pixel all are provided in the same location but at different times. Thus, in a configuration in which it is desired to provide the colored image at a rate of 60 frames per second, each frame would be divided into three subframes, one for each color so that subframes would be presented at a rate of about 180 times per second in a repeating pattern of e.g., a red frame, a green frame, a blue frame, a red frame, etc.

One method of achieving the displaced-in-time color image is by using a color shutter. A color shutter is an electronically-driven device which provides a color filter over the entire image area and which can be switched rapidly, e.g., 180 times per second among the three image colors (red, blue, green). One type of color shutter is that provided in Tektronix EX100HD 1 inch Color Display System. Such a color shutter can be mounted directly on the surface of the screen of a monochrome (or black and white) video image generator. The monochrome image generator is then configured to produce a black and white image of the respective color components of the desired final image at, e.g., 180 frames per second. In this way, to produce the first (red) subframe, the black and white image generator will produce a black and white image of the red component of the first frame of the image and the color shutter will be configured to transmit only red light. During the next subframe, 1/180 of a second later, the monochrome generator will generate a black-and-white image of the blue component of the image and the color shutter will be configured to transmit only blue light. During the third subframe, the monochrome image generator will output a black-and-white image of the green component of the frame and the color shutter will be configured to transmit only green light. The resulting image will appear to be fully colored to the user but the three colors for a given pixel will be in exactly the same location, i.e., there will be no physical separation of the location of the color components of the pixel.

Although a color shutter approach is useful to provide a high-intensity color image, it has not been previously provided in the context of a light-weight, high-quality, head-mounted display. Typically, optical configurations in the past have used, e.g., a monochrome CRT in conjunction with relay lens systems to transfer the image from a remotely-mounted CRT to the user's eye. This typically resulted in heavy systems, often of a type that were helmet-mounted and suitable chiefly for military use.

Figure 9:
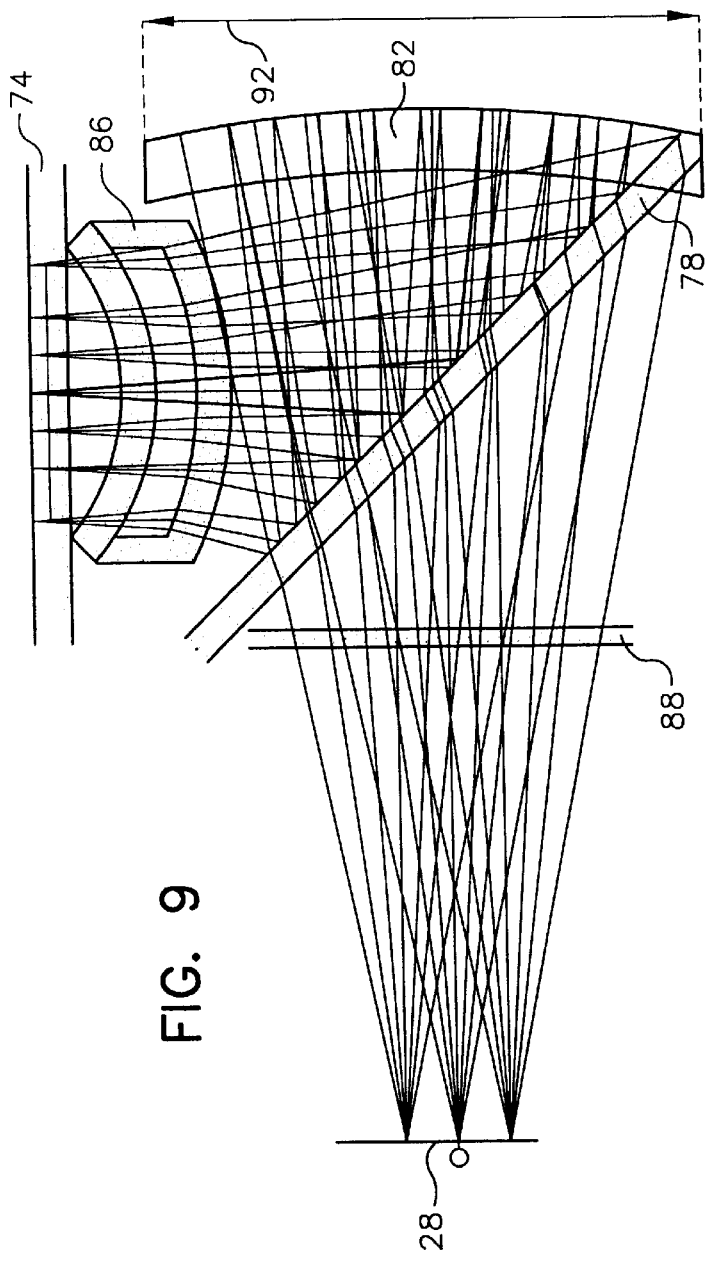
FIG. 9 is a schematic side view showing optical components according to one embodiment of the present invention.

It has been found that it is difficult to satisfactorily position and align a color shutter over a substantially curved surface such as that of lens 86. In most cases it has been found that such positioning creates a very small viewing aperture, making the use of the device difficult and uncomfortable. Accordingly, one embodiment of the present invention departs from the approach of positioning a color shutter directly on an output screen and, instead, positions a color shutter 88 at a position which is farther along on the optical path, such as the position depicted in FIG. 9. As depicted in FIG. 9, the color shutter 88 can be placed between the fold mirror 78 and the eye position 28 of the user. This avoids the difficulty of locating the shutter over a curved surface 86 and avoids placing the color shutter in a region, such as the region between the fold mirror 78 and the combiner 82, which has optical paths going in more than one direction (so that the filter would conceivably filter the light twice). As depicted in FIG. 9, if the color shutter 88 is positioned below the lens 86, it would be necessary to increase the height 92 of the device in order to avoid interfering with or double-filtering the light between the fold mirror 78 and the combiner 82. Increasing the height of the device will result in a reduction of magnification or reduction of the viewing aperture.

Figure 13A:
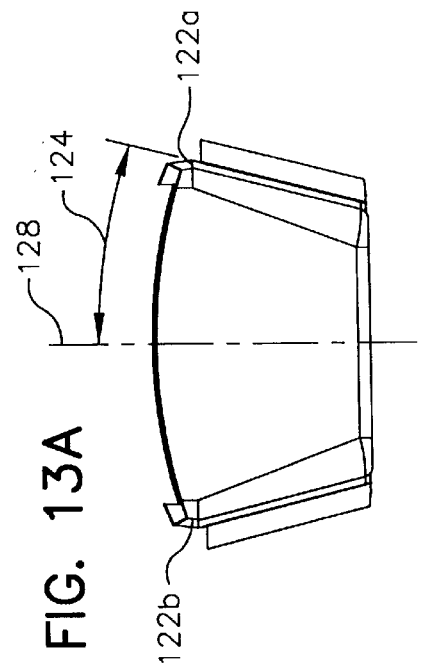
FIG. 13A is a bottom plan view of the optical shroud of FIG. 10.
Figure 12:
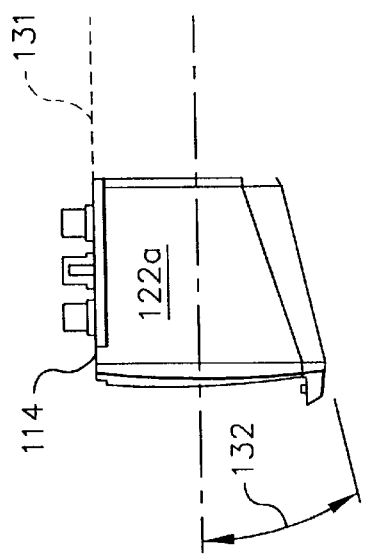
FIG. 12 is a side view of the optical shroud of FIG. 10.

It has been found that a number of items can detract from the delivery of a high-quality image to the user. The image can deteriorate because the image generator or various optical elements are not located in the correct position with respect to one another and/or with respect to the user's eye position. The image can deteriorate because stray light, i.e., light other than that desired to be delivered to the user may be combined with the image and/or desired environmental light. In order to achieve the goals of low cost and low weight while maintaining high quality, an embodiment of the invention provides for an optical shroud which can be used for the dual functions of shielding from stray light and providing for correct positioning of optical elements. In the embodiment depicted in FIG. 10, the shroud 112 has a top surface 114 having an opening 116 for entry of the image light Beneath the top portion 114 is a chamber 118 defined by left and right sidewalls 122a, 122b and floor member 124. As seen in FIGS. 11 and 13, the side members 122a, 122b preferably flare outward (i.e., in a direction away from the eye position, e.g., at an angle 124 (with respect to the straight-ahead axis of view of the user 128) of between about 10° and about 30°, preferably between about 10° and about 25° and more preferably being about 15°. The top of the shroud 114 in the depicted embodiment, defines a plane 131 which is substantially parallel to the plane of the image generator output and the straight-ahead axis of view. In the depicted embodiment, the floor 124 is flared downward at an angle 132, with respect to the top plane 131, of between about 10° and about 25°, preferably between about 10° and about 20° and more preferably at about 12°. A groove near the front edge of the floor 134c is curved with a curvature corresponding to that of the combiner. This groove is used, in conjunction with recesses 134a and 134b, for mounting the combiner so as to assure that the combiner 82 is located in the correct position, as depicted in FIG. 13B. After positioning, the combiner can be held in place by, e.g. adhesives, ultrasonic welding, interlocking tabs and slots, latches, gaskets and the like. Ledges 136, 137, 139, defining an imaginary plane which intersects the sidewalls 122a, 122b along lines running diagonally inside of the sidewalls, are used for mounting the fold mirror 78 in the correct position with respect to the other optical components, as depicted in FIG. 13B. After positioning, the fold mirror can be held in place by, e.g. adhesives, ultrasonic welding, interlocking tabs and slots, heat staking, latches, gaskets and the like. The top 114, floor 124 and sidewalls 122a, 122b, and particularly, the floor 124 and outside sidewall are useful in shielding the optics from stray light of types that commonly produce image degradation. An example of such stray light would be light that may bounce upward off the user's nose or a light-colored shirt of a user. The shroud also protects the optical components from dust, abrasion, scratches and the like, at least on the surfaces of the optics enclosed within the chamber 118. To assist in protecting the optics, a transparent dust cover 141 can be positioned e.g. between the fold mirror 78 and the eye of the user. As seen in FIG. 1, in one embodiment the left and right shrouds 112 are positioned individually in front of the left and right eyes respectively and are spaced apart from one another. This configuration is believed to provide a number of advantages. First, it is believed to provide a more pleasing appearance for many users than a device in which both eyes are covered by a single shroud structure. Further, it is believed to provide for less mass or weight than a device which extends across and in front of both eyes without a space between the two eyes, while still assisting in shielding from stray light such as light which may reflect off the user's nose. Additionally it is believed that providing separate shrouds 112 results in a device which is more modular, easier to design, maintain, repair, and construct than a device which has a unitary component extending across and in front of both eyes. Furthermore, providing separate shrouds for the left and right eyes makes it easier to position and assemble a device in which there is a powered (or magnifying) reflector 82 for each eye, typically each with a different center of curvature, to provide image magnification (preferably both vertical and horizontal) of left and right images (as opposed to magnifying a single image which is delivered to and/or viewed by the left and right eyes).

In the depicted embodiment, pins 152a, 152b, 152c projecting from the upper surface 114 assist in proper alignment of a field curvature correction device (when one is provided) such as plano-convex lens 76, e.g. by mating with corresponding holes 154a, 154b, 154c in the lens 76. The lens 76 can be attached to the shroud 12 by heat staking or heat-doming the ends of the pins 152a, 152b, 152c or by other means such as adhesives, ultrasonic welding, clamps, latches and the like. Tabs 156a, 156b, 156c are provided for aligning and/or attaching the shroud 112 to the main portion 12 of the head-mounted display device.

In one embodiment, separate shrouds 112 are provided for the left and right optics, as depicted, e.g., in FIG. 1, although a unified shroud can also be used. Although the depicted embodiment shows recesses 134a, 134b, groove 134c, ledges 136, 137, 139 and pins 152a, 152b, 152c for aligning and/or holding various optical components, other devices for aligning and/or holding can be used such as tabs, ridges, tracks, rails, spring-mounts, gaskets, latches and the like. The shroud 112 can be made from a number of components, including plastic, metal, ceramic, fiber-reinforced resins, and the like. The shroud 112 may contains holes, slots or other shapes to facilitate connecting the shroud to other optics (such as contrast-enhancement optics) in the correct position with respect to other items in the device.

Figure 14A:
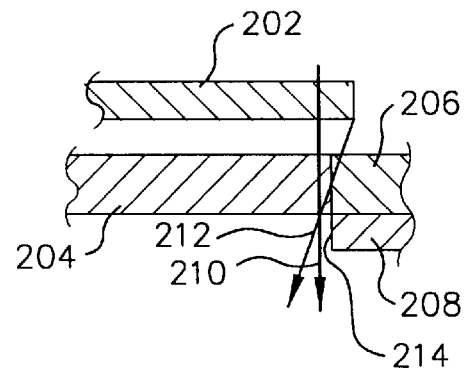
FIG. 14A is a schematic, cross-sectional view of a mask and holder apparatus according to one embodiment of the present invention.

Another alignment issue is presented by the image generator. The image generator, must, of course, be correctly positioned with respect to the other elements such as a field correction lens 86, (when provided) fold mirror 78, etc. Certain image generating devices, notably an LCD array, suffer from image degradation as a result of transmission of light peripheral to the image area of the LCD. Typically, an LCD is backlit and many LCDs have used a rectangularly-shaped mask around the edge of the LCD to prevent the viewer from seeing a bright outline surrounding the active area of the LED. Because an LCD has a thickness (typically about 2.5 mm), undesired light, e.g., from the backlight, which is typically not collimated, can travel through the LCD at an angle other than normal to the output plane to the LCD and thus a mask on the output plane which went only up to the active area of the LCD would not fully mask the undesired light. FIG. 14A depicts a cross-section through a backlight 202, active LCD area 204, peripheral LCD circuitry 206, and mask 208. As seen in this configuration, if the only light traveling through the LCD 204 were traveling in a normal direction, such as that shown by arrow 210, the mask 208 would be fully effective. However, because light travels from the backlight 202 in directions other than normal to the plane of the LCD 204, some light 212 will travel obliquely through the LCD 204, missing the mask 208. For this reason, in previous devices, in order to avoid the undesired oblique light around the edges of the LCD, the mask 208 would typically be provided with an opening 214 which was smaller than a full active area (or the substantially light transmissive area) of the LCD. This represented a certain amount of waste of the image generated by the LCDs since the edge of the LCD image would be masked.

Figure 14B:
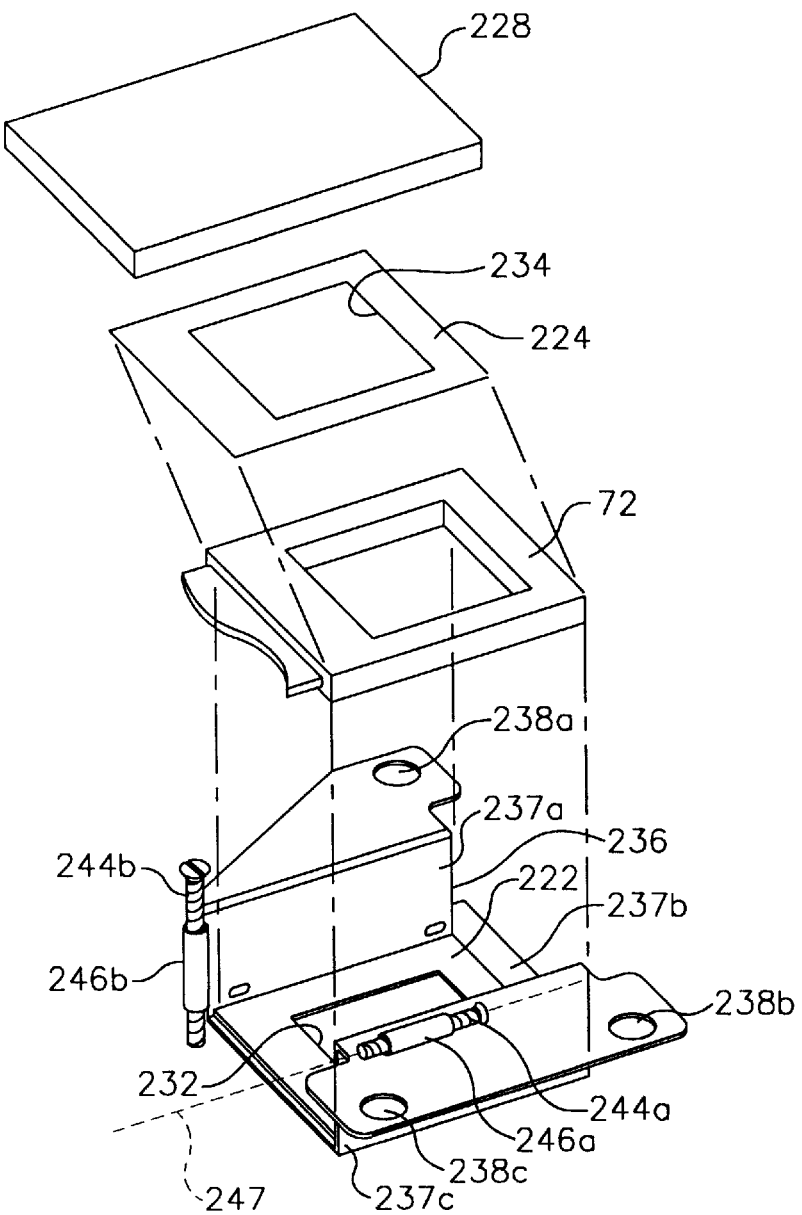
FIG. 14B is an exploded perspective view of a mask and holder apparatus according to one embodiment of the present invention.

Accordingly, one embodiment of the invention involves providing at least two masks, one mask 222 (FIG. 14B) adjacent the output surface of the LED 72 and another mask 224 between the LCD location 226 and the location of the backlight 228. Preferably, both the first mask 222 and the second mask 224 have opening or windows 232, 234, respectively, which are substantially equal and congruent to the active area of the LCD.

Preferably, the first mask 222 is formed integrally with a holder 236 which includes sidewalls 237a, 237b, 237c for properly aligning the second masks 222, 224 and/or the LCD device 72 to provide an accurate and inexpensive way to perform both masking and proper positioning and alignment of the masks with respect to the LCD array. Alternatively it is possible to provide both the masks 222, 224 as part of a unitary mask/LCD-holder. In one embodiment, the mask/holder also contains holes 238a, 238b 238c for mounting the holder to the main portion 12 of the head mounted display device. It is also possible for the holder 236 to include devices (such as screw holes, bosses, grooves, rails and the like, not shown) for mounting items such as the image source, backlight, lenses, etc.

In one embodiment, the mask/holder 236 is provided with a means for adjustably mounting the mask/holder within the main portion 12 of the apparatus. Adjustability is useful, in this embodiment, in order to avoid image disparity between the two eye positions. Part of the image disparity results from the fact that the active area of an LCD due to manufacturing tolerances, may not be precisely located in the same position, with respect to the device edges, on every LCD device. The variability is typically within about ±0.25 mm in both horizontal and vertical directions. Although it is possible to provide for adjustment of both horizontal and vertical disparity, it has been shown that human vision is not as sensitive to horizontal disparity (i.e. disparity wherein corresponding portions of the left and right images appear to the viewer to be displaced from one another along a left-right axis) as it is to vertical disparity (i.e. disparity wherein corresponding portions of left and right images appear to the viewer to be displaced from one another along an up-down axis). Accordingly, in the depicted embodiment, in order to e.g., eliminate eyestrain which can result from vertical disparity of the left and right images, an optional adjustment mechanism such a traveling screw arrangement 244a can be provided for vertical alignment of the two images. By rotating the screw 224a, the traveler 246a, attached to the holder 236 will move vertically up and down (i.e. along axis 247) and the desired vertical adjustment can be achieved in this fashion. Other ways of achieving vertical disparity adjustment include use of rack and pinion adjustment, shims, and tilting the combiner (at the cost of introducing other distortions). A similar adjustment mechanism 244b, 246b can be provided for adjusting the focus of the image for one eye with respect to the other.

Although it is possible to provide various types of adjustment, in general it is preferred to minimize the number of adjustments required by the end user particularly since such adjustments may be difficult for the user to make and since mis-adjustment can result in eye strain or even damage or injury to the user. In one embodiment, there is substantially no need for a focus adjustment In one embodiment, it is possible to provide for a fixed focal length (without the need for substantial focus adjustment by the user) since the HMD is compatible with use of eye glasses (e.g. because of the relatively large eye relief 26). In one embodiment there is no provision for end-user adjustment of interpupillary distance. Devices which rely on refractive optics, and particularly lenses positioned before the eyes of the user, often require interpupillary distance adjustment since prismatic or other distortions may result if the refractive optics are not substantially coaxial with the pupils of the user, e.g., such that the user is gazing through an edge of the lens, rather than the center of the lens. In one embodiment of the present invention, the optics are substantially reflective optics and provide for a relatively large exit pupil (compared to the exit pupil provided by typical refractive devices). As a result, a wide range of interpupillary distances (such as between about 55 mm and about 60 mm, preferably between about 50 mm and about 70 mm) can be accommodated without the need for any interpupillary distance adjustment by the end user. By avoiding the need or opportunity for the end user to adjust optical factors such as focus or interpupillary distance, the potential for maladjustment and potential eye strain is avoided and the cost of designing, maintaining, repairing and producing the device is lessened.

Figure 18:
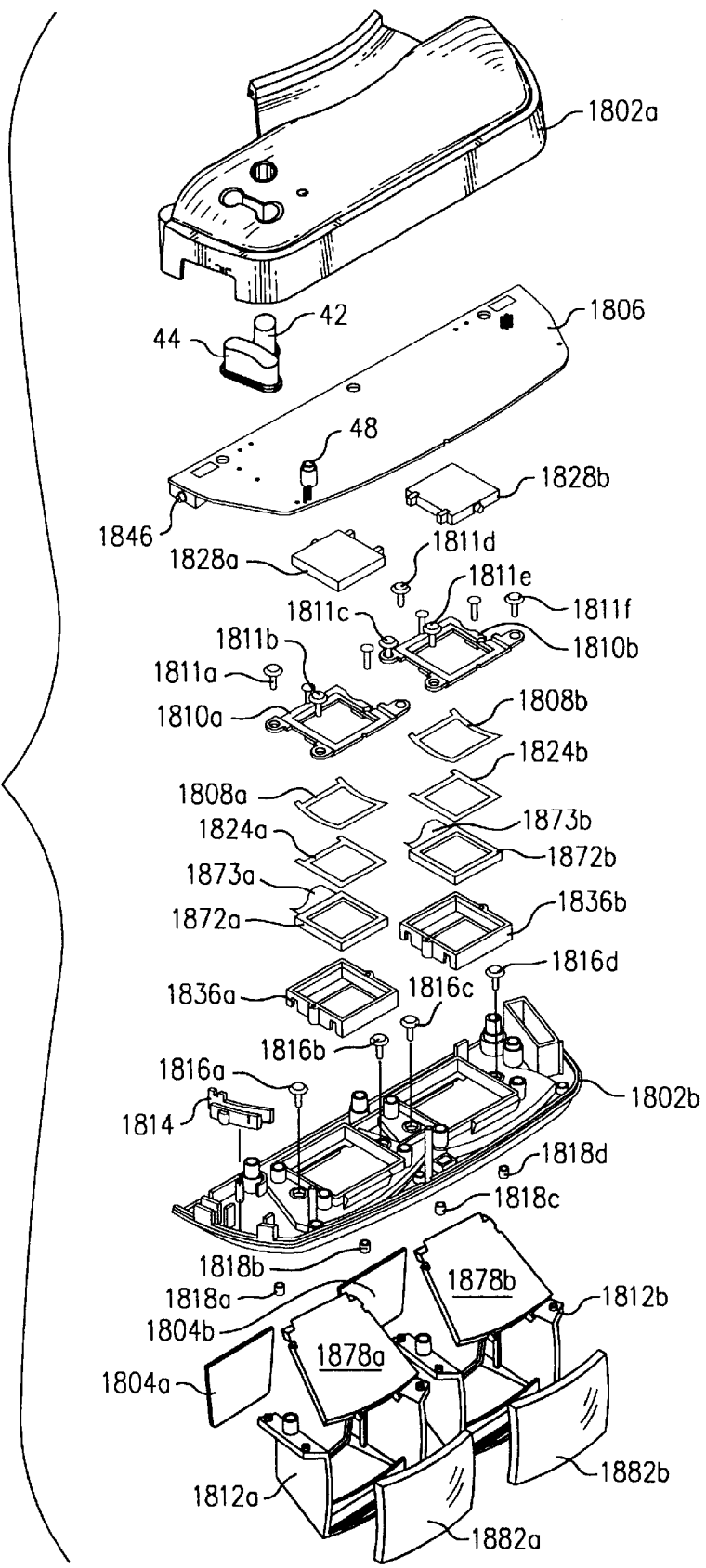
FIG. 18 is an exploded perspective view of the forward portion of an HMD according to an embodiment of the present invention.

FIG. 18 depicts another embodiment of the optics portion of the display device. In this embodiment, the visor housing is made up of an upper housing section 1802a which mates with a lower housing 1802b. The lower housing 1802b defines openings 1804a, 1804b to which the optical shrouds 1812 are coupled. The optical shrouds 1812 act to both shield from undesirable stray light and to position various elements such as fold mirrors 1878a, 1878b reflectors 1882a, 1882b and dust covers 1804a, 1804b.

Mask/holder devices 1836a, 1836b are positioned in the openings 1804a, 1804b and receive the LCD or other image generators 1872a, 1872b which are coupled to a circuit board 1806 or other electronics e.g. via ribbon cable 1873a. Second masks 1824a, 1824b are positioned above the image generator 1873a, 1873b and various components are held in proper registration and spacing by leaf springs 1808a, 1808b and cap 1810a, 1810b, e.g., using rivets 1811a–f. Back light devices 1828a, 1828b are positioned above the image generators in normal use configuration.

As depicted in FIG. 18, thumb slider 1814 engages with slider switch 1846, mounted on circuit board 1806 e.g. for selecting standard or 3D viewing modes. Pins or rivets 1816a, 1816b, 1816c, 1816d can be used for coupling the optical shrouds 1812a 1812b to the lower plate 1802b e.g. via bushings or spacers 1818a, 1818b, 1818c, 1818d.

Some uses for a head mounted display make it advisable to provide the user with a simultaneous view of the environment and a generated image. Other uses make it preferable to provide a view of the image alone, exclusive of the environment. As noted above, in one embodiment the environmental view can be provided by using the combiner to combine image light with light from the environment. It is possible to provide a fully reflective, substantially spherical mirror so as to provide an image-only or "immersive" device. Preferably, however, the apparatus can be used to provide either type of image as desired by the user. It is believed to be particularly useful to leave the user with the option of achieving a view of the environment since users may need such a view in order to properly and safely move while wearing the apparatus and/or to avoid a motion-sickness-like feeling. In the embodiment depicted in FIG. 15, a shield 302 is configured so that it can snap over the external area of the combiner 82, thus converting an environmental-view device (also called "see through", "transmissive" or "heads-up") into an immersive view device. In one embodiment, the shield 302 still permits the user to look down, under the shield for a partial view of the environment (e.g., to view the feet when walking). The shield can be held in place by a number of mechanisms such as snaps 304, or by tab and slot devices, hook and loop devices such as that sold under the trade name Velcro®, or various latches or pivots (such as a flip-up shield). The shield 302 can be made from a number of materials including plastics, metals and the like.

In addition to providing for a shield which can be added or removed mechanically, the transmissivity of light through the combiner 82 can also be controlled by other devices such as an electro-mechanically controlled iris, a photochromically activated coating or an electrically activated coating or LCD device.

In many uses of a head mounted display, it is desired to collect information regarding the position, posture, location and/or movement of the user's head. This information can be used to control the image generated to the eyes of the user for a number of purposes, such as to provide a "virtual reality" or simulated environment to the user, to allow the user to navigate through various displayed images to observe a simulated object from various angles and the like. A number of tracking devices can be used for this purpose such as inertial tracking, electromagnetic tracking, Hall effect tracking, magneto resistance tracking, electrolytic tilt sensing and flux gate tracking. According to one embodiment of the invention, tracking devices are configured so as to permit the user to attach and detach the tracking devices as desired. In the embodiment depicted in FIG. 15, tracking devices 312, can be attached to either of the temples 14a, 14b of the apparatus, e.g., using flexible hook attachments 314, configured to engage the edges of the temples 14a, 14b. Other attachment devices that can be used include latches, clamps, and/or hook and loop material (such as that sold under the trade name Velcro®). One tracking device which can be used for this purpose is a product sold under the trade name The Bird™, by Ascension Technology Corp. In the depicted embodiment, the tracker 312 has its own cable for transmitting information, e.g., to a computer. It is also possible to provide for couplers and wiring to route the tracking information over the HMD cable, to reduce the number of separate cables involved. Although a snap-on or otherwise removably mountable tracker leaves the user with the option of doing without the bulk and weight of trackers when trackers are not desired, in another embodiment, one or more trackers can be integrally built into the head-mounted display device.

As depicted in FIGS. 17A–D, a head tracker 100 may be coupled to a head-mounted display 102 (HMD) for use in conjunction therewith. In addition to the HMDs described herein, a number of HMDs can be used in combination with the tracker devices disclosed herein. In the embodiment depicted in FIG. 17A, the head tracker 100 is coupled physically to the head-mounted display by a strap 104a, 104b, and is coupled electronically by cable 34. The strap 104a, 104b is, preferably, detachably connected to the HMD 102, such as by threading through a slot in the temple pieces 14a, 14b of the HMD, and attaching the strap to strap extensions 105a, 105b (e.g. via a hook and loop connector, such as that sold under the trade name Velcro®), or via snaps, buckles, latches, and like. The cable 34 is detachably coupled by a plug 36 so that, by unplugging the plug 36 and unconnecting the straps 104a, 104b, the tracker 100 can be removed from the HMD 102. The HMD 102 can be used without the tracker for a number of applications such as: in connection with game software or other software which does not use and/or support tracker input, viewing videos from non-interactive sources such as video cassette recorders (VCRs) and the like. When the HMD 102 is used without a tracker 100, a plain strap (not shown) can extend between the temples 14a, 14b for use in maintaining position on the user's head 18, and the HMD may be coupled to a video or image generator by connecting the cable 134 to an image generator, such as a VCR 503 (preferably through a connector block 505 and video and left and right audio cables 507a, 507b, 507c), or a computer, (preferably through a PC adapter box or interface 506 which can provide services such as reducing flicker and/or converting the video format from a computer-video output format, such as VGA (video graphics array) to a format used by the HMD, which may be, e.g., NTSC or PAL). Connector block 505 may be provided with a power on/off switch 505a and/or one or more indicator lights 505b, e.g., for indicating power status. Preferably, the cable 34, 134 or other communication link or links by which the HMD/tracker is coupled to, an image source, such as a computer or VCR can be used to communicate any or all of a number of different items, including some or all of video data (for generating and controlling the images to be displayed to the user), audio data (for generating audio to be heard by the user, e.g. through earphones 54a, 54b, or for conveying audio information, e.g. from a microphone 1502, to the computer), control information (for controlling the operation of the HMD/tracker, the format or contents of the information output by the HMD/tracker, and the like or for controlling aspects of operation of the image source such as the PC, VCR, video disk player, etc.), tracker information (e.g. from a head tracker, eyetracker and the like), product identification or configuration information (which may be stored in an on-board memory device such as a ROM and read, and transmitted, e.g. by a processor, e.g. to facilitate installation or use of the HMD/tracker, such as in a "plug-and-play" fashion), power for powering the HMD/tracker (obtained, e.g., from the PC 510, the VCR 503 or from an AC to DC converter 501, which may be plugged directly into an AC wall outlet (not shown)), communication of polling and/or interrupt signals, and the like.

When it is desired to add the tracker 100 to the HMD 102, the tracker will be physically connected by straps 104a, 104b. The tracker cable 34 will be plugged into a socket in the HMD 102. Cable 134, via plug 136, is then coupled to a video generator, such as by plugging into the serial port of a PC 514a, optionally via PC interface 506. Video signals (and, where provided, audio signals) received over the cable 134 are passed through the tracker electronics, preferably substantially unchanged, so that the image and/or audio information may be provided to the HMD 102. The tracker 100 is powered via power received over the cable 134 (and provided, in turn, to the HMD) and receives the signals and provides output to the PC or other tracker-data receiving apparatus, preferably via PC interface box 506 as described more thoroughly below.

By providing a tracker 100 which is readily detachable from the HMD 102, the user is provided with a greater flexibility and can, if desired, use the HMD 102 without the tracker 100, and thus with a lighter weight than otherwise, for uses such as watching movies or viewing computer displays from an application which does not need tracker information. By providing a tracker 100 which is readily detachable, it is possible to minimize the number of items which a manufacturer or retailer must maintain in stock while still providing a broad range of options for the user. Thus, using this configuration it is possible to, e.g., sell one or more "video-only" products or "HMD with tracker" products, and/or a tracker upgrade, if desired, while maintaining only two types parts in stock (HMDs and trackers). In one embodiment, a given model of tracker can be attached to any of a plurality of models of HMDs.

This feature of the invention can be accomplished using a number of different tracker technologies, including magnetic (both sourceless and sourced), optic, inertial and gravitational sensors, preferably with the technology being compatible with providing a sufficiently simple coupling between the HMD and the tracker, in order to achieve ease of decoupling. In one embodiment described more thoroughly below, the tracker combines a 3-axis magnetic sensing system and a 2-axis gravimetric sensing system to calculate angles for pitch, roll and yaw. As used herein, "pitch" refers to rotation or pivoting of the head in a medial axis or plane (a nodding motion), "roll" refers to rotation of the head in a lateral plane (e.g. leaning the left ear toward the left shoulder), and "yaw" refers to rotation about the spinal axis (generally corresponding to compass heading when the user is generally upright).

Figure 24:
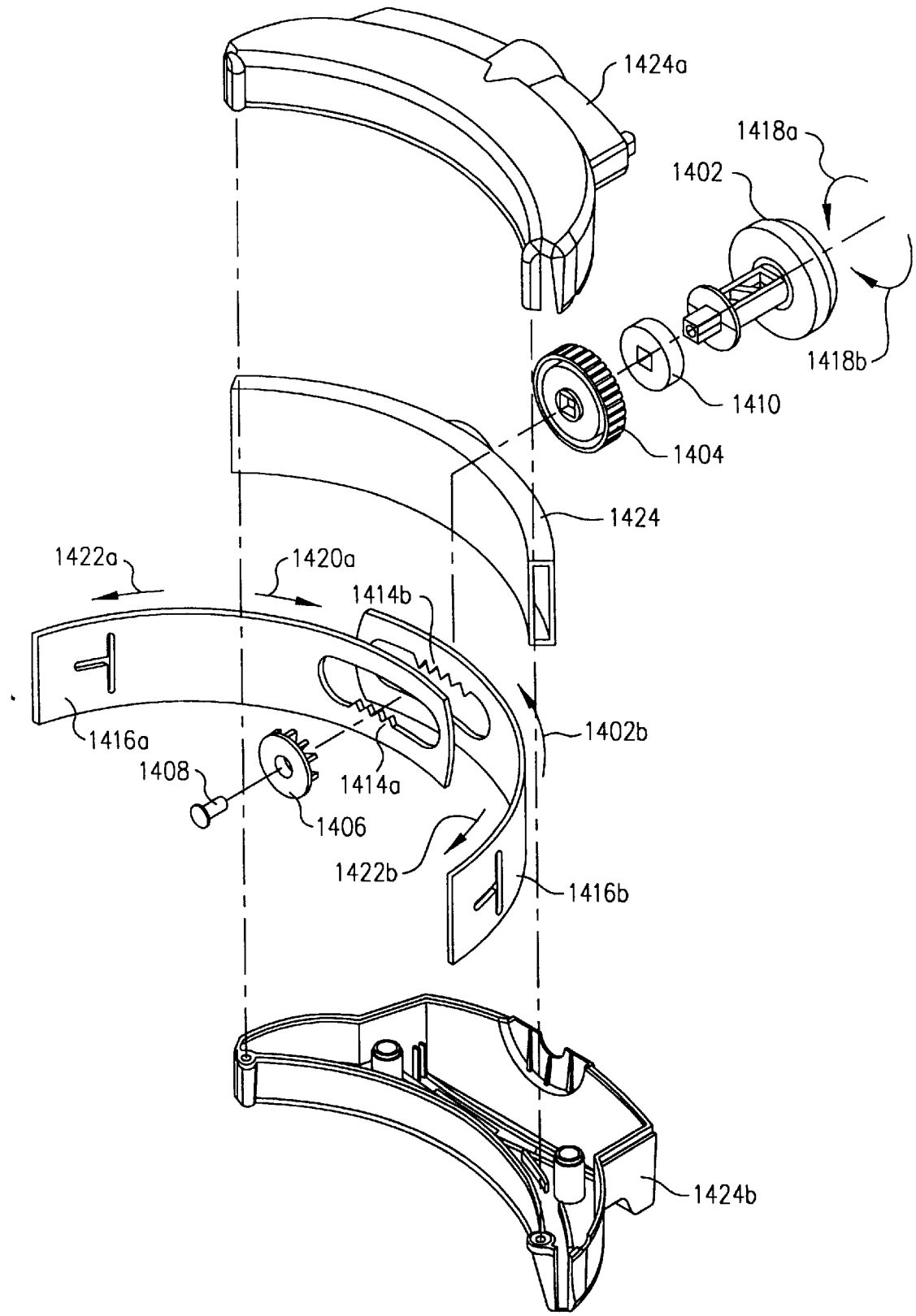
FIG. 24 is an exploded perspective view of a strap tensioning device according to an embodiment of the present invention.

In one embodiment the tracker housing 100 also houses a strap adjustment mechanism e.g. for loosening or tightening the strap on the user's head. In the embodiment depicted in FIG. 24, knob 1402 is coupled to pinion 1404 by holder 1406, pin 1408 and washer 1410. Pinion 1404 engages lower rack 1414a of strap extension 1416a and upper rack 1414b of strap extension 1416b. Rotation of knob 1402 in a first direction 1418a causes the strap extensions to move in respective directions 1420a, 1420b within guideway 1424 so as to tighten the straps on the user's head and rotation of knob 1402 in a second direction 1418b causes the strap extension to move in respective directions 1422a, 1422b so as to loosen the straps on the user's head. The mechanism may be enclosed in a housing 1424a, 1424b which, if desired, can also be used to enclose tracker devices and electronics. In the depicted embodiment, a pad or cushion 109, e.g. foam rubber, lines the inner region of the tracker 100 and contacts the user's head 111. Preferably the pad 109 is removably attached, such as by a hook and loop material, snaps or the like, permitting substitution of a different pad 109, e.g. having a different shape or thickness to accommodate a particular user's head size or shape.

Figure 20:
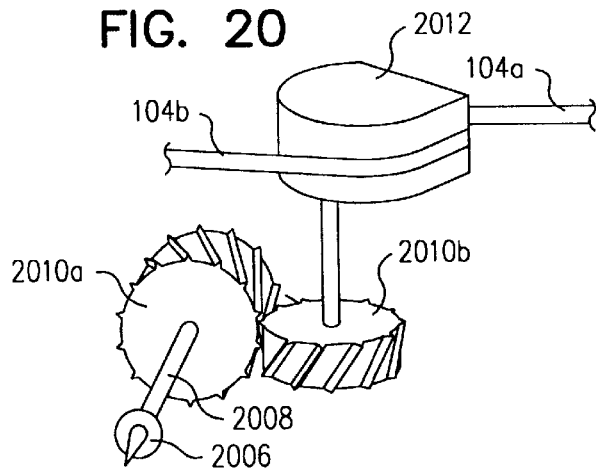
FIG. 20 is a perspective view of a strap tensioning device according to an embodiment of the present invention.

In the embodiment depicted in FIG. 20, knob 2006 is provided for loosening or tightening the strap using a mechanism as follows. Knob 2006 rotation is transmitted to shaft 2008 which, via gears 2010a, 2010b causes movement of cam 2012, thereby loosening or tightening straps 104a, 104b. Other loosening and tightening mechanisms can also be provided, such as mechanisms using motors, levers, ratchet mechanisms, and the like.

Figures 2, 25A:
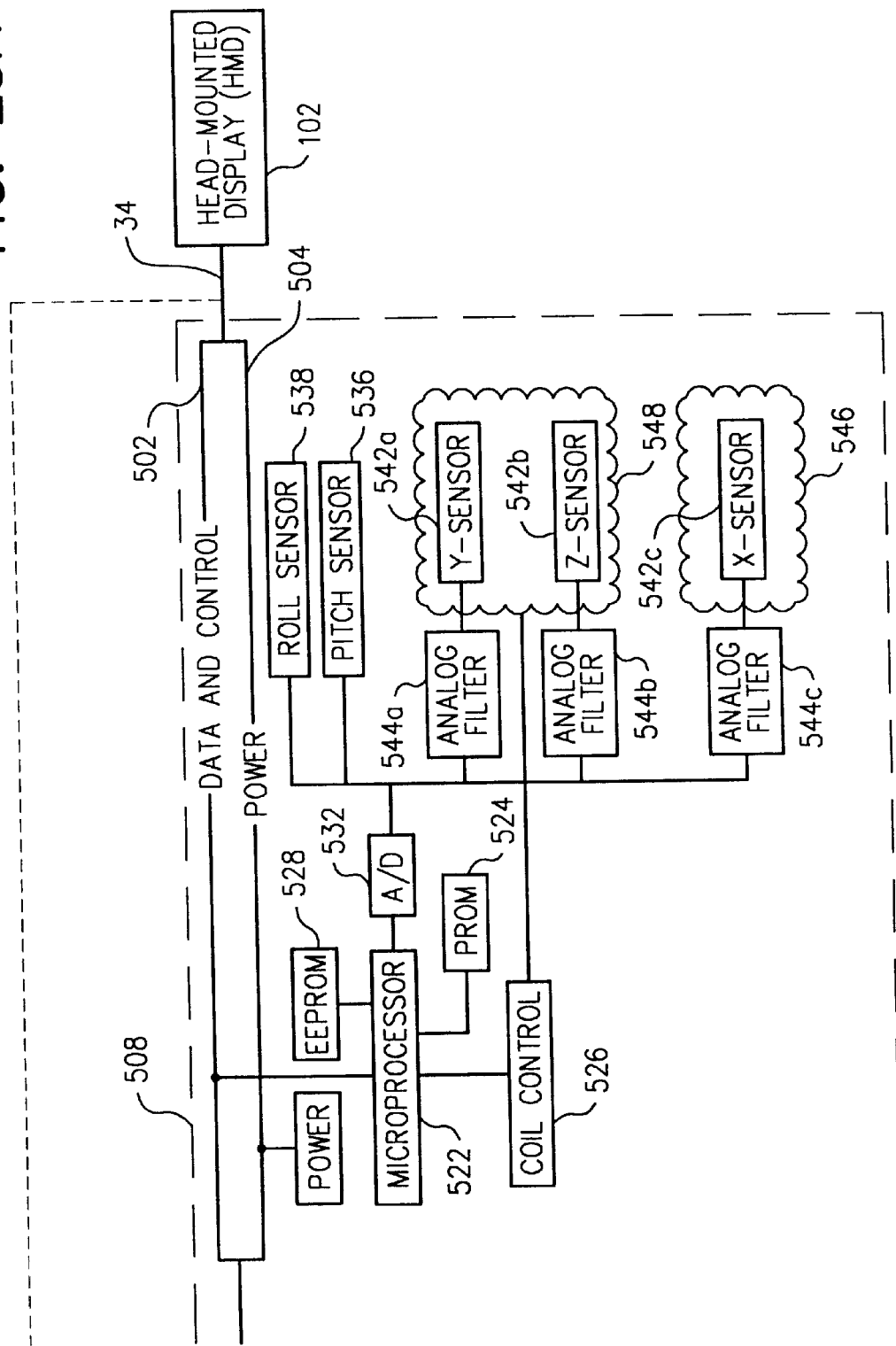
FIG. 2 is a front view of the apparatus of FIG. 1.
FIG. 25A is a block diagram of a image generation and display system including a tracker.

FIG. 25A depicts, in block fashion, the coupling of an HMD and tracker to a computer 510, via a PC interface 506. Data and control signals 502 and power 504 are provided from the PC interface 506. The tracker circuitry 508 passes the signals through, to and from the HMD 102. Thus, when the tracker 508 is not connected, the HMD 102 may be connected directly to the computer 510 (via the PC interface 506) as depicted, e.g. in FIG. 25B. When the HMD is to be used with an image generator such as a VCR, video disk player, video receiver and the like, the HMD may be connected directly 512, without passing through an interface or via a junction block 505 (FIG. 22) if desired. The PC interface 506 is coupled to the computer 510 via at least the video port 514b. Preferably, the PC interface 506 is also coupled to the computer via the serial port 514a, (which, in one embodiment, forms the primary I/O port for tracker information, but which can be used for, e.g. providing control and/or configuration signals to the head tracker 100, HMD 102 and the like), via the audio output port 514d, (e.g. for outputting audio to headphones 52a, 52b which may be attached to the HMD 102) and, optionally, an audio input port 514c, (e.g. for receiving input from a microphone, not shown, which may, if desired, be coupled to the HMD and/or which may be used for providing input, e.g. via voice recognition, recording sounds, telecommunications and the like). In many situations it is desirable to provide video and/or audio output to an external video screen or monitor 515a and/or speakers 515b (e.g. PC and/or multimedia speakers) and the PC interface 506 provides signal splitters and/or a pass through 516 of the video and audio output signals for this purpose, preferably such that the video and/or audio can be output on the monitor 515a and/or speakers 515b at the same time as the identical video and/or audio is being output on the HMD 102.

In the depicted embodiment, the digital operation of the tracker is controlled by a microprocessor 522, which, in one embodiment, can be a Motorola 68HC11D0 microprocessor. Firmware, e.g., programs for the microprocessor, may be stored in a programmable read-only memory (PROM) 524, such as, for example, a PSD3-11L PROM. The microprocessor receives and processes requests from the host computer 510 as described more fully below. Microprocessor 522 also provides control signals to the coil control 526 and tilt sensors (as described more fully below). Microprocessor 522 is coupled to an electronically-erasable, programmable read-only memory (EEPROM) 528, e.g., for purposes of storing and accessing sensor compensation information as described more thoroughly below. The microprocessor 522 reads tilt and magnetic sensor data from the analog-to-digital (A/D) converter 532, performs calculations on the data, e.g., to output data according to a requested format, and sends data to the host computer 510.

In the depicted embodiment, two separate pitch-tilt and roll-tilt sensors are provided, 526, 528, and separate X, Y and Z orthogonally-mounted magnetic sensor arrays 542a, 542b, 542c, each with a corresponding analogue filter 544a, 544b, 544c are provided. In the depicted embodiment, a first normalization coil 546 substantially encompasses the X sensor 552, and a second normalization coil 548 substantially encompasses both the Y sensor and Z sensor 542a, 542b. By providing one of the normalization coils 548 in such a configuration that it encompasses two of the sensor arrays 542a, 542b, the manufacturing process is simplified since the two coils 546, 548, are more easily mounted on, e.g., a printed circuit board than if each sensor array 542a, 542b, 542c was required to have its own coil.

Figure 25C:
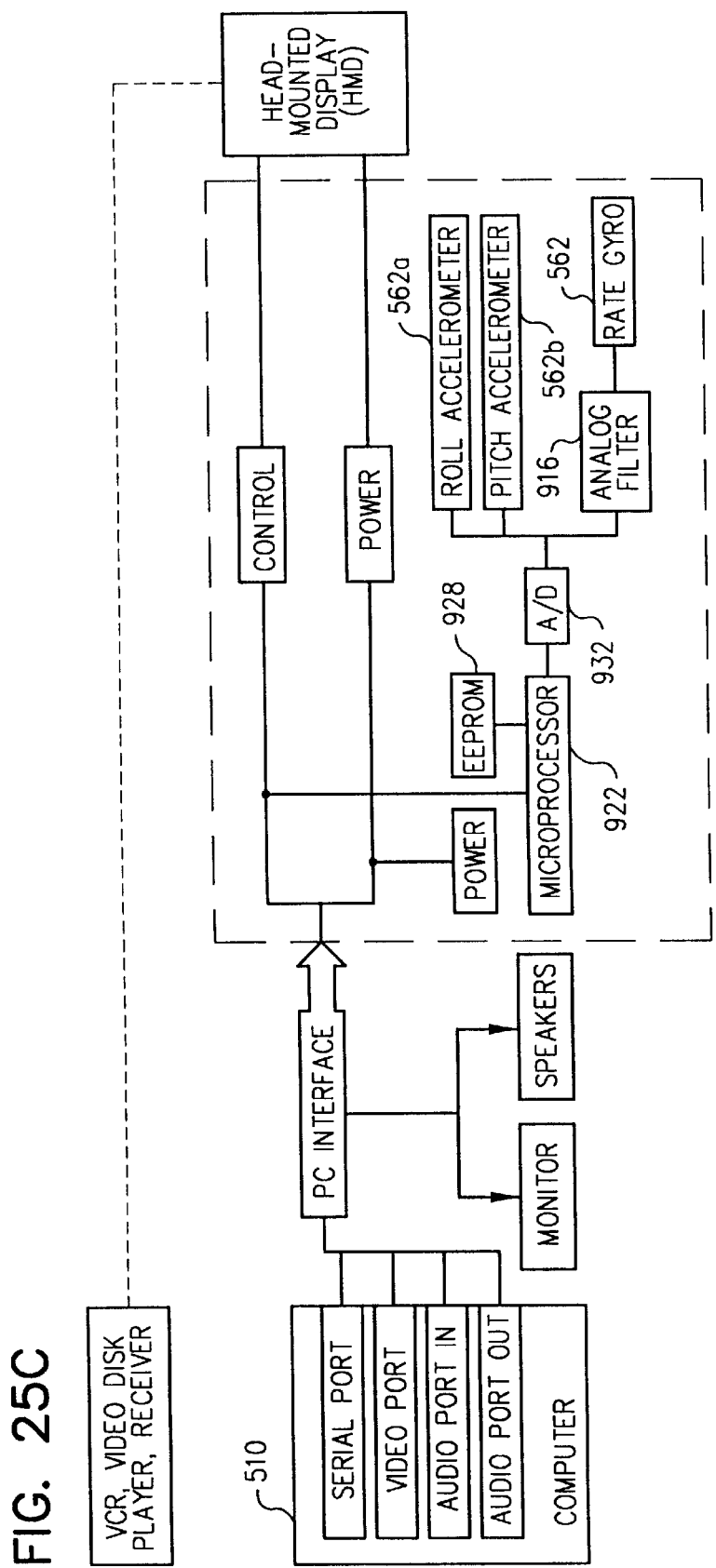
FIG. 25C is a block diagram of a display system including an HMD and a tracker.
Figure 27A:
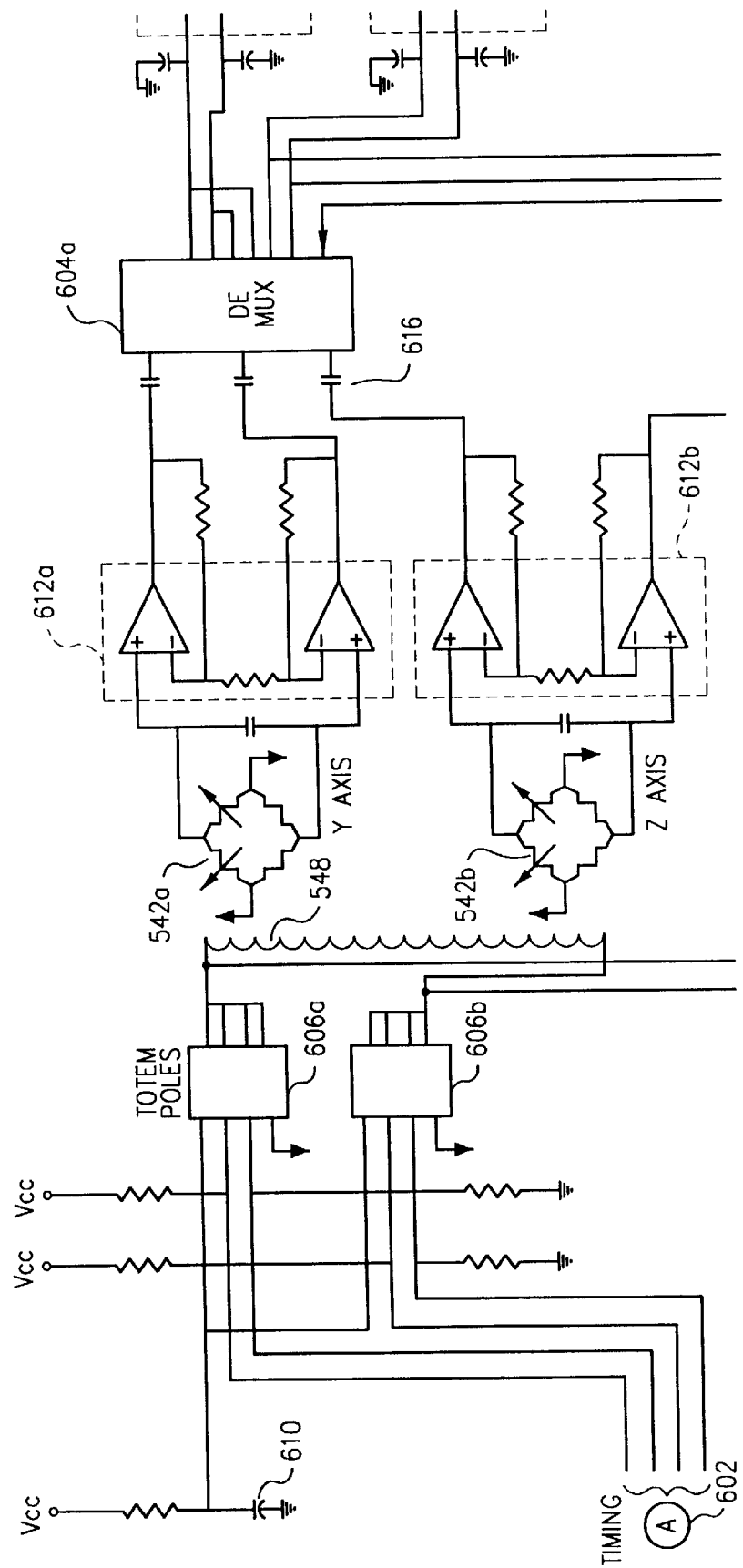
FIG. 27 is a schematic and block diagram of a magnetic tracker system according to an embodiment of the present invention.
Figure 27B:
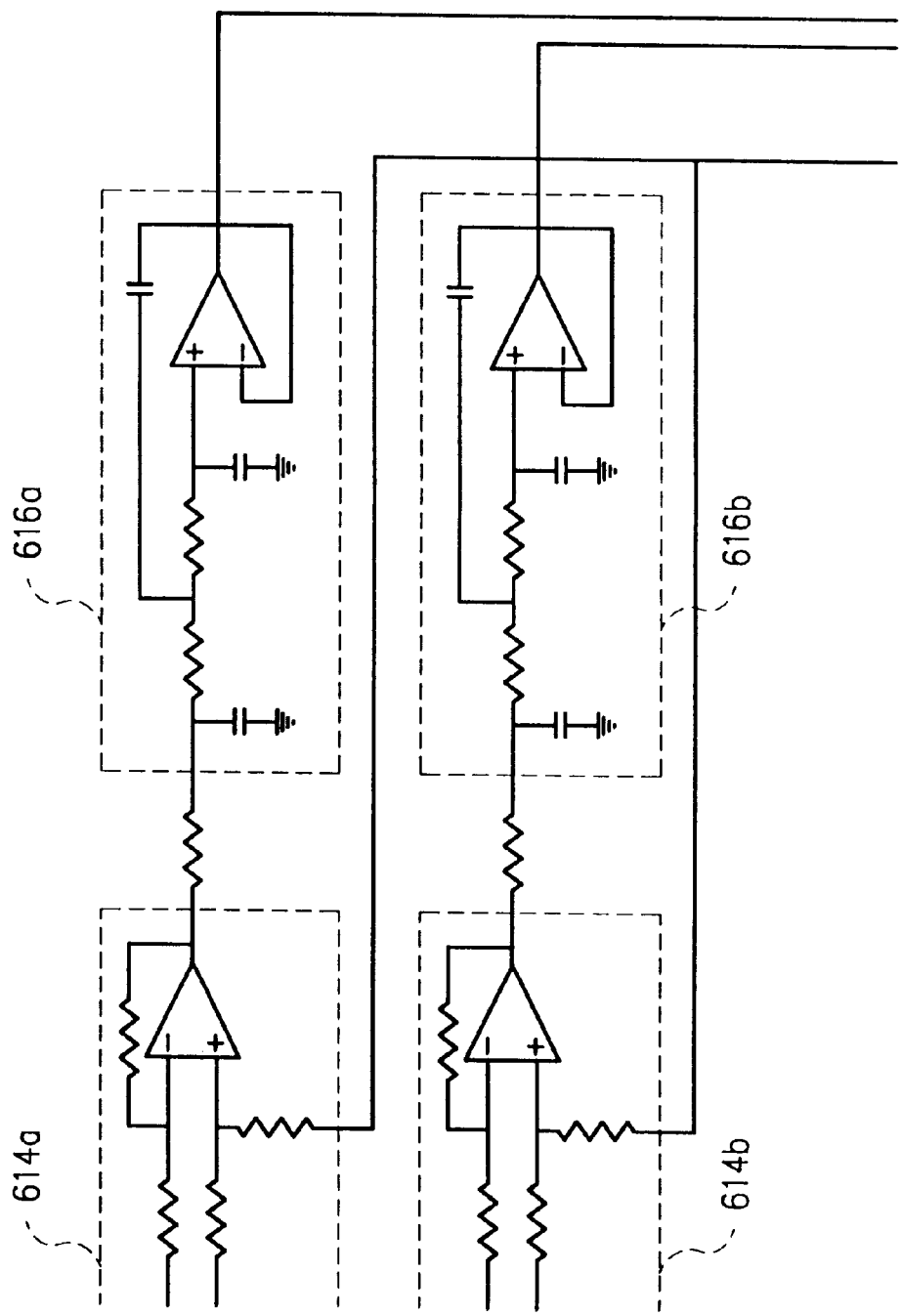
Figure 27C:
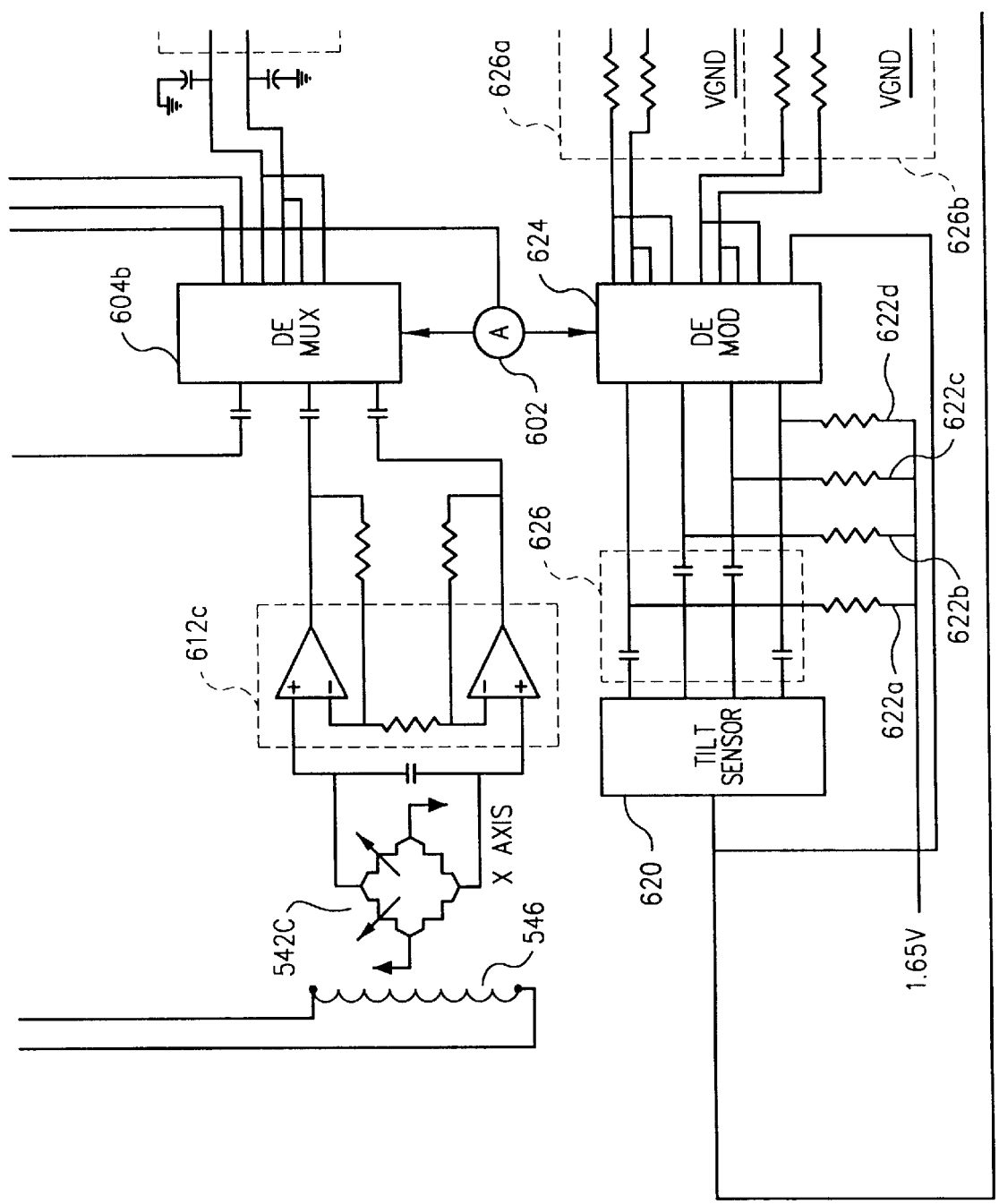
Figure 27D:
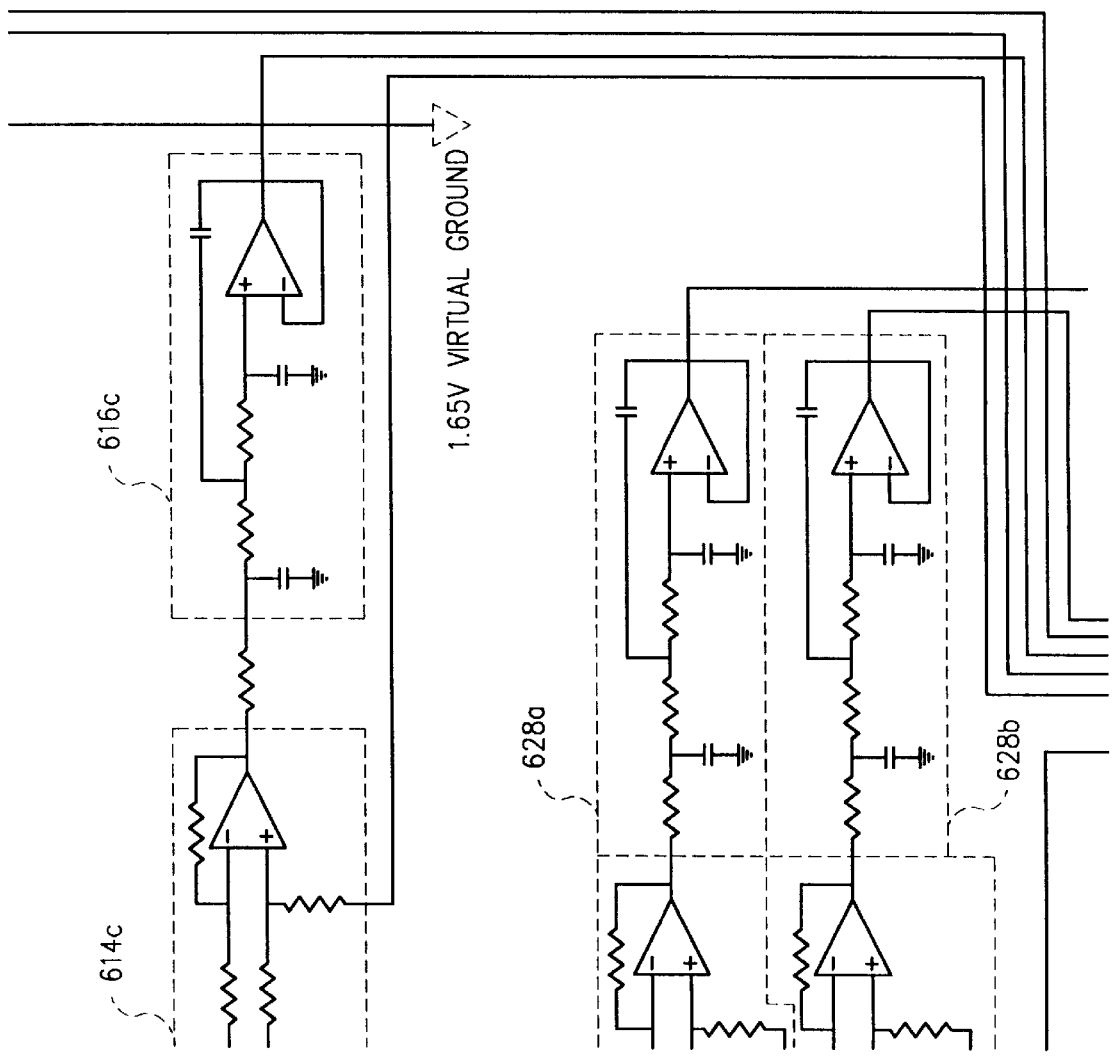
Figure 27E:
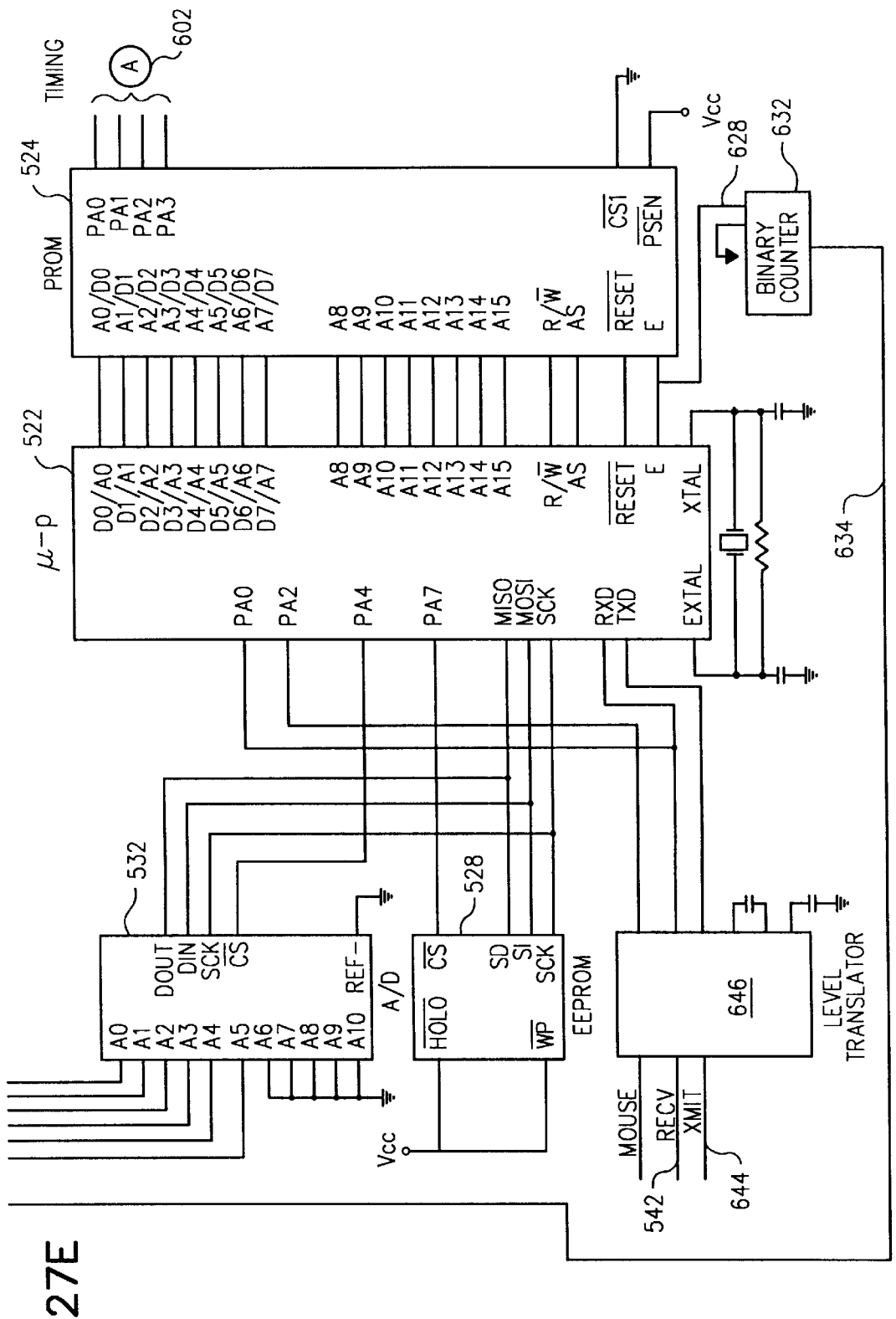

In addition to a magnetic/gravimetric head tracking system as depicted in FIG. 25A, it is also possible to provide other sensing technology such as an inertial sensing technology, e.g., of the type depicted in FIG. 25C. In the embodiment of FIG. 25C, pitch and roll are sensed respectively by accelerometers 562a, 562b, and yaw is sensed using a rate gyro 562 as described more thoroughly below.

FIG. 26 depicts tracker circuitry in block diagram form. In the embodiment of FIG. 26, signals from the tilt sensor 662 are demodulated 664, amplified and, optionally, filtered 666 before being provided to a processor 668 via an analog-to-digital converter 670. Magnetic sensor 672 are normalized by pulses 674 generated under control of the processor 668 and the sensor output is amplified 674, demodulated 676 and filtered 678 before being provided to the processor 668 via the A/D converter 670.

FIG. 27 depicts an embodiment of tracker circuitry in somewhat greater detail. For purposes of clarity, power lines and the like are not shown. In the embodiment of FIG. 27, each of the sensor arrays 542a, 542b, 542c is in a bridge form, similar to a Wheatstone bridge, with two (variable resistance) legs of the bridge comprising magnetoresistive elements such as Model KMZ10B available from Philips Electronics. The Y and Z sensors, 542a, 542b, are normalized by a normalizing coil 548 while the X sensors are normalized by normalizing coil 546. In particular, part of the magnetic field sensing process involves pulsing normalizing coils 548, 546, around the magnetic sensors before each measurement. The microprocessor 522 provides signals that are decoded in the PROM 524 to generate timing signals 602 (e.g. by enabling various switches) for steering current through the coils, and also for switching analog switches in a synchronous demodulator circuit as described more fully below.

To normalize the magnetic sensors 542a, 542b, 542c prior to measurements, the coils are pulsed to provide strong magnetic fields that reorient the magnetic domains in the sensors. To compensate for DC offset and drift, the polarity of the coil current is alternated at regular intervals and the sensor outputs measured. The multiplexers 604a, 604b, define a commutating circuit to provide synchronous rectification and demodulation of the resulting AC signal. Coils 548, 546 are connected in parallel to "totem pole" switch arrays 606a, 606b. Between pulses, the switches are turned on, grounding both sides of the coils. For alternate current pulses, one of these switches is turned off and its corresponding switch on the other totem pole is turned on for a pre-determined period such as 40 microseconds. The switch polarities are then reversed and about 3 milliseconds passes before the sequence is repeated with the other pair of switches. The current in the two coils 548, 546 approaches two amps at the end of the pulse duration, so capacitor 610 has been furnished for providing current surges without putting noise on the 5-volt power bus. The voltage on capacitor 610 varies by about 600 to 700 mV as it discharges each coil pulse and recharges between pulses.

The resistors or sensors 542a, 542b, 542c behave like resistor bridges that provide small voltage variations between two terminals in response to the magnetic field aligned with the sensor. In the depicted embodiment, the signal amplitude of the output variation is on the order of 2 mV for fields having a magnitude of the Earth's magnetic field. The synchronous demodulator circuit 604a, 604b, used in conjunction with the polarity-reversing circuit, cancels both external noise and DC offset and/or temperature offset drift components in a sensor's output voltage. The polarity of each sensor's output is determined by the orientation of an orthogonal normalizing field. Because the DC offset for each sensor maintains its polarity regardless of the normalizing pulse polarity, the sensors are "flipped" by the normalizing coil pulse to give alternating polarity to the output. Therefore, the output from the sensors 542a, 542b, 542c can be AC-coupled and rectified, nulling out offset voltages and drift. Preferably the normalizing coils are pulsed at intervals of approximately 3.5 milliseconds with polarity alternated on each pulse.

The outputs of the sensors are provided to the non-inverting inputs of dual op amps configured as instrumentation amplifiers 612a, 612b, 612c. In the depicted embodiment, the instrumentation amplifiers 612a, 612b, 612c provide a gain of about 100. The demultiplexers 604a, 604b are configured as double-pole double-throw (DPDT) switches with outputs cross-wired so as to swap the routing of the inputs when the switch is toggled. The effect is that of a full-wave bridge rectifier synchronized to the polarity signal. When the coils are being pulsed, the demultiplexers 604a, 604b are inhibited from passing signal, to prevent voltage transients from the sensor produced by the coil pulse from being passed on to the following stage of the circuit.

Outputs from the demultiplexers 604a, 604b are fed to inputs of a differential amplifier having a gain of about five. 614a, 614b, 614c. When there is no magnetic field component aligned with a given sensor, the corresponding outputs do not change as its normalizing coil pulses change polarity and thus the output of the differential amplifier 614a remains unchanged. When one of the sensors senses a magnetic field its output voltage shift corresponds in polarity to the polarity of the normalizing pulse which will be reflected in the output of the corresponding differential amplifier 614a, 614b, 164c. Although the sum of the offsets of the magnetoresistor and the op amp may generate differences of several hundred millivolts, between the outputs of the dual op amps 612a, 612b, 612c, this difference does not change with the reversal of the normalizing magnetic field from the coil and is canceled through the AC coupling 616 and differential amplifier stages 614 that follow.

The signal from the differential amplifiers 614a are smoothed by low-pass filters 616a, 616b, 616c. In one embodiment the low-pass filter has a corner frequency of about 20 Hz and reduces 60 Hz noise by about –20 dB. The filter is useful for, e.g., attenuating interference from power line circuits, CRT deflection circuits, and switching transients. Output from the low-pass filters 616a, 616b, 616c are provided to the analog-to-digital converter 532.

In the depicted embodiment the tilt sensor array 620 contains both the pitch- and roll-tilt sensors. A number of types of tilt sensors can be used. In one embodiment a tilt sensor utilizes an electrolytic liquid for determining the amount of tilt of the tracker. Liquid partially fills an envelope containing 5 electrodes which will be substantially vertical when the HMD is in normal vertical position. The 5 electrodes form a square pattern with 1 electrode in the center. As the sensor is tilted, some electrodes are covered with more electrolyte and the opposing electrodes receive less coverage. The liquid is resistive in nature and forms voltage dividers with resistors 622a, 622b, 622c, 622d. A voltage such as 5 Vpp drives the center electrode and this voltage is subsequently attenuated according to the amount of liquid making contact with the other electrodes. These outputs are routed to a synchronous demodulator 624 which, like demodulator 604a, 604b, can be a CMOS switch array configured as a synchronous full-wave rectifier.

Because the liquid in the tilt sensor is an electrolyte, it is operated in an AC environment to avoid electrolysis and plating the electrodes. DC-blocking capacitors 626 prevent DC flow. A clock signal 628 drives a binary counter 632 to provide an alternating signal, such as a 2.4 kHz signal for the tilt sensor control 634.

Output from the demodulator 624 is provided to a differential amplifier 626a, 626b, and then to a low-pass filter 628a, 628b, similar to the ones used in the magnetic amplifier circuit. Output from the low-pass filter 628a, 628b are provided to the A/D converter 532. In the depicted embodiment, the A/D converter provides 10-bit data conversions for the 3 magnetic and 2 tilt measurement voltages. The microprocessor provides output over a serial output line 642 and receives data over a serial input line 644 via level translator 646 which may be, e.g., a MAX 202 level translator. Data received over serial line 644 from the host computer 510 may be data for specifying the output format for the tracker data, may be a polling signal to request transmission of tracker data and the like. Data output from the tracker over serial line 642 may be in a number of formats as described more fully below. The microprocessor 522 receives data from the A/D converter, may optionally or selectively provide further signal modification such as software filtering, and outputs data in an appropriate format to the level translator 646.

In one embodiment, the tracker communicates with the host computer 510 via an RS232C 3-wire serial interface (TXD, RXD, GND). Preferably the tracker can communicate at 1200, 2400, 4800, 9600 and 19200 bits per second (bps). In one embodiment, the head tracker provides a sample rate of about 250 Hz. The tracker can be queried and tested using a standard ASCII terminal program. Preferably, all commands provided to the tracker are printable ASCII streams. Preferably, the tracker responds to all commands by transmitting feedback to tell the application in the computer 510 if a command was successfully processed.

One difficulty that has been noted in connection with magnetic sensors is that the sensors are responsive to changes in local magnetic field. For example, if there is a magnet or magnetic source in the vicinity of the head tracker (such as a loud speaker or headphone or some other nearby magnet) movement of such a magnet can be detected by magnetic sensors and may be interpreted as an indication of movement of the user's head, even when the user is maintaining his or her head stationary. This difficulty can be at least partially overcome by providing a cancellation or "bucking" magnet adjacent each earphone driving magnet. However, inertial sensors such as rate gyros, accelerometers, and the like, have the advantage of being substantially immune to magnetic perturbations and thus more accurate, in this sense, than magnetic sensors. It is also believed that trackers employing inertial sensors may be provided with fewer circuit elements, and, in general, are easier to manufacture, design, repair and/or maintain and are less expensive to produce than magnetic sensor trackers. Furthermore, when the HMD has circuitry that generates magnetic fields (e.g., step-up transformers for the HMD back light), it is preferred to locate magnetic sensors away from such magnetic sources, e.g., as depicted in FIG. 1, to avoid magnetic interference. Because inertial sensors substantially are not subject to magnetic fields, such sensors could be located adjacent to HMD electronics such as in the visor region 12 of the HMD. Such a position could permit the use of less cabling, e.g., elimination of cable 134, and provide a smaller, more compact design. In one embodiment, the tracker would be provided integrally with the HMD and would not be user-detachable. However, because of the relatively small size and weight of inertial sensors, as opposed to a magnetic sensor system, there is less need for user-detachability.

Inertial sensors, however, are not without their own problems. Rate gyro sensors, for example, are subject to drift, such as drift arising from sensor output changes in response to changes in sensor temperature. In some cases, inertial sensors do not detect very slow and/or low acceleration movement. Some inertial sensors will "peg out" or fail to properly measure the full magnitude of very rapid or high-acceleration movement. Since, in one embodiment, rate values are continuously integrated to generate continuous position values, position values can accumulate and/or cause undesirable artifacts in the position value. These errors, particularly if they accumulate through time, can cause a tracker to output information which does not accurately or correctly indicate the position, attitude, or motion of the tracker unit. As one example, consider a situation in which a user is employing an HMD/tracker in connection with game software which permits the user to move his or her head so as to view different portions of a virtual environment. Ideally, if a user is initially looking straight ahead, then rotates his or her head to the left and then returns his or her head back to the straight-ahead position, the tracker will correctly indicate that the starting and ending head positions are the same and thus the display at the start and end of this motion will be the same. However, it is possible for drift or other inaccuracies of an inertial tracker to create a situation in which, after the user returns his or her head to the initial position, the tracker outputs information indicating that the user is a few degrees away from the initial position (representing the accumulated drift) and thus the display presented to the user will be slightly skewed or offset from the desired initial display.

According to an embodiment of the present invention, a correction is provided for offsetting or overcoming the problem of such drift. Various approaches can be used for making this correction. For example, it is possible to provide some absolute frame of reference such as from a magnetic sensor, an optical sensor or the like, which will provide an indication of the amount of drift with respect to some fixed frame of reference (such as the local magnetic field, a fixed optical object and the like). Such frame of reference sensor need not provide the sensitivity and fine discrimination needed for tracker sensors and thus can be provided at lower expense than the inertial sensors while still providing sufficient information to overcome problems of drift.

Another approach involves calculation of a long-term average. In one embodiment, an inertial sensor such as a rate gyro outputs a signal in volts which can be characterized a having both a null offset voltage and a sensitivity. Null offset is the voltage when there is no physical movement being imparted on the sensor. Sensitivity is the magnitude of output voltage change for a specific amount of motion of the sensor. Both null offset voltage and sensitivity may be less than perfectly stable or may exhibit changes in linearity, either in time and/or in response to changes in temperature or other environmental variables. Use of a long-term average is helpful in addressing instability in the null offset value. In one embodiment, values output by the rate gyro (or other sensor) are continuously added-up in an "accumulator" variable. When this sum is divided by the number of samples it contains, the result is an average value. If averaged over a sufficiently large number of samples, the average will be the (current) null offset, to within the resolution of the digitizer. In most situations, due to limitations of the accumulator, the accumulator is reset to zero, such as periodically, or the average would be each time subtracted from the accumulator. The long-term average can be calculated periodically or can be a running average. The long-term average can also form a basis for determining if the user's head is moving. For example, the user's head can be determined to be moving if the difference between the sensor reading and the offset value is greater than a specified threshold. The threshold can be chosen for a given sensor noise specification and sensitivity. In one embodiment the position indication output by the device is not updated when the device indicates the user's head is not moving. This avoids outputting indications of head position changes which result from small sensor drift.

Yet another approach, which may be combined with the long-term average described above, involves the definition of an initial or reference position. For example, the apparatus, and associated software, may take, as the reference position, whatever position is indicated by the tracker at the time the computer or other apparatus is booted up, at the time a particular software application initially executes, at a time selected by the user (e.g., by pressing a key or button) and the like. Thereafter, if the tracker moves away from the initial position and subsequently moves back to the initial position, outputting an indication of an angle (X1) which differs from the initial position (X0) by no more than a predetermined angle (e.g., 20°) it would be assumed that the user has actually returned to the initial position (X0) and the difference (X1−X0) was caused by drift. It is believed that, commonly, a user will intend to repeatedly return to an orientation e.g. aligned with a joystick, keyboard, etc. In this situation, small departures from such orientation are likely to represent the effect of sensor drift and correction can then be applied in an amount equal to the amount of such drift.

Figure 23:
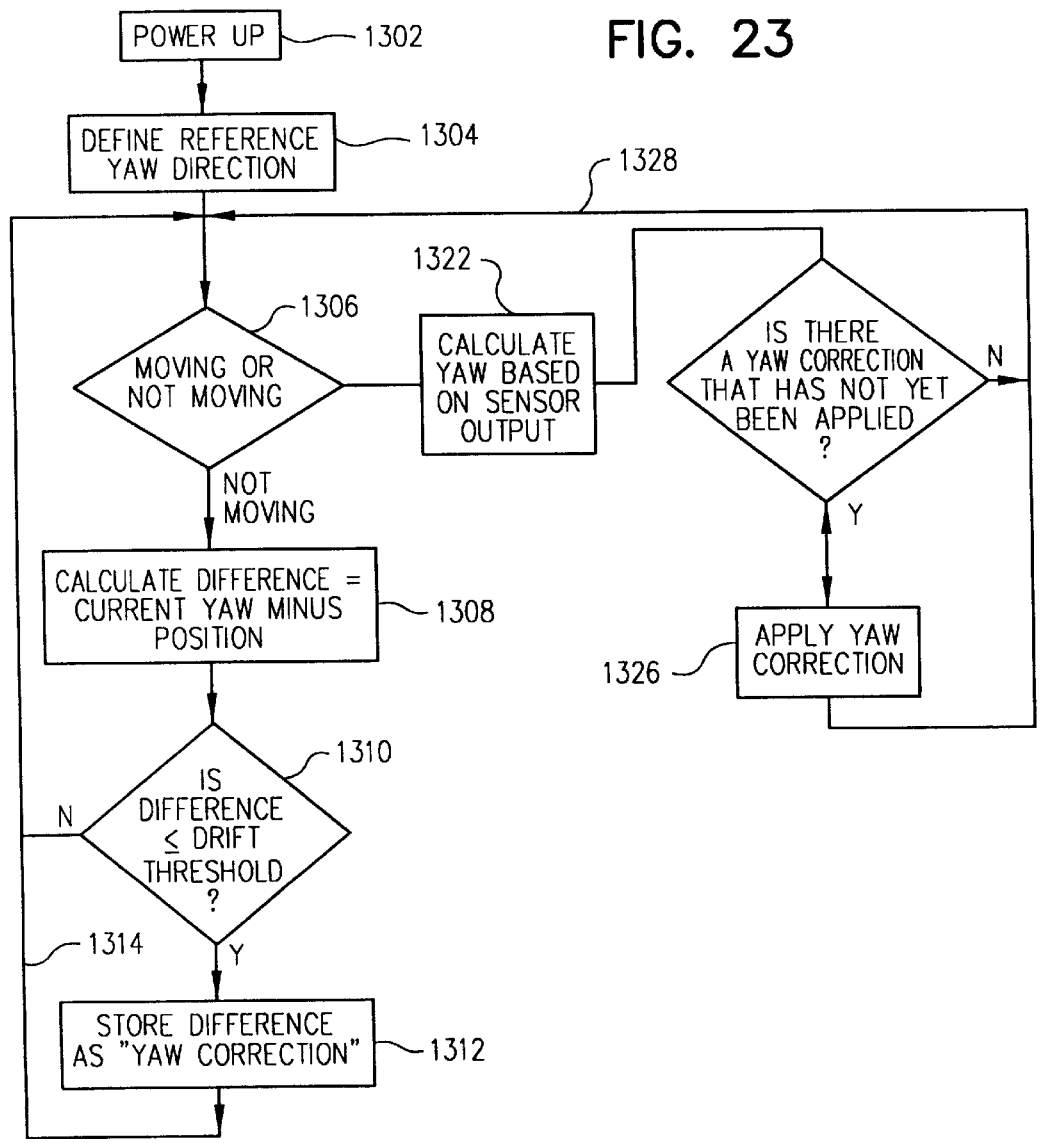
FIG. 23 is a flow chart showing an example of a drift compensation process.

One process for using inertial sensors and correcting for drift begins with the initial powering up of the apparatus 1302 (FIG. 23). A reference direction, e.g., a reference yaw direction, is defined, e.g., as described above, and stored. During operation, the process determines whether the head tracker is currently moving or not moving. This can be done in a number of ways, preferably based on the historical average (as described above) or other statistical analysis of recent tracker output. In one embodiment the tracker is assumed to be not moving if both (1) the amount of variance in the tracker output is less than a predetermined threshold and (2) the current apparent position (based on the sensor output) is different from the most recent apparent position by at least a threshold amount. In one embodiment, drift is computed only when the apparatus is in a nonmoving state, preferably for at least a threshold period of time. If the tracker is in the nonmoving state, the difference between the current apparent yaw position (based on the sensor output) and the reference or initial direction is calculated 1308. It is then determined whether this difference exceeds a drift threshold amount 1310. The value of the threshold can be based on a number of determinations, such as by being calculated theoretically or empirically. Threshold values which are relatively small may generate significant "false negatives", i.e., indications that there is no drift when in fact there has been drift of a relatively large magnitude. Threshold values which are relatively large will restrict the user's ability to look away from the reference direction since movements of the head (and thus the tracker) away from the reference direction by less than a relatively large threshold will be treated as drift rather than as real movement. In one embodiment, the threshold is less than about 30°, preferably between about 5° and about 25°, more preferably between about 10° and about 20°, and even more preferably between about 15° and about 20°. If the difference is greater than the threshold, it is presumed that there has not been drift and the procedure returns to the moving/not moving determination 1306. If the calculated difference is within the drift threshold that difference is stored as the yaw correction value 1312 and the routine returns 1314.

If it is determined that the head tracker is in a moving state, after calculating the apparent yaw value based on sensor output 1322, it is determined whether there is a yaw correction value, and, if so, that value is applied, e.g., by adding to the calculated yaw value 1326 before the procedure returns 1328. In one embodiment, the feeding back of position error is done in specified quanta, and error correction has little or no noticeable visual artifact.

FIGS. 30A through 30F, 31A through 31F and 22 show an example of one application of the procedure FIG. 23. At time T1, (FIGS. 30A and 31A) the head of the user 1002 is aligned with a reference yaw direction 1004. The reference direction can be an absolute direction (e.g. magnetic north) or, in one embodiment, can be an arbitrary direction, e.g. selectable by the user or the direction at time of boot up. The tracker outputs data indicating an alignment 1102 parallel with the reference direction 1004. In the embodiment as shown FIG. 22, at time T1 the tracker outputs an indication of 0° displacement from the reference yaw direction 1202.

Figure 22:
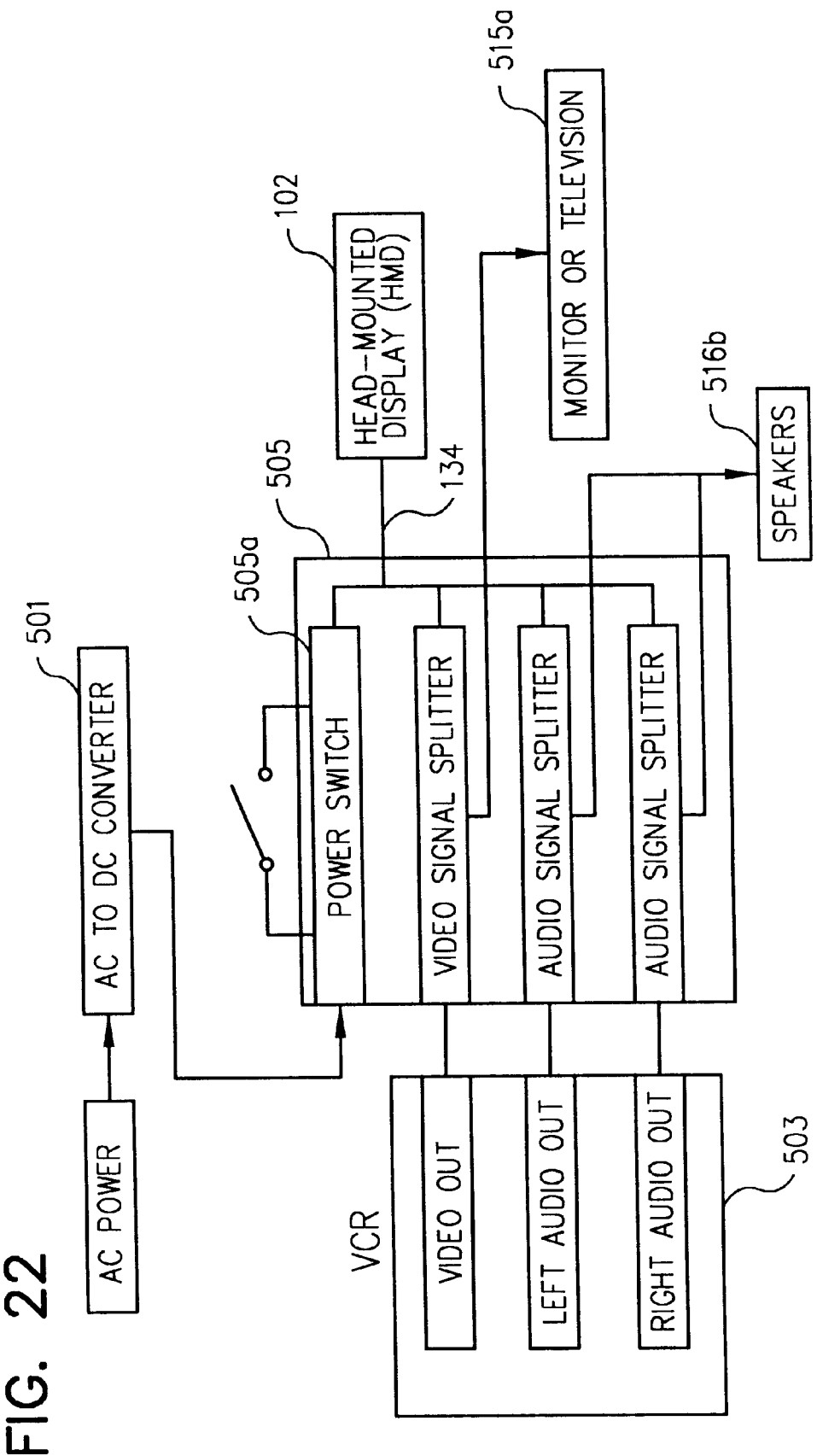
FIG. 22 is a block diagram of an HMD coupled to a VCR.

At time T2, the user has rotated (yawed) his or her head 45° to the left 1006. In the present example it is assumed that, at this point, there has not yet been any tracker drift and thus the tracker outputs an indication of a position 1108 which is 45° 1106 from the reference yaw direction 1104 and this output is shown in FIG. 22 1208.

At time T3, the user has rotated his head 1002 back to the original position (the same as the position depicted in FIG. 30A), aligned with the reference direction 1004. However, it is assumed that in the period between time T2 and time T3, drift has occurred so that the tracker provides an indication 1110 of a direction which is at an angle X1 (1112) with respect to the reference direction 1004. Thus, angle X1 (1112), shown in FIG. 22 (1212) represents the amount of error or sensor drift. At time T3, the sensor has just finished movement (as shown in FIG. 22) and thus the device has not yet indicated a "not moving status" 1306. As a result, no drift or yaw correction is calculated at this time.

In the present example, during the period between time T3 and T4, the user maintains his or her head substantially stationary and there continues to be a certain amount of drift 1112 during this period. However, during the period between time T3 and T4, it is determined that the tracker is substantially not moving 1306. Accordingly, during the period between time T3 and T4, the apparatus calculates the value of angle 1112 and determines that this angle is less than a threshold angle (e.g., less than 20°). As a result, a "yaw correction" value is stored. However, the yaw correction value, in the depicted embodiment, is not applied at this point. Instead, yaw correction is not applied until the device is again in a moving state. One advantage of waiting until the device is in the moving state is that the yaw correction will be substantially imperceptible to a user since a user will typically not be able to perceive the application of a yaw correction during the time in which the tracker and, presumably the display image, is moving.

During the time period between time T4 and time T5, the user moves his or her head 1002 45° to the right (FIG. 10E). It is presumed that the sensor output is still experiencing some amount of drift and thus the uncorrected sensor output provides an indication 1122 of an angle 1124 which is X1° to the left of the true sensor position 1118 (i.e., 45° to the right of the reference direction 1004). However, because the yaw correction was applied during the time between time T4 and T5, by adding angle 1112 to the sensor output 1124, the corrected indication 1128 indicates the correct angle 1118, as also indicated in FIG. 22 (1218). Thus, when the user later returns his or her head to the reference direction 1004, the sensor drift angle 1112 has been applied as a correction and the sensor output 1032 (after correction) correctly indicates a zero angular displacement, as depicted in FIG. 22 1232.

The correction method described above can be implemented in a number of ways, including implementing in the microprocessor 922, implementing in the host computer 510, or a combination thereof. In addition to or in place of implementing the correction by software, an analog correction can be implemented if desired.

Figure 29B:
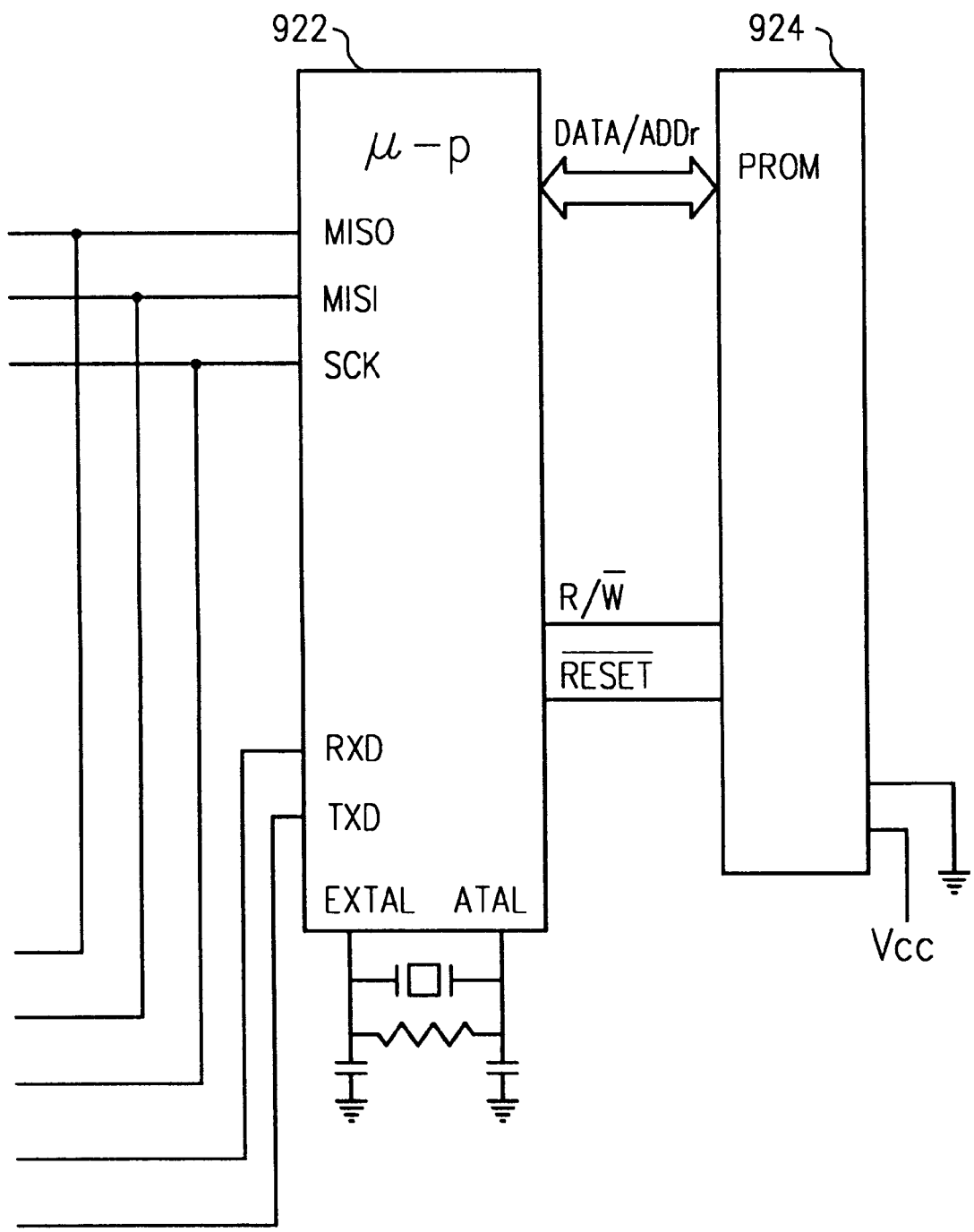
FIG. 29 is a schematic/block diagram of an inertial tracker according to an embodiment of the present invention.

FIG. 29 is a block diagram showing a hardware implementation which provides for inertial sensors. Although the implementation of FIG. 29 has certain similarities with the magnetic sensor implementation of FIG. 26, the amount of circuitry and the number of components provided is much smaller in the embodiment of FIG. 29. In the depicted embodiment, output from the rate gyro 562 is amplified by an amplifier 912 and analog filtered by a low-pass filter 916 before being provided to an analog-to-digital converter 932. The filtered output provides an indication of yaw angle. Outputs from accelerometers 562a, 562b indicating pitch and roll respectively are also provided to analog-to-digital converter 932 which provides output to a microprocessor 922. The microprocessor 922 can apply sensor correction data, e.g., for correcting for differences in sensor sensitivity, e.g., using data stored in an EEPROM 928. Data is processed in the processor 922, e.g., according to programs stored in a PROM 924. Processing can include, for example, software filtering and/or Euler angle calculation and/or encoding such as ASCII encoding. The processed data can be output, via level translator 946, in a manner similar to that discussed above in connection with FIG. 26.

Preferably the microprocessor and/or host computer also use the roll and pitch sensor data to calculate roll and pitch angles. One difficulty in previous methods of calculating roll and pitch angle from tilt sensors has been the amount of calculation, programming and/or time required to perform such calculations. According to one embodiment of the present invention, an improved calculation system is used which reduces the complexity of the calculation. Preferably, an indication of roll and pitch angle having acceptable accuracy is achieved by a process which involves only a single trigonometric calculation (preferably a cosine value obtained from a lookup table) and a square root ratio calculation. According to the method, it is recognized that each of the tilt sensors outputs an indication of a tilt angle along one of two different, preferably orthogonal, axes and thus defines a plane (or a family of parallel planes). The first step in the procedure involves calculating the angle which a defined plane makes with a reference plane, such as a horizontal imaginary plane. This is calculated using only one trigonometric calculation, preferably determining the arc cosine, preferably using a lookup table. Once it is known the angle which the plane, defined by the two tilt sensors, makes with an imaginary horizontal plane, this angle is proportionally distributed between the two sensor axes, in proportion to the magnitude of the sensor outputs. For example, suppose the two tilt sensors are currently outputting voltages of one volt and two volts respectively. Suppose the trigonometric calculation yields the result that the plane defined by the two sensors lies at an angle of 30° to the horizontal. By distributing this angle on the two sensor axes in proportion to the sensor output values, it is determined that the tilt angle along the first sensor axis is 10° and the tilt angle along the second sensor axis is 20°. Although this example is made on the basis of a linear distribution, in fact a square root ratio is preferably used for distributing the angle among the sensor axes.

One advantage of using an accelerometer for tilt sensing as opposed to an electrolytic tilt sensor is that an accelerometer has greater accuracy at high tilt angles, being substantially accurate and linear for angles up to at least about 90°. In contrast, electrolytic tilt sensors often display significant nonlinearity at angles greater than about 30°. In one embodiment, nonlinearity in the range of about 30° to about 60° is reduced or corrected by using correction factors obtained from a lookup "table" stored in memory.

A number of devices can be used as the rate gyro. Preferably, a rate gyro available from Murata Company of a type used in a hand-held video camera (camcorder), e.g., for reducing motion or jitter can be used. A number of accelerometers can be used such as those commonly available for use in connection with vehicle air bags or anti-lock brake systems including devices available from Motorola, Texas Instruments and/or Analog Devices. Inc.

In one embodiment, data may be output from the tracker in one of several send modes, one of several data modes, and one of several formats. The data mode may be ASCII encoded or binary encoded. The format may be "uncooked", "cooked" (software corrected and/or filtered), Euler angle or mouse emulation. The send mode may be continuous (streaming), polled or mouse emulation. It is contemplated that commercial applications will preferably operate in polled send mode, since, in many circumstances, error recovery is difficult in continuous mode and serial interrupts and CPU cycles are wasted.

In continuous (streaming) data send mode, a "start" signal received from the computer causes the tracker to output a continuous stream of tracker data in a continuous plurality of packets. Preferably, each packet has a start header and the application will read data continuously received and search for a start header. Preferably, the packet also includes a checksum. Once the application finds the header, the rest of the packet is read and the checksum computed. If the computed checksum does not match the transmitted checksum, the application rereads the data one byte beyond where it last found the header and starts the process over again. Alternatively, the application can stop the continuous stream by sending a stop command until recognized and begin reading the stream again after flushing the read buffers. In polled mode, in response to receipt of a "send" signal from the host computer, the tracker will output a single data packet. In one embodiment, the packet size is 12 bytes to 8 bytes depending on the requested format In uncooked data format, the data has been digitized by the analog-to-digital (A-to-D) converter after having been amplified, filtered, demodulated and rectified as described above, and is then sent to the host computer either as a 12-byte packet for binary data mode, or as a series of hexadecimal values encoded in ASCII with (ASCII) spaces separating each 2-byte ASCII hex value. The uncooked mode is contemplated primarily for use in debugging.

In the cooked data format, after data is received from the A-to-D converter, the magnetic vector is scaled, centering it about 0, and the tilt sensor readings are linearized, based on internal compensation constants stored in the EEPROM. Cooked data may be used e.g., when it is desired to perform angle computations on the host computer rather than the tracker microprocessor. For cooked data, when the device is binary data mode, the data is sent in 12-byte packets, while for ASCII data mode, data is sent in 2-byte ASCII hex format.

In Euler angle format, in addition to performing "cooking" of the data as described above, the tracker microprocessor computes yaw, pitch and roll angles. In one embodiment, the magnetic sensor data indicates absolute orientation with respect to the ambient magnetic field, i.e. the local magnetic field arising from the Earth's magnetic field as perturbed by any local influences such as construction, materials, power lines, etc. In the binary data mode, data is output as 8 bytes of binary data. When in the ASCII data mode, the Euler angle data is transmitted in the form of ASCII hex with (ASCII) spaces separating each 2-byte ASCII hex value.

In emulation mode, the serial output from the tracker communicates with a mouse driver device. In this mode the tracker operates at 1200 bps and simulates a 7-bit data byte with one stop bit and one start bit by always sending the last data bit as a simulated stop bit. The output format is that defined by the Microsoft® mouse serial data format (3-byte format). While operating in mouse mode, X is determined by a scaled yaw angle calculation, and Y is determined by a scaled pitch angle sensing. In one embodiment, two mouse modes are available. In the first mode, displacement or delta values are sent whenever the tracker moves with the size of the delta values depending on how far the tracker has moved. In the second mode, a reference position is defined, e.g. when the tracker is first initialized and any movement away from this reference position results in deltas being continuously sent until the tracker is moved back within the threshold near the reference position. The size of the deltas depends on how far away the tracker is moved from the reference position. Preferably the user or application can set mouse sensitivity and threshold values.

In view of the above description, a number of advantages of the present invention can be seen. The present invention provides for a high quality image in a head-mounted display at low cost and low weight. For example, in one embodiment an HMD according to the present invention has a weight of about 8 oz (about 200 g). In one embodiment, the HMD, not including earphones, has a height of about 3 inches (about 7 cm), a width of about 7 inches (about 18 cm) and a length (not including any straps or tracker) of about 8 inches (about 20 cm) in the unfolded state and about 3.5 inches (about 9 cm) in the folded state, with earphones adding up to about 1.5 inches (about 3 cm) to height (depending on rotation of arms 54). In one embodiment, the HMD provides a fixed and relatively large focal length, such as about 3.5 m, and a somewhat small or convergence depth, such as about 2 m, to reduce or avoid eyestrain. Preferably there is substantially 100% stereo image overlap of the left and right images. Preferably, the device can be easily stored and transported, provides for comfort for the user, because of its low weight and mounting facility, can provide controls for video and audio is easily adjustable or configured to accommodate the user's head size and ear and eye location, provides a high intensity, preferably color image, provides for ease of alignment, manufacture, design and repair, provides for ease of control by the user such as controlling video, audio or immersive characteristics and/or permits the user to select whether tracking is attached. In some embodiments, weight and cost are minimized or reduced by providing components which perform multiple functions rather than requiring multiple components each performing a single function. For example, reflectors 82 perform the multiple functions of directing the image light toward the user's eyes, magnifying the image and providing for combination of the image light with environmental light. The optical shrouds 112 provide multiple functions of positioning optical components in the desired location and preventing stray light. In one embodiment the holder 222 performs the multiple functions of positioning the LCD 72 in the desired location, masking and, if desired, adjusting position 246a 246b.

The disclosed head tracker provides for ease and comfort of use and generates high-speed, accurate data at low cost. By providing a tracker which the end user can readily detach from the HMD, preferably without the need to use tools, the user can, if desired, easily use the HMD without a tracker attached (e.g. for uses that do not need and/or support a tracker), providing a reduction in weight of the device. Since only a single cable or other link is needed for connection to the host computer (or other image generator), regardless of whether or not the tracker is being used, the inconvenience associated with being tethered by multiple cables or other links is avoided. Since trackers can be easily attached or detached, consumers who do not wish to pay for tracking capability can select to purchase the HMD alone, while still having the option to later upgrade to a tracker device, and without requiring the retailer to stock both a tracking HMD and a non-tracking HMD. Preferably, the tracker is located on the user's head substantially opposite the location of the heaviest portion of the HMD (such as the optics, e.g. located on or near a visor region) to reduce or eliminate neck strain by acting as at least a partial counterbalance. Preferably, the number of components of the system is minimized, by combining functions, such as by providing a single housing which contains both the tracker and a headstrap-tensioning device. By providing for tracker communication through a computer's serial port, it is not necessary for the user to install a card or otherwise access the interior of a host computer. By providing for a plurality of user-selectable, preferably software-selectable, output formats, the tracker of the present invention is more readily used in connection with a wide variety of current application software, and future application software can be more readily developed so as to be compatible with the tracker of the present invention. In those embodiments in which magnetic sensors are encompassed by coils (e.g., normalizing coils in the case of magnetoresistors or driving coils in the case of flux gate devices) some embodiments of the present invention use a single coil to encompass two or more sensors, thus making construction of the device, e.g. mounting on a printed circuit board, easier and less expensive to achieve than if a separate coil were used for each sensor. In one embodiment, use of inertial sensors, such as accelerometers and/or rate gyros provide for greater accuracy, less distortion, and greater ease of fabrication than when using many types of magnetic sensors.

A number of variations and modifications of the invention can also be used. Although the device depicted is binocular, a monocular device can also be used. More or fewer controls than those depicted can be used. A number of aspects of the invention can be used without providing other aspects, for example, it is possible to provide for the eyeglass-like fold-up style without providing for a color shutter. It is possible to provide a user-detachable tracker without providing a strap-tensioner or vice versa. Although removable forehead brace pads of various thicknesses have been disclosed for adjusting the spacing of the device away from the head of the user, and thus adjusting the amount of eye relief, other devices for adjusting eye relief can be provided such as providing a forehead brace which is linearly slidable in a fore-aft direction, or with a bracket which is pivotable to affect distance from the forehead and/or optics which are mounted to be movable or slidable in a fore-aft direction.

The head mounted display can be combined with or coupled to other devices such as full-function computers, a keyboard, microphone or other input device, e.g., as described generally in U.S. patent application Ser. No. 60/001069 (attorney docket number 91193/90701) for Ultra Portable Computer filed Jul. 12, 1995, incorporated herein by reference, depixelators such as those described in application S.N. PCT/US95/00661, filed Jan. 18, 1995, for Speckle Depixelator, incorporated herein by reference and/or eyetracking such as described in application S.N. 60/002013 filed Aug. 8, 1995, for Head Mounted Display with Eye Tracking, incorporated herein by reference. It is feasible to house or couple image and/or audio storage devices and/or sources in the HMD so that a self-contained display device is provided. Images may be stored in a memory device (e.g., ROM or Flash memory) magnetic storage devices (such as hard disk or video tape) optical devices (such as video disks or compact disks) and the like. Although the PC interface has been depicted as being separate from the HMD and communicating therewith via a cable, the PC interface may be incorporated as part of the HMD if desired, preferably permitting selective bypassing of the video format conversion when this is not needed, such as in response to activation of a user switch or other control, or automatically in response to electronic detection of the type of video format which is received. Other items may be mounted in or on or coupled to the HMD, such as decoders, "set top box" devices and the like for permitting direct coupling to and display of satellite, cable, videophone, computer networks or similar information outlets.

One embodiment, described above, provides, when the tracker is being used, a first cable from the tracker to the host computer and tracker pass-through of image information to the HMD via a second cable, with the second cable being used for connection to the host computer when the tracker is not being used. However, it is also possible to provide for a cable (or other communications link, such as an infrared, radio or other wireless link) which couples the HMD to the host computer or other image source, regardless of whether the tracker is used, and another, preferably user-disconnectable, cable or link for sending tracker information to the HMD (and optionally receiving power, commands, etc. from the HMD), with the HMD passing-through data and other signals between the host computer and the tracker, when the tracker is being used. Although one embodiment described use of magnetoresistors, other types of magnetic sensors can be used including flux gate sensors and Hall effect sensors. Although one embodiment described the use of rate gyros and accelerometers, other types of inertial sensors can be used, including two-degree-of-freedom gyroscopes, fiber-optic gyroscopes and laser gyroscopes and any of a variety of accelerometers including piezoelectric or piezoresistive accelerometers, strain-gage sensors, servo accelerometers and eddy current probes. Although one embodiment discloses a single housing for both the head tracker and the headstrap tensioner, it would be possible to place these two components in different housings and/or locations. Although connection of the tracker/HMD to a host computer is preferably via an external PC interface, it would be possible for some or all of the PC interface function to be performed by devices housed in the host PC and/or housed in the HMD and/or housed in the tracker. Similarly, it would be possible for some of the devices disclosed as located in the tracker or the HMD (such as a microprocessor, filters, power devices), to be located external the tracker and/or HMD. Although one embodiment includes correcting for drift by correcting to a reference yaw direction if detected yaw is sufficiently close to the reference direction, drift can also be corrected by other methods, such as by correcting a direction detected by a first (e.g. inertial) sensor to correspond to a direction sensed by a second (e.g. magnetic or optical) sensor.

Although the invention has been described by way of a preferred embodiment and certain variations and modification, other variations and modifications can also be used, the invention being defined by the following claims.

What is claimed is:

1. Visual display apparatus for a user, comprising:
   an image generator, which outputs image light;
   optical elements configured to receive said image light from said image generator and provide said image to the eye position of the user; and
   a holder configured to mount the image generator, optical elements and shroud to the user's head said holder having a first portion configured for positioning before the forehead or eyes of the user and first and second temple pieces extending from said first portion along the sides of the head of the user towards the ears of the user, said first and second temple pieces being coupled to said first portion to permit pivoting of said first and second temple pieces about first and second pivot axes, allowing said temple pieces to be folded substantially adjacent said first portion wherein said first and second pivot axes are fixed with respect to said first portion.

2. Visual display apparatus for a user, comprising:
   an image generator, which outputs image light;
   optical elements configured to receive said image light from said image generator and provide said image to the eye position of the user;
   at least a first shroud configured to block stray light; and
   a holder configured to mount the image generator, optical elements and shroud to the user's head including a brace configured to contact the user's forehead.

3. Visual display apparatus for a user as claimed in claim 2, further comprising:
   means for conveying image data from an image source to said image generator, said means for conveying also permitting simultaneous display of said images on a second display device distinct from said image generator, for viewing by a second user.

4. Apparatus, as claimed in claim 2 wherein said forehead brace is the only portion of said visual display apparatus which contacts the user's face.

5. Apparatus, as claimed in claim 2, wherein said forehead brace is configured to define a region in front of the user's eyes sufficient to accommodate eyeglasses.

6. Visual display apparatus for a user comprising
   an image generator, which outputs image light;
   optical elements configured to receive said image light from said image generator and provide said image to the eye position of the user;
   at least a first shroud configured to block stray light;
   a holder configured to mount the image generator optical elements and shroud to the user's head including a brace configured to contact the user's forehead; and
   means for adjusting the effective thickness of said brace to change the amount of eye relief.

7. Visual display apparatus for providing an image to the eyes of a user, comprising:
   left and right image generators, each having a first output surface, said output surfaces of said left and right image generators outputting left and right image light;
   left and right fold mirrors positioned to receive the left and right image light from the left and right image generators, respectively, and to reflect at least first portions of said left and right image light;
   a left powered reflector situated to receive said first portion of said left image light to provide at least some of said image to the left eye position of the user; and
   a right powered reflector, distinct from said left powered reflector, situated to receive said first portion of said right image light to provide at least some of said image to the right eye position of the user.

8. Apparatus as claimed in claim 7, wherein said image light is provided to the eye position of the user using reflective optics and in the absence of refractive optics along the optical path between said image generator and said eye position of the user.

9. Apparatus as claimed in claim 7 wherein said apparatus accommodates user interpupilary distances between about 40 mm and about 60 mm in the absence of substantial prismatic distortion without the need for user adjustment of the apparatus to accommodate said interpupilary distance.

10. Apparatus as claimed in claim 7 wherein said image is provided to the eye of the user in the absence of user adjustment of focal length.

11. Visual display apparatus for a user, comprising:
   an image generator, which outputs image light;
   optical elements configured to receive said image light from said image generator and provide said image to the eye position of the user;
   a holder configured to mount the image generator and optical elements to the user's head; and
   a converter which receives audio signals and receives video signals in a first VGA format, outputs video signals in a second format and outputs audio signals.

12. Apparatus as claimed in claim 11 wherein said second format is NTSC.

13. Apparatus as claimed in claim 11 wherein said video format converter provides a pass-through of audio signals and unconverted video signals.

14. Apparatus, as claimed in claim 11 wherein said audio signal and converted video signals are output over a single cable.

15. A head-mounted visual display apparatus for a user, comprising:
   an image generator defining an image height and an image width, which outputs image light;
   a first mask positioned on a first side of said image generator defining a first optically clear opening having a first opening height and a first opening width;
   a second mask located on a side of said image generator opposite said first side defining a second optically clear opening having a second opening height equal to or greater than said image height and a second opening width equal to or greater than said image width; and
   optical elements configured to receive said image light from said image generator and provide said image to the eye position of the user.

16. Apparatus, as claimed in claim 15, further comprising a spring for urging said first mask toward said image generator.

17. Apparatus, as claimed in claim 15, further comprising a spring for compressing said first and second masks against said image generator.

18. A head-mounted visual display apparatus for a user for coupling to a computer, said head-mounted display being of a predetermined type, comprising:
   an image generator, which outputs image light;
   optical elements configured to receive said image light from said image generator and provide said image to the eye position of the user;
   a holder configured to mount the image generator and optical elements to the head of the user;
   means for communicating information regarding said type of said head-mounted display to said computer.

19. Apparatus, as claimed in claim 18, wherein said means for communicating includes an information storage device on said head-mounted visual display for storing an indication of said type of said head-mounted display and a processor for retrieving said indication and transmitting over a first communications link.

20. Visual display apparatus for a user comprising
   an image generator, which outputs image light;
   optical elements configured to receive said image light from said image generator and provide said image to the eye position of the user;
   at least a first shroud configured to block stray light;
   a holder configured to mount the image generator, optical elements and shroud to the user's head including a brace configured to contact the user's forehead; and
   a pad removably coupled to said brace.

21. Visual display apparatus for a user comprising:
   an image generator, which outputs image light;
   optical elements configured to receive said image light from said image generator and provide said image to the eye position of the user;
   at least a first shroud configured to block stray light; and
   a holder configured to mount the image generator, optical elements and shroud to the user's head including a brace configured to contact the user's forehead
   wherein said brace includes a bracket and a plate pivotable with respect to said bracket.

22. Apparatus as claimed in claim 21 further comprising means for urging said plate toward a first pivoted configuration.

* * * * *